US012700110B2

(12) United States Patent
Fisher

(10) Patent No.: US 12,700,110 B2
(45) Date of Patent: **\*Aug. 4, 2026**

(54) SYSTEMS AND METHODS OF IDENTIFYING AND TRACKING SUBJECTS OVER MULTIPLE IDENTIFICATION INTERVALS BY RECEIVED COMBINED FEATURES

(71) Applicant: Standard Cognition, Corp., San Francisco, CA (US)

(72) Inventor: Jordan E. Fisher, San Francisco, CA (US)

(73) Assignee: Standard Cognition, Corp., San Francisco, CA (US)

( \* ) Notice: Subject to any disclaimer, the term of this patent is extended or adjusted under 35 U.S.C. 154(b) by 199 days.

This patent is subject to a terminal disclaimer.

(21) Appl. No.: 18/595,274

(22) Filed: Mar. 4, 2024

(65) Prior Publication Data

US 2024/0212173 A1     Jun. 27, 2024

Related U.S. Application Data

(63) Continuation of application No. 17/572,590, filed on Jan. 10, 2022, now Pat. No. 11,948,313, which is a
(Continued)

(51) Int. Cl.
*G06N 20/00* (2019.01)
*G06T 7/246* (2017.01)
(Continued)

(52) U.S. Cl.
CPC ............. *G06T 7/292* (2017.01); *G06N 20/00* (2019.01); *G06T 7/248* (2017.01); *G06V 10/764* (2022.01);
(Continued)

(58) Field of Classification Search
CPC ..................... G06T 7/292; G06T 7/248; G06T 2207/20081; G06T 2207/10021;
(Continued)

(56) References Cited

U.S. PATENT DOCUMENTS

| | | |
|---|---|---|
| 6,154,559 A | 11/2000 | Beardsley |
| 6,561,417 B1 | 5/2003 | Gadd |

(Continued)

FOREIGN PATENT DOCUMENTS

| | | |
|---|---|---|
| CN | 104778690 B | 6/2017 |
| EP | 1574986 B1 | 7/2008 |

(Continued)

OTHER PUBLICATIONS

Black et al., "Multi View Image Surveillance and Tracking," IEEE Proceedings of the Workshop on Motion and Video Computing, 2002, pp. 1-6.
(Continued)

*Primary Examiner* — Sheela C Chawan
(74) *Attorney, Agent, or Firm* — Haynes Beffel & Wolfeld LLP; Andrew L. Dunlap; Jason Liao

(57) ABSTRACT

A method of tracking subjects in an area. The method includes processing by a plurality of trained inference engines that process respective sequences of images in the plurality of sequences of images to locate features of subjects in corresponding fields of view of the respective sequences and receiving information that includes combined located features from more than one of the trained inference engines which process respective sequences of images having overlapping fields of view to generate data locating subjects in three dimensions in the area of real space during identification intervals, and matching located subjects from
(Continued)

a plurality of identification intervals to identify tracked subjects, including comparing located subjects with tracked subjects.

20 Claims, 25 Drawing Sheets

Related U.S. Application Data continuation of application No. 16/388,765, filed on Apr. 18, 2019, now Pat. No. 11,232,575.

(51) Int. Cl.

| | |
|---|---|
| *G06T 7/292* | (2017.01) |
| *G06V 10/764* | (2022.01) |
| *G06V 10/82* | (2022.01) |
| *G06V 20/52* | (2022.01) |

(52) U.S. Cl.
CPC .............. *G06V 10/82* (2022.01); *G06V 20/52* (2022.01); *G06T 2207/20081* (2013.01)

(58) Field of Classification Search
CPC ........... G06T 2207/30196; G06T 2207/30232; G06N 20/00; G06N 3/045; G06N 3/0464; G06N 3/09; G06N 3/08; G06V 10/764; G06V 10/82; G06V 20/52
USPC .................................................. 382/100, 103
See application file for complete search history.

(56) References Cited

U.S. PATENT DOCUMENTS

| | | | |
|---|---|---|---|
| 7,050,624 | B2 | 5/2006 | Dialameh et al. |
| 7,050,652 | B2 | 5/2006 | Stanek |
| 7,742,623 | B1 | 6/2010 | Moon et al. |
| 8,009,863 | B1 | 8/2011 | Sharma et al. |
| 8,219,438 | B1 | 7/2012 | Moon et al. |
| 8,261,256 | B1 | 9/2012 | Adler et al. |
| 8,279,325 | B2 | 10/2012 | Pitts et al. |
| 8,577,705 | B1 | 11/2013 | Baboo et al. |
| 8,624,725 | B1 | 1/2014 | MacGregor |
| 8,749,630 | B2 | 6/2014 | Alahi et al. |
| 9,036,028 | B2 | 5/2015 | Buehler |
| 9,058,523 | B2 | 6/2015 | Merkel et al. |
| 9,262,681 | B1 | 2/2016 | Mishra |
| 9,269,012 | B2 | 2/2016 | Fotland |
| 9,269,093 | B2 | 2/2016 | Lee et al. |
| 9,294,873 | B1 | 3/2016 | MacGregor |
| 9,449,233 | B2 | 9/2016 | Taylor |
| 9,489,623 | B1 | 11/2016 | Sinyavskiy et al. |
| 9,494,532 | B2 | 11/2016 | Xie et al. |
| 9,536,177 | B2 | 1/2017 | Chalasani et al. |
| 9,582,891 | B2 | 2/2017 | Geiger et al. |
| 9,595,127 | B2 | 3/2017 | Champion et al. |
| 9,652,751 | B2 | 5/2017 | Aaron et al. |
| 9,846,810 | B2 | 12/2017 | Partis |
| 9,881,221 | B2 | 1/2018 | Bala et al. |
| 9,886,827 | B2 | 2/2018 | Schoner |
| 9,911,290 | B1 | 3/2018 | Zalewski et al. |
| 10,055,853 | B1 | 8/2018 | Fisher et al. |
| 10,083,453 | B2 | 9/2018 | Campbell |
| 10,127,438 | B1 | 11/2018 | Fisher et al. |
| 10,133,933 | B1 | 11/2018 | Fisher et al. |
| 10,165,194 | B1 | 12/2018 | Baldwin |
| 10,169,677 | B1 | 1/2019 | Ren et al. |
| 10,175,340 | B1 | 1/2019 | Abari et al. |
| 10,176,452 | B2 | 1/2019 | Rizzolo et al. |
| 10,192,408 | B2 | 1/2019 | Schoner |
| 10,202,135 | B2 | 2/2019 | Mian et al. |
| 10,210,603 | B2 | 2/2019 | Venable et al. |
| 10,210,737 | B2 | 2/2019 | Zhao |
| 10,217,120 | B1 | 2/2019 | Shin et al. |
| 10,242,393 | B1 | 3/2019 | Kumar et al. |
| 10,262,331 | B1 | 4/2019 | Sharma et al. |
| 10,282,720 | B1 | 5/2019 | Buibas et al. |
| 10,282,852 | B1 | 5/2019 | Buibas et al. |
| 10,332,089 | B1 | 6/2019 | Asmi et al. |
| 10,354,262 | B1 | 7/2019 | Hershey et al. |
| 10,373,322 | B1 | 8/2019 | Buibas et al. |
| 10,387,896 | B1 | 8/2019 | Hershey et al. |
| 10,438,277 | B1 | 10/2019 | Jiang et al. |
| 10,445,694 | B2 | 10/2019 | Fisher et al. |
| 10,474,877 | B2 | 11/2019 | Huang et al. |
| 10,474,988 | B2 | 11/2019 | Fisher et al. |
| 10,474,991 | B2 | 11/2019 | Fisher et al. |
| 10,474,992 | B2 | 11/2019 | Fisher et al. |
| 10,474,993 | B2 | 11/2019 | Fisher et al. |
| 10,529,137 | B1 | 1/2020 | Black et al. |
| 10,535,146 | B1 | 1/2020 | Buibas et al. |
| 10,650,545 | B2 | 5/2020 | Fisher et al. |
| 10,776,926 | B2 | 9/2020 | Shrivastava |
| 10,810,539 | B1 | 10/2020 | Mohanty et al. |
| 10,853,965 | B2 | 12/2020 | Fisher et al. |
| 10,929,829 | B1 | 2/2021 | Hazelwood et al. |
| 11,132,810 | B2 | 9/2021 | Kume et al. |
| 11,232,575 | B2 | 1/2022 | Fisher |
| 11,232,687 | B2 | 1/2022 | Fisher et al. |
| 11,354,683 | B1 | 6/2022 | Shin et al. |
| 11,948,313 | B2 * | 4/2024 | Fisher .................... G06N 3/045 |
| 2003/0078849 | A1 | 4/2003 | Snyder |
| 2003/0107649 | A1 | 6/2003 | Flickner et al. |
| 2004/0099736 | A1 | 5/2004 | Neumark |
| 2004/0131254 | A1 | 7/2004 | Liang et al. |
| 2005/0177446 | A1 | 8/2005 | Hoblit |
| 2005/0201612 | A1 | 9/2005 | Park et al. |
| 2006/0132491 | A1 | 6/2006 | Riach et al. |
| 2006/0279630 | A1 | 12/2006 | Aggarwal et al. |
| 2007/0021863 | A1 | 1/2007 | Mountz et al. |
| 2007/0021864 | A1 | 1/2007 | Mountz et al. |
| 2007/0182718 | A1 | 8/2007 | Schoener et al. |
| 2007/0188318 | A1 | 8/2007 | Cole et al. |
| 2007/0282665 | A1 | 12/2007 | Buehler et al. |
| 2008/0001918 | A1 | 1/2008 | Hsu et al. |
| 2008/0101652 | A1 | 5/2008 | Zhao et al. |
| 2008/0159634 | A1 | 7/2008 | Sharma et al. |
| 2008/0170776 | A1 | 7/2008 | Albertson et al. |
| 2008/0181507 | A1 | 7/2008 | Gope et al. |
| 2008/0211915 | A1 | 9/2008 | McCubbrey |
| 2008/0243614 | A1 | 10/2008 | Tu et al. |
| 2008/0246613 | A1 | 10/2008 | Linstrom et al. |
| 2009/0041297 | A1 | 2/2009 | Zhang et al. |
| 2009/0057068 | A1 | 3/2009 | Lin et al. |
| 2009/0083815 | A1 | 3/2009 | McMaster et al. |
| 2009/0217315 | A1 | 8/2009 | Malik et al. |
| 2009/0222313 | A1 | 9/2009 | Kannan et al. |
| 2009/0307226 | A1 | 12/2009 | Koster et al. |
| 2010/0021009 | A1 | 1/2010 | Yao |
| 2010/0103104 | A1 | 4/2010 | Son et al. |
| 2010/0208941 | A1 | 8/2010 | Broaddus et al. |
| 2010/0283860 | A1 | 11/2010 | Nader |
| 2011/0141011 | A1 | 6/2011 | Lashina et al. |
| 2011/0209042 | A1 | 8/2011 | Porter |
| 2011/0228976 | A1 | 9/2011 | Fitzgibbon et al. |
| 2011/0317012 | A1 | 12/2011 | Hammadou |
| 2011/0317016 | A1 | 12/2011 | Saeki et al. |
| 2011/0320322 | A1 | 12/2011 | Roslak et al. |
| 2012/0119879 | A1 | 5/2012 | Estes et al. |
| 2012/0159290 | A1 | 6/2012 | Pulsipher et al. |
| 2012/0209749 | A1 | 8/2012 | Hammad et al. |
| 2012/0245974 | A1 | 9/2012 | Bonner et al. |
| 2012/0271712 | A1 | 10/2012 | Katzin et al. |
| 2012/0275686 | A1 | 11/2012 | Wilson et al. |
| 2012/0290401 | A1 | 11/2012 | Neven |
| 2012/0324001 | A1 | 12/2012 | Leacock et al. |
| 2013/0011007 | A1 | 1/2013 | Muriello et al. |
| 2013/0011049 | A1 | 1/2013 | Kimura |
| 2013/0076898 | A1 | 3/2013 | Philippe et al. |
| 2013/0156260 | A1 | 6/2013 | Craig |
| 2013/0182114 | A1 | 7/2013 | Zhang et al. |
| 2013/0201339 | A1 | 8/2013 | Venkatesh |
| 2013/0266181 | A1 | 10/2013 | Brewer et al. |

(56) References Cited

U.S. PATENT DOCUMENTS

| | | |
|---|---|---|
| 2014/0168477 A1 | 6/2014 | David |
| 2014/0188648 A1 | 7/2014 | Argue et al. |
| 2014/0207615 A1 | 7/2014 | Li et al. |
| 2014/0214608 A1 | 7/2014 | Pedley et al. |
| 2014/0222501 A1 | 8/2014 | Hirakawa et al. |
| 2014/0282162 A1 | 9/2014 | Fein et al. |
| 2014/0285660 A1 | 9/2014 | Jamtgaard et al. |
| 2014/0304123 A1 | 10/2014 | Schwartz |
| 2014/0347479 A1 | 11/2014 | Givon |
| 2014/0363059 A1 | 12/2014 | Hurewitz |
| 2015/0002675 A1 | 1/2015 | Kundu et al. |
| 2015/0009323 A1 | 1/2015 | Lei |
| 2015/0012396 A1 | 1/2015 | Puerini et al. |
| 2015/0019391 A1 | 1/2015 | Kumar et al. |
| 2015/0023562 A1 | 1/2015 | Moshfeghi |
| 2015/0026010 A1 | 1/2015 | Ellison |
| 2015/0026646 A1 | 1/2015 | Ahn et al. |
| 2015/0039458 A1 | 2/2015 | Reid |
| 2015/0049914 A1 | 2/2015 | Alves |
| 2015/0124107 A1 | 5/2015 | Muriello et al. |
| 2015/0127485 A1 | 5/2015 | Kakizawa et al. |
| 2015/0170354 A1 | 6/2015 | Mukai |
| 2015/0193761 A1 | 7/2015 | Svetal |
| 2015/0206188 A1 | 7/2015 | Tanigawa et al. |
| 2015/0208043 A1 | 7/2015 | Lee et al. |
| 2015/0213391 A1 | 7/2015 | Hasan |
| 2015/0221094 A1 | 8/2015 | Marcheselli et al. |
| 2015/0262116 A1 | 9/2015 | Katircioglu et al. |
| 2015/0269740 A1 | 9/2015 | Mazurenko et al. |
| 2015/0294397 A1 | 10/2015 | Croy et al. |
| 2015/0302593 A1 | 10/2015 | Mazurenko et al. |
| 2015/0310459 A1 | 10/2015 | Bernal et al. |
| 2015/0327794 A1 | 11/2015 | Rahman et al. |
| 2015/0332312 A1 | 11/2015 | Cosman |
| 2015/0363868 A1 | 12/2015 | Kleinhandler et al. |
| 2015/0379366 A1 | 12/2015 | Nomura et al. |
| 2016/0055499 A1 | 2/2016 | Hawkins et al. |
| 2016/0095511 A1 | 4/2016 | Taguchi et al. |
| 2016/0110760 A1 | 4/2016 | Herring et al. |
| 2016/0125245 A1 | 5/2016 | Saitwal et al. |
| 2016/0155011 A1 | 6/2016 | Sulc et al. |
| 2016/0171707 A1 | 6/2016 | Schwartz |
| 2016/0188962 A1 | 6/2016 | Taguchi |
| 2016/0189286 A1 | 6/2016 | Zohar et al. |
| 2016/0203525 A1 | 7/2016 | Hara et al. |
| 2016/0217157 A1 | 7/2016 | Shih et al. |
| 2016/0217417 A1 | 7/2016 | Ma et al. |
| 2016/0259994 A1 | 9/2016 | Ravindran et al. |
| 2016/0358145 A1 | 12/2016 | Montgomery |
| 2016/0371726 A1 | 12/2016 | Yamaji et al. |
| 2016/0381328 A1 | 12/2016 | Zhao |
| 2017/0024806 A1 | 1/2017 | High et al. |
| 2017/0032193 A1 | 2/2017 | Yang |
| 2017/0068861 A1 | 3/2017 | Miller et al. |
| 2017/0116473 A1 | 4/2017 | Sashida et al. |
| 2017/0124096 A1 | 5/2017 | Hsi et al. |
| 2017/0148005 A1 | 5/2017 | Murn |
| 2017/0154212 A1 | 6/2017 | Feris et al. |
| 2017/0161555 A1 | 6/2017 | Kumar et al. |
| 2017/0168586 A1 | 6/2017 | Sinha et al. |
| 2017/0169440 A1 | 6/2017 | Dey et al. |
| 2017/0178226 A1 | 6/2017 | Graham et al. |
| 2017/0206664 A1 | 7/2017 | Shen |
| 2017/0206669 A1 | 7/2017 | Saleemi et al. |
| 2017/0249339 A1 | 8/2017 | Lester |
| 2017/0255990 A1 | 9/2017 | Ramamurthy et al. |
| 2017/0278255 A1 | 9/2017 | Shingu et al. |
| 2017/0308911 A1 | 10/2017 | Barham et al. |
| 2017/0309136 A1 | 10/2017 | Schoner |
| 2017/0323376 A1 | 11/2017 | Glaser et al. |
| 2018/0003315 A1 | 1/2018 | Reed |
| 2018/0012072 A1 | 1/2018 | Glaser et al. |
| 2018/0012080 A1 | 1/2018 | Glaser et al. |
| 2018/0014382 A1 | 1/2018 | Glaser et al. |
| 2018/0025175 A1 | 1/2018 | Kato |
| 2018/0032799 A1 | 2/2018 | Marcheselli et al. |
| 2018/0033015 A1 | 2/2018 | Opalka et al. |
| 2018/0033151 A1 | 2/2018 | Matsumoto et al. |
| 2018/0068431 A1 | 3/2018 | Takeda et al. |
| 2018/0070056 A1 | 3/2018 | DeAngelis et al. |
| 2018/0088900 A1 | 3/2018 | Glaser et al. |
| 2018/0150788 A1 | 5/2018 | Vepakomma et al. |
| 2018/0165728 A1 | 6/2018 | McDonald et al. |
| 2018/0181995 A1 | 6/2018 | Burry et al. |
| 2018/0189600 A1 | 7/2018 | Astrom et al. |
| 2018/0217223 A1 | 8/2018 | Kumar et al. |
| 2018/0225625 A1 | 8/2018 | DiFatta et al. |
| 2018/0232796 A1 | 8/2018 | Glaser et al. |
| 2018/0240180 A1 | 8/2018 | Glaser et al. |
| 2018/0276480 A1 | 9/2018 | Peterson et al. |
| 2018/0295424 A1 | 10/2018 | Taylor et al. |
| 2018/0322616 A1 | 11/2018 | Guigues |
| 2018/0329762 A1 | 11/2018 | Li et al. |
| 2018/0332235 A1 | 11/2018 | Glaser |
| 2018/0332236 A1 | 11/2018 | Glaser et al. |
| 2018/0343417 A1 | 11/2018 | Davey |
| 2018/0365481 A1 | 12/2018 | Tolbert et al. |
| 2018/0365755 A1 | 12/2018 | Bekbolatov et al. |
| 2018/0373928 A1 | 12/2018 | Glaser et al. |
| 2019/0005479 A1 | 1/2019 | Glaser et al. |
| 2019/0034735 A1 | 1/2019 | Cuban et al. |
| 2019/0043003 A1 | 2/2019 | Fisher et al. |
| 2019/0057435 A1 | 2/2019 | Chomley et al. |
| 2019/0147709 A1 | 5/2019 | Schoner |
| 2019/0156273 A1 | 5/2019 | Fisher et al. |
| 2019/0156274 A1 | 5/2019 | Fisher et al. |
| 2019/0156275 A1 | 5/2019 | Fisher et al. |
| 2019/0156276 A1 | 5/2019 | Fisher et al. |
| 2019/0156277 A1 | 5/2019 | Fisher et al. |
| 2019/0156506 A1 | 5/2019 | Fisher et al. |
| 2019/0188876 A1 | 6/2019 | Song et al. |
| 2019/0244386 A1 | 8/2019 | Fisher et al. |
| 2019/0244500 A1 | 8/2019 | Fisher et al. |
| 2019/0251340 A1 | 8/2019 | Brown et al. |
| 2019/0331273 A1 | 10/2019 | Vos et al. |
| 2019/0347611 A1 | 11/2019 | Fisher et al. |
| 2019/0377957 A1 | 12/2019 | Johnston et al. |
| 2019/0378205 A1 | 12/2019 | Glaser et al. |
| 2019/0392318 A1 | 12/2019 | Ghafoor et al. |
| 2020/0074165 A1 | 3/2020 | Ghafoor et al. |
| 2020/0074393 A1 | 3/2020 | Fisher et al. |
| 2020/0074394 A1 | 3/2020 | Fisher et al. |
| 2020/0074432 A1 | 3/2020 | Valdman et al. |
| 2020/0118400 A1 | 4/2020 | Zalewski et al. |
| 2020/0134588 A1 | 4/2020 | Nelms et al. |
| 2020/0151692 A1 | 5/2020 | Gao et al. |
| 2020/0193507 A1 | 6/2020 | Glaser et al. |
| 2020/0234463 A1 | 7/2020 | Fisher et al. |
| 2020/0258241 A1 | 8/2020 | Liu et al. |
| 2020/0293992 A1 | 9/2020 | Bogolea et al. |
| 2020/0334834 A1 | 10/2020 | Fisher |
| 2020/0334835 A1 | 10/2020 | Buibas et al. |
| 2020/0410713 A1 | 12/2020 | Auer et al. |
| 2021/0067744 A1 | 3/2021 | Buibas et al. |
| 2021/0158430 A1 | 5/2021 | Buibas et al. |
| 2021/0201253 A1 | 7/2021 | Fisher et al. |
| 2021/0295081 A1 | 9/2021 | Berry et al. |
| 2022/0130220 A1 | 4/2022 | Fisher et al. |

FOREIGN PATENT DOCUMENTS

| | | | |
|---|---|---|---|
| EP | 2555162 A1 | 2/2013 | |
| EP | 3002710 A1 | 4/2016 | |
| GB | 2560387 A | 9/2018 | |
| GB | 2566762 A | 3/2019 | |
| JP | 2011253344 A | 12/2011 | |
| JP | 2013196199 A | 9/2013 | |
| JP | 2014089626 A | 5/2014 | |
| JP | 2016206782 A | 12/2016 | |
| JP | 2017157216 A | 9/2017 | |
| JP | 2018099317 A | 6/2018 | |
| KR | 1020180032400 A | 3/2018 | |
| KR | 102223570 B1 | 3/2021 | |
| TW | 201911119 A | 3/2019 | |

(56) References Cited

FOREIGN PATENT DOCUMENTS

| WO | 0021021 A1 | 4/2000 |
|----|-----------|--------|
| WO | 0243352 A2 | 5/2002 |
| WO | 02059836 A3 | 5/2003 |
| WO | 2008029159 A1 | 3/2008 |
| WO | 2013041444 A1 | 3/2013 |
| WO | 2013103912 A1 | 7/2013 |
| WO | 2014133779 A1 | 9/2014 |
| WO | 2015133699 A1 | 9/2015 |
| WO | 2016136144 A1 | 9/2016 |
| WO | 2016166508 A1 | 10/2016 |
| WO | 2017015390 A1 | 1/2017 |
| WO | 2017151241 A2 | 9/2017 |
| WO | 2017196822 A1 | 11/2017 |
| WO | 2018013438 A1 | 1/2018 |
| WO | 2018013439 A1 | 1/2018 |
| WO | 2018148613 A1 | 8/2018 |
| WO | 2018162929 A1 | 9/2018 |
| WO | 2018209156 A1 | 11/2018 |
| WO | 2018237210 A1 | 12/2018 |
| WO | 2019032304 A1 | 2/2019 |
| WO | 2019032305 A2 | 2/2019 |
| WO | 2019032306 A1 | 2/2019 |
| WO | 2019032307 A1 | 2/2019 |
| WO | 2020023795 | 1/2020 |
| WO | 2020023796 | 1/2020 |
| WO | 2020023798 | 1/2020 |
| WO | 2020023799 | 1/2020 |
| WO | 2020023801 | 1/2020 |
| WO | 2020023926 | 1/2020 |
| WO | 2020023930 | 1/2020 |
| WO | 2020047555 A1 | 3/2020 |
| WO | 2020214775 A1 | 10/2020 |
| WO | 2020225562 A1 | 11/2020 |

OTHER PUBLICATIONS

Camplani et al., "Background foreground segmentation with RGB-D Kinect data: An efficient combination of classifiers", Journal of Visual Communication and Image Representation, Academic Press, Inc., US, vol. 25, No. 1, Mar. 27, 2013, pp. 122-136,XP028804219, ISSN: 1047-3203, DOI: 10.1016/J.JVCIR.2013.03.009.

Ceballos, Scikit-Leam Decision Trees Explained, https://towardsdatascience.com/scikit-leam-decision-trees-explained-803f3812290d, Feb. 22, 2019, 13 pages.

DeTone et al, SuperPoint: Self-Supervised Interest Point Detection and Description, Apr. 19, 2018, arXiv:1712.07629v4 [cs.CV] Apr. 19, 2018, 13 pages.

EP 18843163.9—Extended European Search Report dated Nov. 27, 2020, 8 pages.

EP 18843486.4—Extended European Search Report dated Dec. 8, 2020, 8 pages.

EP 18844509.2—Extended European Search Report dated Dec. 8, 2020, 8 pages.

EP 20791434.2—Communication pursuant to Rules 161(2) and 162 EPC dated Nov. 25, 2021, 3 pages.

EP 20791434.2—Extended European Search Report dated Apr. 17, 2023, 12 pages.

EP 20791434.2—Response to Communication pursuant to Rules 161(2) and 162 EPC dated Nov. 25, 2021, filed May 18, 2022, 18 pages.

EP-18844384.0—European Extended Search Report dated Dec. 2, 2020, 7 pages.

Erdem et al. "Automated camera layout to satisfy task-specific and floor plan-specific coverage requirements," Computer Vision and Image Understanding 103, Aug. 1, 2006, 156-169.

Gkioxari et al. "R-CNNs for Pose Estimation and Action Detection," Cornell University, Computer Science, Computer Vision and Pattern Recognition, arXiv.org > cs > arXiv:1406.5212, Jun. 19, 2014, 8 pages.

Grinciunaite et al. "Human Pose Estimation in Space and Time Using 3D CNN," ECCV Workshop on Brave new ideas for motion representations in videos, Oct. 2016, 7 pages.

Harville, "Stereo person tracking with adaptive plan-view templates of height and occupancy statistics," Image and Vision Computing, vol. 22, Issue 2, Feb. 1, 2004, pp. 127-142.

He et al. "Deep Residual Learning for Image Recognition," (published at https://arxiv.org/abs/1512.03385), Dec. 10, 2015, 12 pages.

He et al. "Identity mappings in deep residual networks" (published at https://arxiv.org/pdf/1603.05027.pdf), Jul. 25, 2016, 15 pages.

Huang, et al. "Driver's view and vehicle surround estimation using omnidirectional video stream," IEEE IV2003 Intelligent Vehicles Symposium. Proceedings (Cat. No. 03TH8683), Jun. 9-11, 2003, pp. 444-449.

Jan Prokaj et al.: "Inferring tracklets for multi-object tracking," Computer Vision and Pattern Recognition Workshops OCVPRW), 2011 IEEE Computer Society Conference on IEEE, Jun. 20, 2011, pp. 37-44.

Jayabalan, et al., "Dynamic Action Recognition: A convolutional neural network model for temporally organized joint location data," Cornell University, Computer Science, Dec. 20, 2016, 11 pages.

Longuet-Higgens, "A computer algorithm for reconstructing a scene from two projections," Nature 293, Sep. 10, 1981, pp. 133-135.

Raul Mohedano et al.: "Robust 3D people tracking and positioning system in a semi-overlapped multi-camera environment," 15th IEEE International Conference on Image Processing: ICIP 2008; San Diego, CA, USA, Oct. 12-15, 2008, pp. 2656-2659.

Redmon et al., "You Only Look Once: Unified, Real-Time Object Detection," University of Washington, Allen Institute for Aly, Facebook AI Research, May 9, 2016, 10 pages.

Redmon et al., YOL09000: Better, Faster, Stronger, (available at https://arxiv.org/pdf/1612.08242.pdf), Dec. 25, 2016, 9 pages.

Rossi et al., "Tracking and Counting Moving People," IEEE Int'l Conf. on Image Processing, ICIP-94, Nov. 13-16, 1994, 5 pages.

Simonyan et al. "Very Deep Convolutional Networks for Large-Scale Image Recognition" (published at https://arxiv.org/abs/1409.1556), Apr. 10, 2015, 14 pages.

Symons, "Data Fusion Methods for Netted Sensors with Limited Communication Bandwidth", QinetiQ Ltd and University College London, 2004.

Toshev et al. "DeepPose: Human Pose Estimation via Deep Neural Networks," IEEE Conf. on Computer Vision and Pattern Recognition, Aug. 2014, 8 pages.

Vincze, "Robust tracking of ellipses at frame rate," Pattern Recognition, vol. 34, Issue 2, Feb. 2001, pp. 487-498.

Yusoff et al. "Optimal Camera Placement for 3D Environment," ICSECS 2011: Software Engineering and Computer Systems, Jun. 27-29, 2011, 448-459.

Zhang "A Flexible New Technique for Camera Calibration," IEEE Transactions on Pattern Analysis and Machine Intelligence, vol. 22, No. 11, Nov. 2000, 22pages.

Zheng et al., "Joint Discriminative and Generative Learning for Person Re-Identification," Proceedings of the IEEE/CVF Conference on Computer Vision and Pattern Recognition (CVPR), Jun. 16-20, 2019, pp. 2138-2147.

* cited by examiner

3D View of a subject in the area of real space

250

Shelf 4
Shelf 3
Shelf 2
Shelf 1

X Axis
x2

Z Axis

Y Axis
y2
y1 z2
z1 x1 x2 — x1  =  Length of shelf 1 y2 — y1  =  Depth / Width of shelf 1 z2 — z1  =  Height of shelf 1

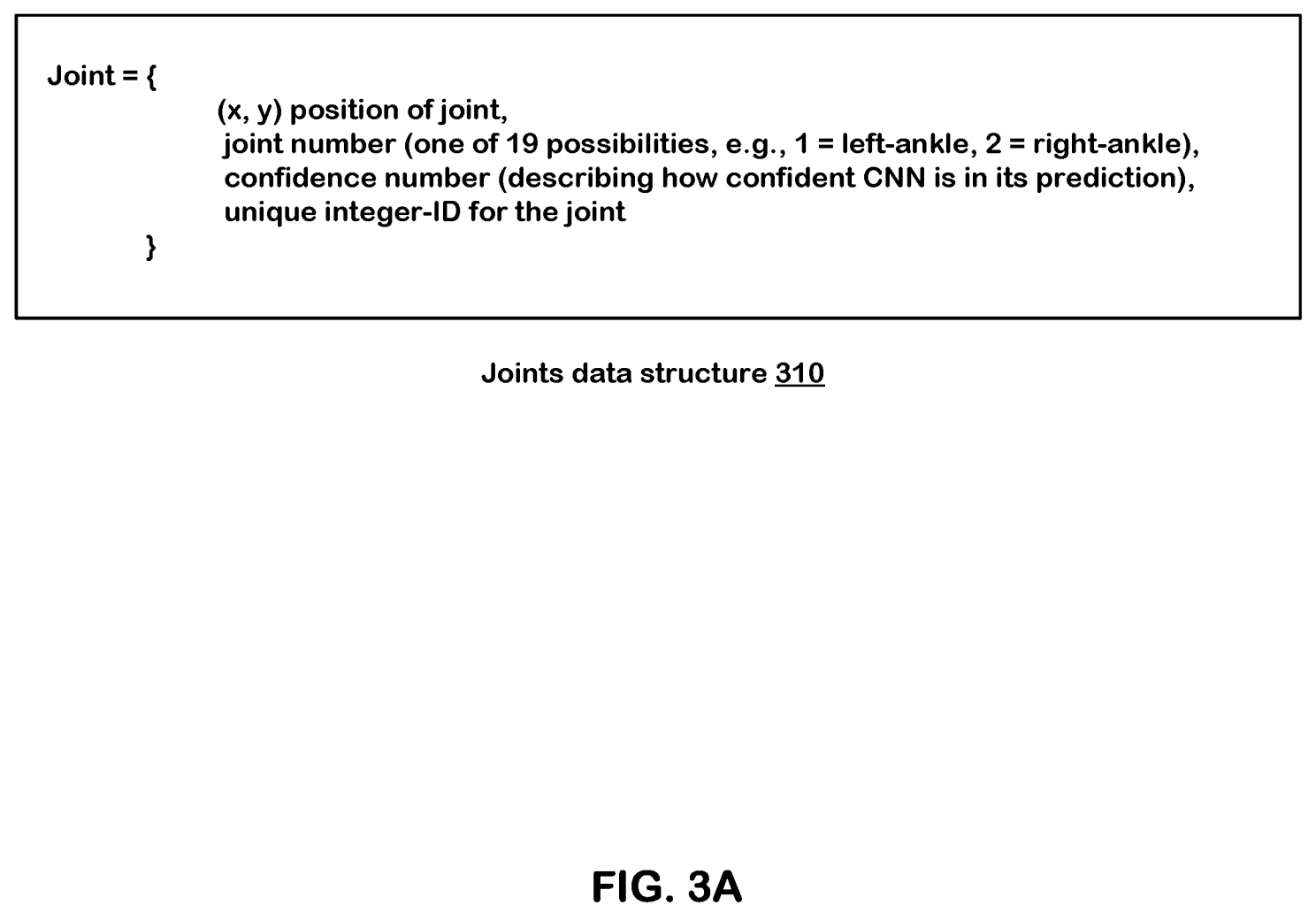

Joint = {

(x, y) position of joint, joint number (one of 19 possibilities, e.g., 1 = left-ankle, 2 = right-ankle), confidence number (describing how confident CNN is in its prediction), unique integer-ID for the joint

}

Joints data structure 310

FIG. 3A

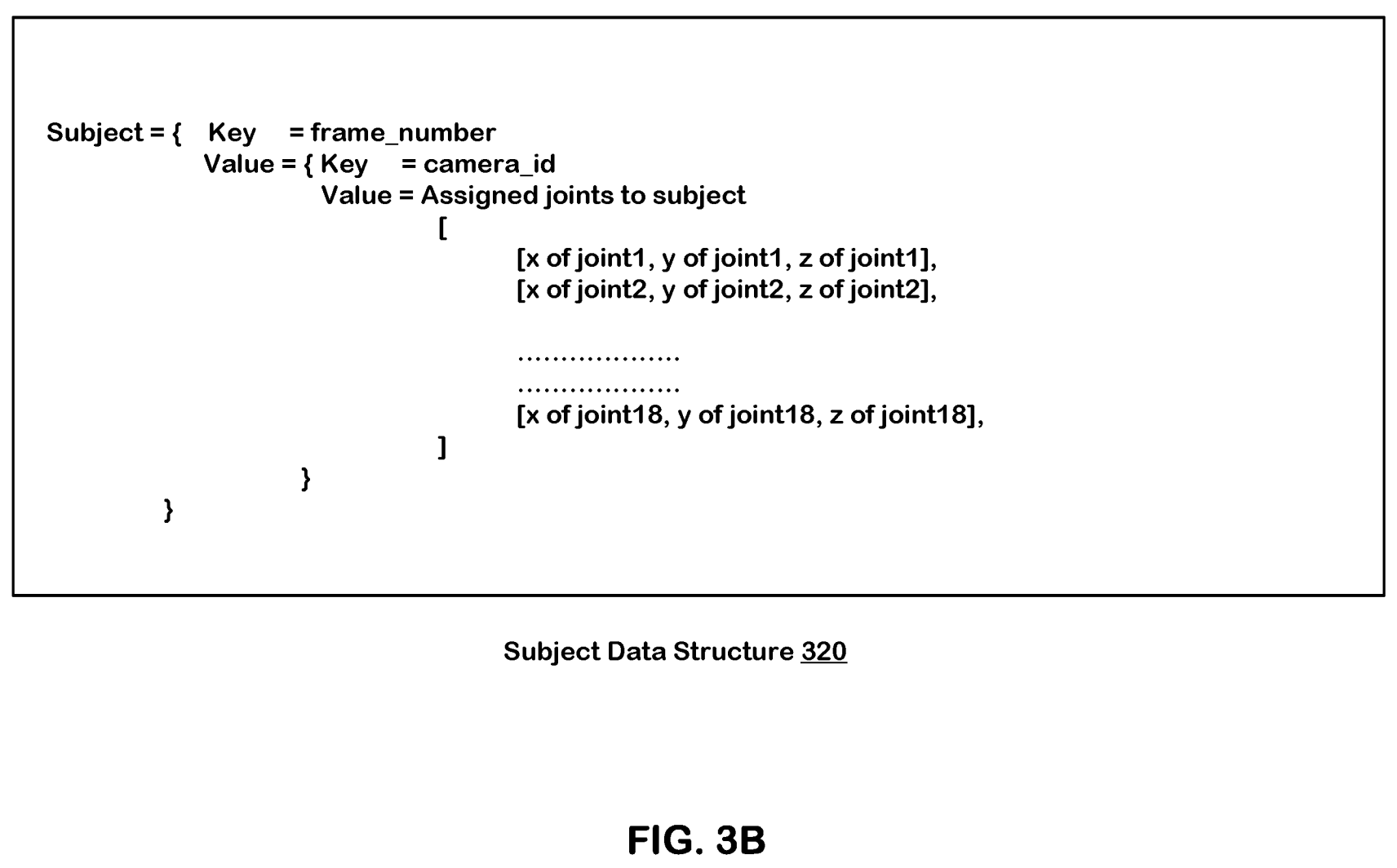

Subject = {  Key  = frame_number
Value = { Key  = camera_id
Value = Assigned joints to subject

[
[x of joint1, y of joint1, z of joint1],
[x of joint2, y of joint2, z of joint2],

............
............

[x of joint18, y of joint18, z of joint18],
]

}

}

Subject Data Structure 320

FIG. 3B

Subjects tracked in first preceding identification interval at t_1

Camera B 208

Subject 644

Subject 640

Subject 642

Camera A 206

Top View
(Looking down from Roof)

Multiple new subjects located in current identification interval at t_2

Camera B 208

Subject 648

610

Subject 644A

Subject 640A

Subject 642A

Subject 646

Camera A 206

Top View
(Looking down from Roof)

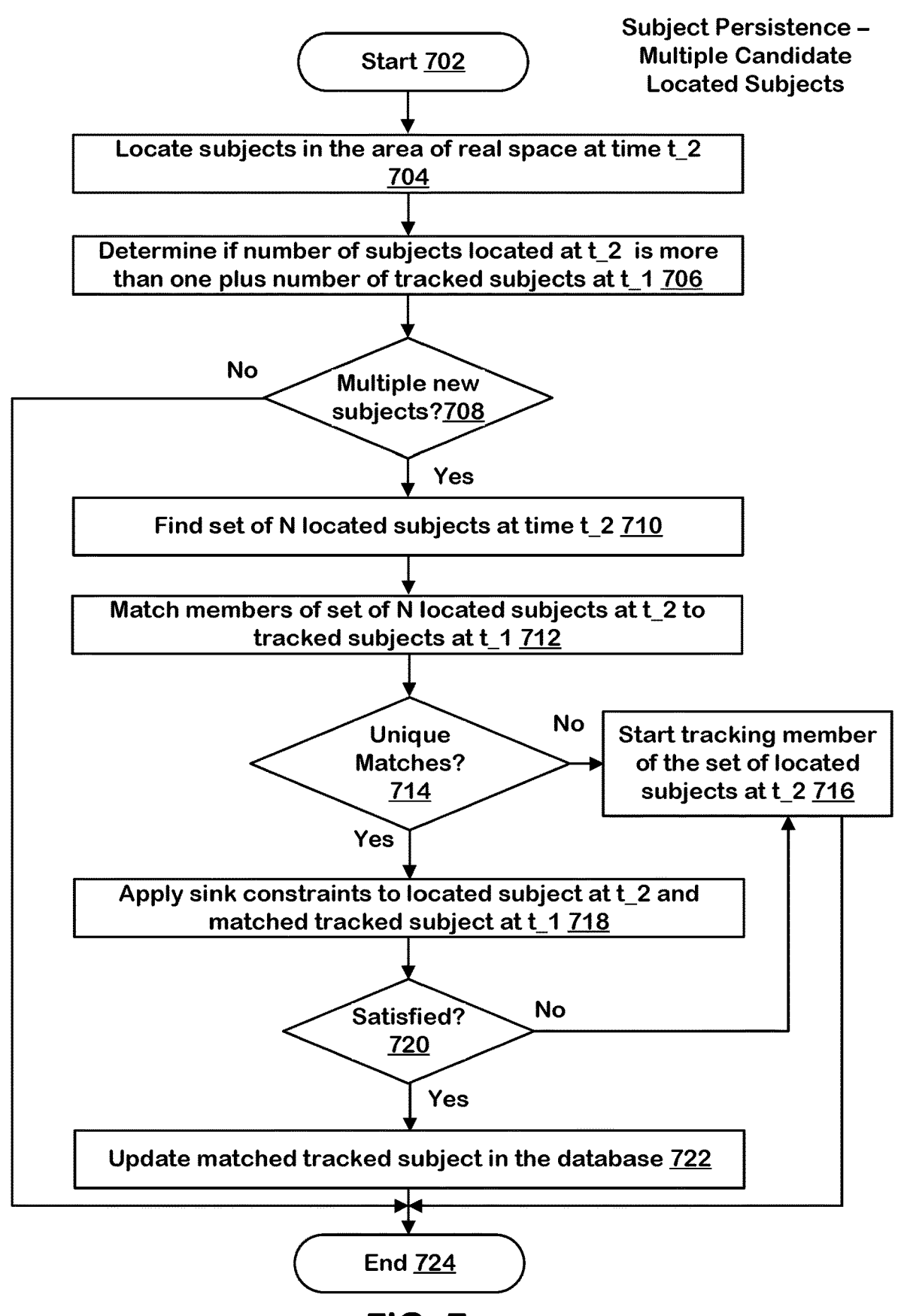

Subject Persistence –
Multiple Candidate
Located Subjects

Start 702

Locate subjects in the area of real space at time t_2
704

Determine if number of subjects located at t_2 is more
than one plus number of tracked subjects at t_1 706

No ← Multiple new
subjects?708

Yes

Find set of N located subjects at time t_2 710

Match members of set of N located subjects at t_2 to
tracked subjects at t_1 712

Unique
Matches?
714 → No → Start tracking member
of the set of located
subjects at t_2 716

Yes

Apply sink constraints to located subject at t_2 and
matched tracked subject at t_1 718

Satisfied?
720 → No

Yes

Update matched tracked subject in the database 722

End 724

FIG. 7

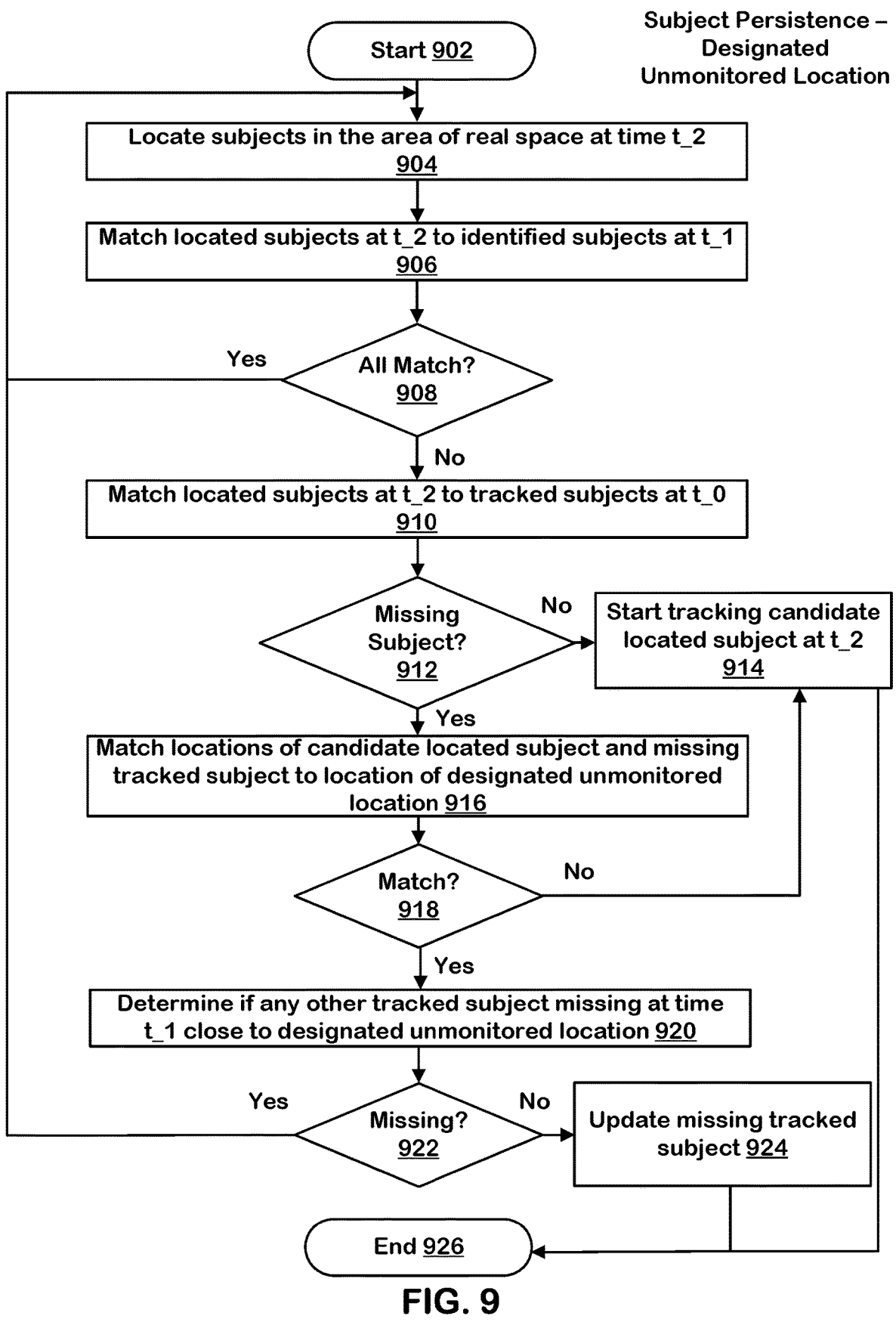

Subject Persistence – Designated Unmonitored Location

Start 902

Locate subjects in the area of real space at time t_2 904

Match located subjects at t_2 to identified subjects at t_1 906

All Match? 908

Yes

No

Match located subjects at t_2 to tracked subjects at t_0 910

Missing Subject? 912

No

Start tracking candidate located subject at t_2 914

Yes

Match locations of candidate located subject and missing tracked subject to location of designated unmonitored location 916

Match? 918

No

Yes

Determine if any other tracked subject missing at time t_1 close to designated unmonitored location 920

Missing? 922

Yes

No

Update missing tracked subject 924

End 926

FIG. 9

Shelf B 204

Camera B 208

WiFi 252

Aisle 116a

Top View
(Looking down from Roof)

Subject 240

Mobile
Computing
Device 118a

WiFi 250

Camera A 206

Shelf A 202

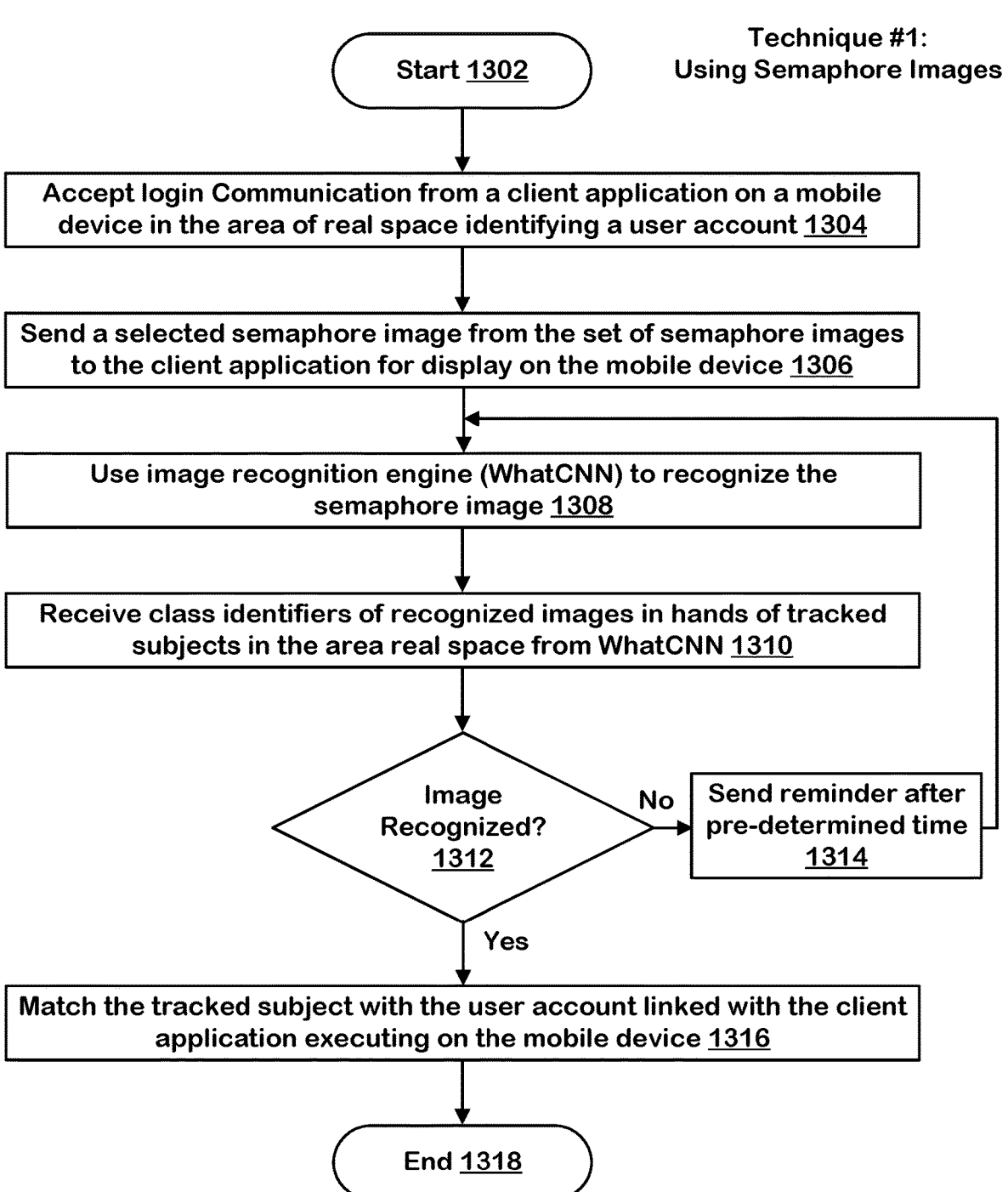

1300

Technique #1:
Using Semaphore Images

Start 1302

Accept login Communication from a client application on a mobile device in the area of real space identifying a user account 1304

Send a selected semaphore image from the set of semaphore images to the client application for display on the mobile device 1306

Use image recognition engine (WhatCNN) to recognize the semaphore image 1308

Receive class identifiers of recognized images in hands of tracked subjects in the area real space from WhatCNN 1310

Image Recognized? 1312

No → Send reminder after pre-determined time 1314

Yes

Match the tracked subject with the user account linked with the client application executing on the mobile device 1316

End 1318

FIG. 13

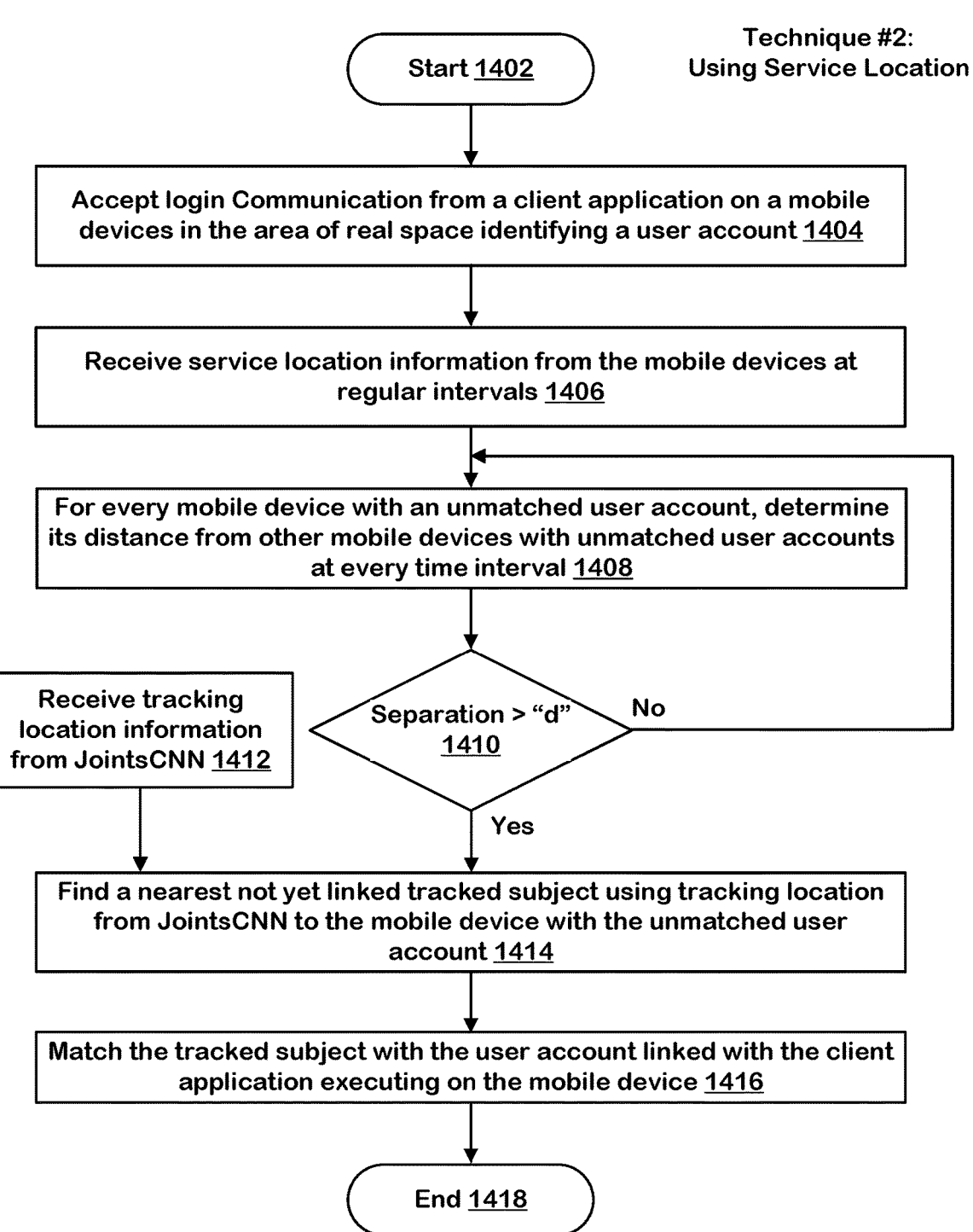

1400

Technique #2:
Using Service Location

Start 1402

Accept login Communication from a client application on a mobile devices in the area of real space identifying a user account 1404

Receive service location information from the mobile devices at regular intervals 1406

For every mobile device with an unmatched user account, determine its distance from other mobile devices with unmatched user accounts at every time interval 1408

Receive tracking location information from JointsCNN 1412

Separation > "d" 1410    No

Yes

Find a nearest not yet linked tracked subject using tracking location from JointsCNN to the mobile device with the unmatched user account 1414

Match the tracked subject with the user account linked with the client application executing on the mobile device 1416

End 1418

Technique #4:
Ensemble
1/3

1600

Technique #4:
Ensemble
2/3

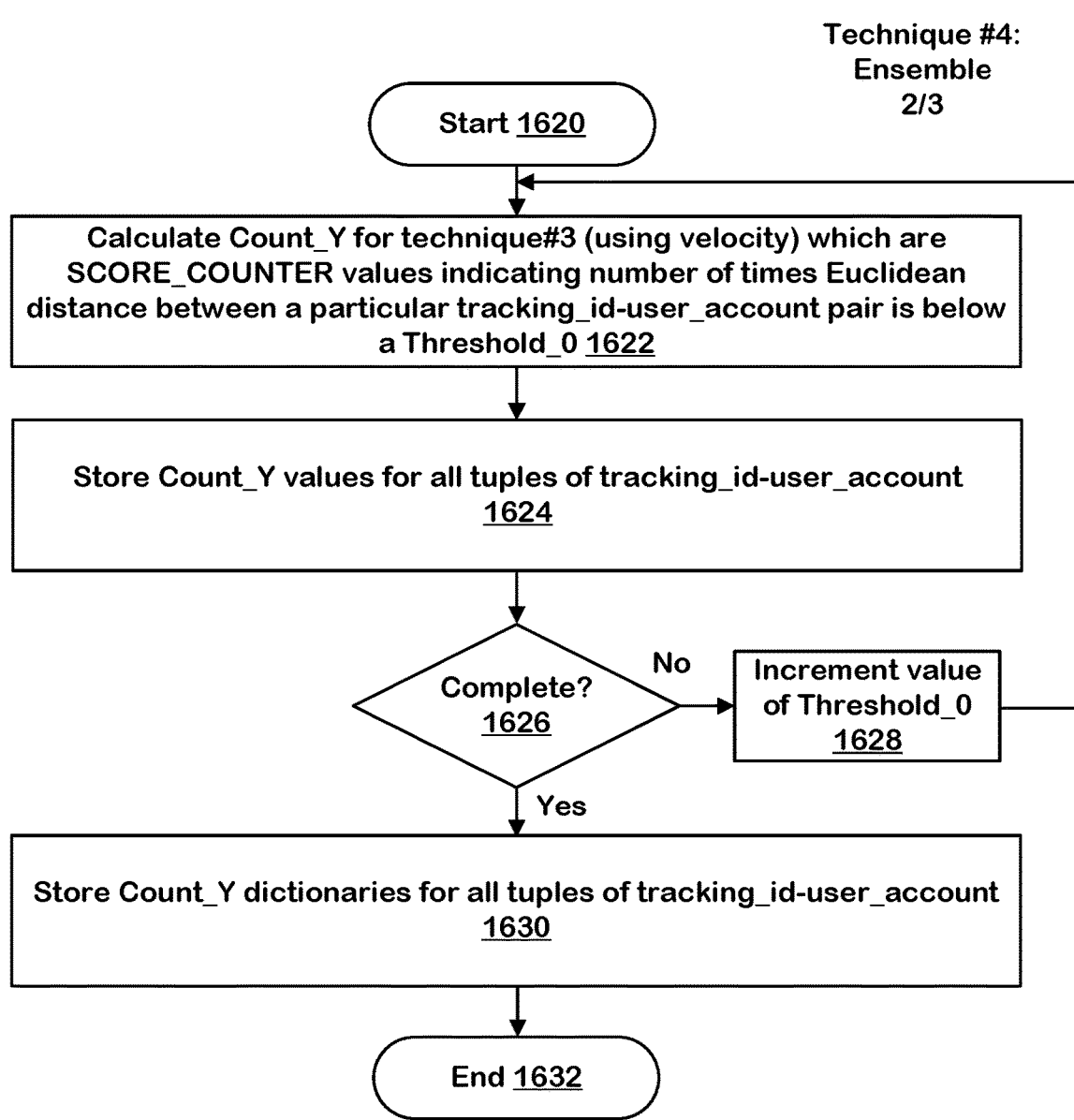

Start <u>1620</u>

Calculate Count_Y for technique#3 (using velocity) which are SCORE_COUNTER values indicating number of times Euclidean distance between a particular tracking_id-user_account pair is below a Threshold_0 <u>1622</u>

Store Count_Y values for all tuples of tracking_id-user_account <u>1624</u>

Complete? <u>1626</u>

No → Increment value of Threshold_0 <u>1628</u>

Yes

Store Count_Y dictionaries for all tuples of tracking_id-user_account <u>1630</u>

End <u>1632</u>

Technique #4:
Ensemble
3/3

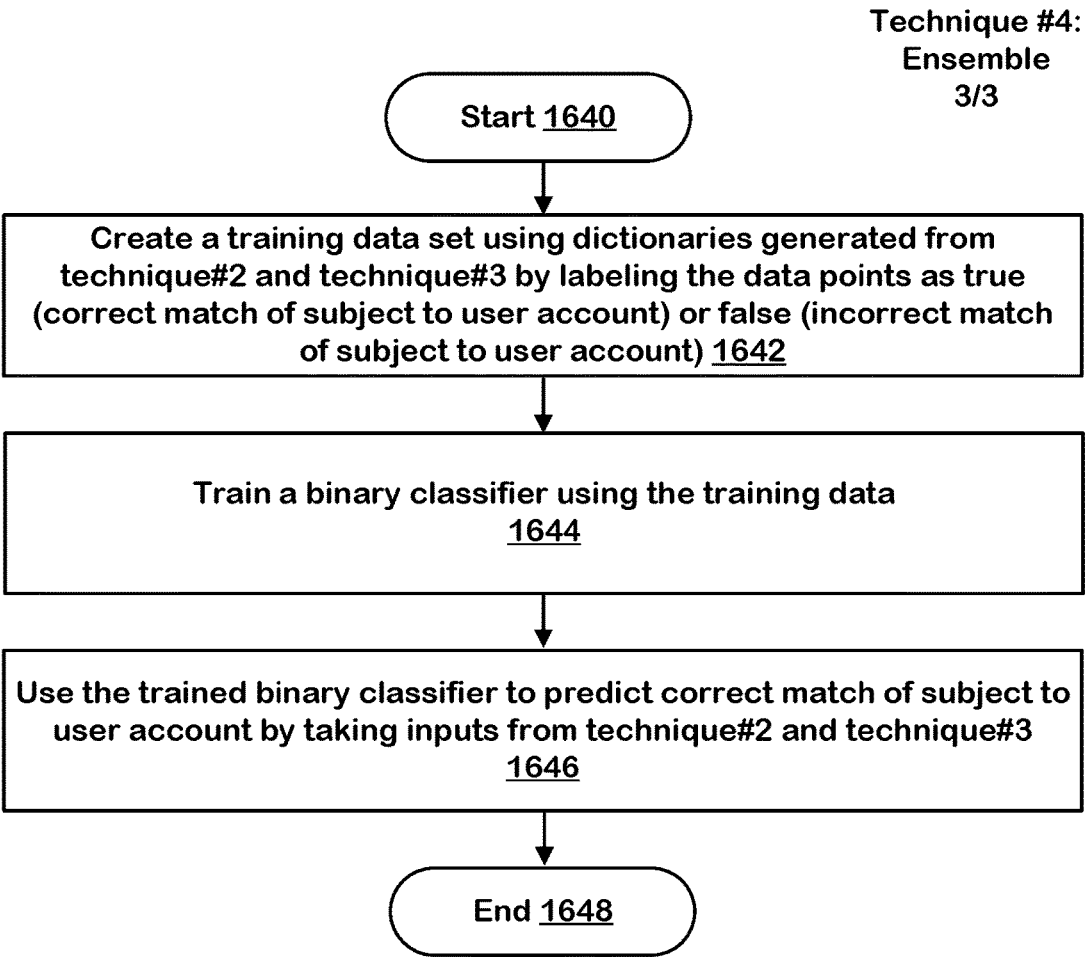

Start 1640

Create a training data set using dictionaries generated from technique#2 and technique#3 by labeling the data points as true (correct match of subject to user account) or false (incorrect match of subject to user account) 1642

Train a binary classifier using the training data
1644

Use the trained binary classifier to predict correct match of subject to user account by taking inputs from technique#2 and technique#3
1646

End 1648

FIG. 16C

SYSTEMS AND METHODS OF IDENTIFYING AND TRACKING SUBJECTS OVER MULTIPLE IDENTIFICATION INTERVALS BY RECEIVED COMBINED FEATURES

PRIORITY APPLICATIONS

This application is a continuation of U.S. patent application Ser. No. 17/572,590, filed 10 Jan. 2022 which is a continuation of U.S. patent application Ser. No. 16/388,765, filed on 18 Apr. 2019, now U.S. Pat. No. 11,232,575, issued 25 Jan. 2022. The priority applications are incorporated by reference herein in their entirety.

BACKGROUND

Field

The present invention relates to systems that track subjects in an area of real space.

Description of Related Art

A difficult problem in image processing arises when images of subjects from cameras are used to identify and track subjects in an area of real space such as a shopping store. The system needs to keep track of subjects in the area of real space for the duration of subject's presence. The subjects can leave the area of real space without communicating with the system. The system may also lose track of a subject due to other reasons. For example, when a subject is temporarily obscured, or moves to a location in the area of real space that is not in the field of view of cameras or sensors used to track the subjects or due to errors in the system.

As new subjects are located in the area of real space, the system needs to determine whether a new subject is a tracked subject who went missing for a period of time or a new subject who has recently entered the area of real space.

It is desirable to provide a system that can more effectively and automatically track subjects in the area of real space.

SUMMARY

A system, and method for operating a system, are provided for tracking subjects, in an area of real space. The system receives a plurality of sequences of images of corresponding fields of view in the real space. The system comprises a processing system which include logic that uses the sequences of images to locate subjects in the area of real space during identification intervals. The system includes logic that compares a current set of located subjects from a current identification interval with previous sets of located subjects from a plurality of previous identification intervals to track locations of tracked subjects in the area.

In one embodiment the processing system has access to a database storing a set of identified subjects (e.g., checked in, or otherwise linked to an account). The processing system includes logic to link tracked subjects with identified subjects. If a currently located subject cannot be linked with a tracked subject from previous identification intervals, then a procedure to link currently located subject to an account, such as a check-in routine, must be executed. Utilizing persistence logic as described herein, with more robust tracking persistence, the need execute repeated operations to link located subjects to accounts can be reduced.

In one embodiment, the logic that compares a current set of located subjects from a current identification interval with previous sets of located subjects from a plurality of previous identification intervals includes logic that detects a condition in which a number of located subjects in the current set does not match the number of located subjects from a first preceding identification interval in the plurality of previous intervals. Upon detection of the condition, the system compares at least one of the located subjects in the current set with the set of located subjects from a second preceding identification interval in the plurality of previous identification intervals, that precedes the first preceding identification interval.

In one embodiment, upon detection of the condition, if the set of located subjects from the first preceding identification interval includes N members, and the set of located subjects from the second preceding identification interval includes N members plus a missing tracked subject, and the current set of located subjects includes N members plus a candidate located subject. Then the system links the candidate located subject located from the current identification interval with the missing tracked subject located from the second preceding identification interval.

In such an embodiment, the linking the candidate located subject located from the current identification interval with the missing tracked subject located from the second preceding identification interval includes calculating difference between their respective location timestamps. The candidate located subject and the missing tracked subject are linked if a difference in a timestamp of time of location of the candidate located subject and the missing tracked subject is less than a first threshold.

In another embodiment, the linking the candidate located subject located from the current identification interval with the missing tracked subject located from the second preceding identification interval includes calculating distance between their respective locations in the area of real space. The candidate located subject and the missing tracked subject are linked if a distance between locations of the candidate located subject and the missing tracked subject is less than a second threshold.

In another embodiment, the linking the candidate located subject located from the current identification interval with the missing tracked subject located from the second preceding identification interval includes calculating their respective distances to a location in the area of real space also referred to as a sink (or the boundary of an exit or entrance region). The candidate located subject and the missing tracked subject are linked if a distance between their respective locations and the location of the area of real space is less than a third threshold.

In one embodiment, the system locates more than one candidate located subjects in a current identification interval (also referred to as third identification interval). In such an embodiment, the system includes the following logic to match located subjects in the current identification interval with tracked subjects in the preceding identification interval and update the tracked subjects. If the set of located subjects from the first preceding identification interval includes N members that are tracked, and the set of located subjects from the current identification interval includes N members plus more than one candidate located subjects. Then the system includes logic to simplify linking N members of the set of located subjects from the current identification interval to N members of the set of tracked subjects from the first preceding identification interval. The system prioritizes members of the set of located subjects from the current identification interval to identify a set of N located subjects to link to the set N tracked subjects from the first preceding identification interval.

In such an embodiment, the prioritizing the members of the set of located subjects from the current identification interval to identify the set of N located subjects includes logic that calculates distance between pairs of N members plus more than one candidate located subjects located from the current identification interval. The system then identifies the set of N located subjects by comparing the calculated distance with a second threshold.

In such an embodiment, the system includes logic that links a member of the set of N tracked subjects from the first preceding identification interval to a member of the set of N located subjects in the current identification interval. The system calculates distances between locations of the member of the set of N tracked subjects from the first preceding identification interval and the member of the set of N located subjects in the current identification interval. The system compares the calculated distances with a second threshold.

The system includes logic that links a member of the set of N tracked subjects from the first preceding identification interval to a member of the set of N located subjects in the current identification interval. The system calculates distances between locations of the member of the set of N tracked subjects from the first preceding identification interval and the member of the set of N located subjects in the current identification interval to a sink i.e., boundary of an exit or entrance region. The system compares the calculated distances with a third threshold.

The system links the member of the set of N tracked subjects from the first preceding identification interval to the member of the set of N located subjects in the current identification interval by determining that no other member of the set of N tracked subjects from the first preceding identification interval matches the member of the set of N located subjects in the current identification interval.

The system includes logic that calculates distance between location of the missing tracked subject and a designated unmonitored location in the area of real space and logic that calculates distance between location of the candidate located subject and the designated unmonitored location in the area of real space. The system compares the calculated distances with a third threshold. The system matches the candidate located subject from the current identification interval with the missing tracked subject by determining that no other subject in the set of tracked subjects in the second preceding identification interval and the set of located subjects in the current identification interval is closer to the designated unmonitored location than the third threshold.

In one embodiment, the plurality of sequences of images of corresponding fields of view in the area of real space are produced by a plurality of sensors in the area of real space producing synchronized sequences of images of respective fields of view. In one embodiment, the sensors comprise cameras.

In one embodiment, one image in each of the plurality of sequences is captured in each image capture cycle, and identification intervals correspond with the image capture cycles. In another embodiment, the identification interval comprises more than one image capture cycles.

In one embodiment, the logic that uses the sequences of images to locate subjects in the area of real space during identification intervals includes locates a subject as a constellation of joints in the area of real space, a joint in the constellation of joints including a location represented by positions in three dimensions of the area of real space and a timestamp. In one embodiment, the timestamp corresponds with the time at which the image is captured in the image capture cycle.

Also described herein is a system a processing system receiving a plurality of sequences of images of corresponding fields of view in the real space, including logic that uses the sequences of images to locate subjects in the area of real space during identification intervals; logic that matches located subjects from a plurality of identification intervals to identify tracked subjects; logic that links tracked subjects to user accounts, to maintain a record of identified subjects in the area of real space; and logic that compares located subjects in a current identification interval with identified subjects in a plurality of preceding identification intervals to update locations of the identified subjects, including when there is a mismatch in numbers of located subjects in the current identification interval with numbers of identified subjects in a first preceding identification interval, then comparing at least one of the located subjects in the current identification interval with identified subjects in at least one more other preceding identification interval.

In embodiments describe herein, the logic to link tracked subjects with user accounts operates without personal biometric information about users.

Also, in embodiments described herein, the logic to link tracked subjects with user accounts includes a procedure to identify locations of mobile devices executing client applications in the area of real space, and matching locations of the mobile devices with locations of the tracked or located subjects.

Methods and computer program products which can be executed by computer systems are also described herein.

Functions described herein, including but not limited to identifying and tracking a candidate located subject at a particular identification interval in an area of real space and to matching the candidate located subject to the missing tracked subject located at different identification intervals and data structure configured for use to match the candidate located subject to the missing tracked subject present complex problems of computer engineering, relating for example to the type of image data to be processed, what processing of the image data to perform, and how to determine actions from the image data with high reliability.

Other aspects and advantages of the present invention can be seen on review of the drawings, the detailed description and the claims, which follow.

BRIEF DESCRIPTION OF THE DRAWINGS

FIG. 3A shows an example data structure for storing joints information of subjects.

FIG. 3B is an example data structure for storing a subject including the information of associated joints.

FIG. 7 is an example flow chart illustrating process steps for matching subjects located in the current identification interval to tracked subjects in the first preceding identification interval when more than one located subjects in the current identification interval are not matched with any tracked subject in the first preceding identification interval.

FIG. 9 is an example flow chart with process steps to match the candidate located subject close to the designated unmonitored location to a missing tracked subject.

FIG. 13 is a flowchart showing process steps for identifying a subject by matching the tracked subject to a user account using a semaphore image displayed on a mobile computing device.

FIG. 14 is a flowchart showing process steps for identifying a subject by matching a tracked subject to a user account using service location of a mobile computing device.

FIG. 16B is a flowchart showing a second part of process steps for matching a tracked subject to a user account using a network ensemble.

FIG. 16C is a flowchart showing a third part of process steps for matching a tracked subject to a user account using a network ensemble.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

System Overview

A system and various implementations of the subject technology are described with reference to FIGS. 1-17. The system and processes are described with reference to FIG. 1, an architectural level schematic of a system in accordance with an implementation. Because FIG. 1 is an architectural diagram, certain details are omitted to improve the clarity of the description.

Figure 1:
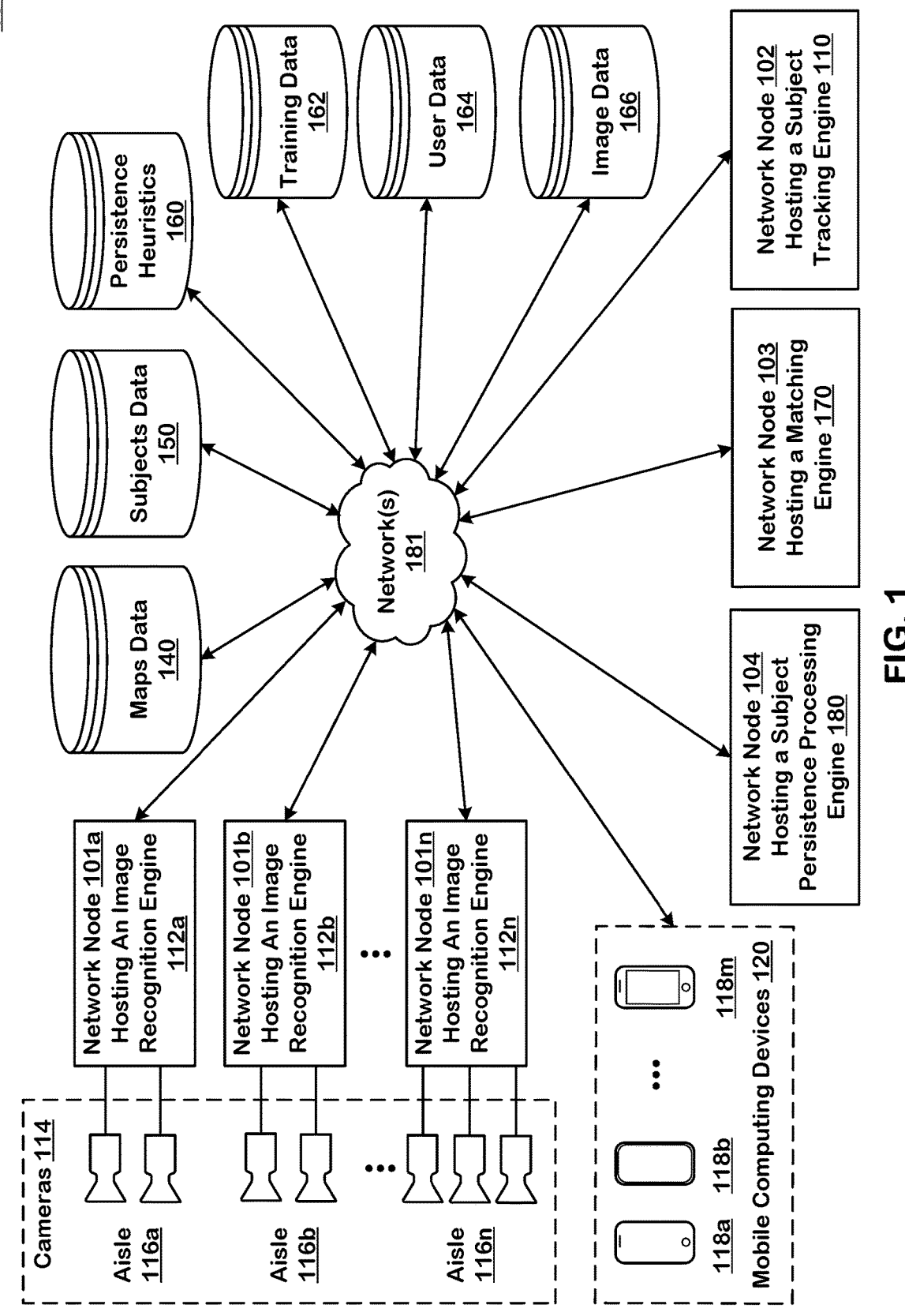
FIG. 1 illustrates an architectural level schematic of a system in which a subject persistence processing engine tracks subjects in an area of real space.

The discussion of FIG. 1 is organized as follows. First, the elements of the system are described, followed by their interconnections. Then, the use of the elements in the system is described in greater detail.

FIG. 1 provides a block diagram level illustration of a system 100. The system 100 includes cameras 114, network nodes hosting image recognition engines 112*a*, 112*b*, and 112*n*, mobile computing devices 118*a*, 118*b*, 118*m* (collectively referred as mobile computing devices 120), a subject persistence processing engine 180 deployed in a network node 104 (or nodes) on the network, a network node 102 hosting a subject tracking engine 110, and a matching engine 170 deployed in a network node or nodes (also known as a processing platform) 103. The network nodes can include or have access to memory supporting subject tracking and persistence, including in this example a maps database 140, a subjects database 150, a persistence heuristics database 160, a training database 162, a user account database 164, an image database 166, and a communication network or networks 181. The network nodes can host only one image recognition engine, or several image recognition engines.

The embodiment described here uses cameras in the visible range which can generate for example RGB color output images. In other embodiments, different kinds of sensors are used to produce sequences of images. Examples of such sensors include, ultrasound sensors, thermal sensors, Lidar, etc., which are used to produce sequences of images of corresponding fields of view in the real space. In one embodiment, sensors can be used in addition to the cameras 114. Multiple sensors can be synchronized in time with each other, so that frames are captured by the sensors at the same time, or close in time, and at the same frame capture rate. All of the embodiments described herein can include sensors other than or in addition to cameras.

As used herein, a network node is an addressable hardware device or virtual device that is attached to a network, and is capable of sending, receiving, or forwarding information over a communications channel to or from other network nodes. Examples of electronic devices which can be deployed as hardware network nodes include all varieties of computers, workstations, laptop computers, handheld computers, and smartphones. Network nodes can be implemented in a cloud-based server system. More than one virtual device configured as a network node can be implemented using a single physical device.

The databases 140, 150, 160, 162, 164, and 166 are stored on one or more non-transitory computer readable media. As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein. Thus in FIG. 1, the databases 140, 150, 160, 162, 164, and 166 can be considered to be a single database.

For the sake of clarity, only three network nodes hosting image recognition engines are shown in the system 100. However, any number of network nodes hosting image recognition engines can be connected to the subject tracking engine 110 through the network(s) 181. Similarly, the image recognition engine, the subject tracking engine, the subject persistence processing engine, the matching engine and other processing engines described herein can execute using more than one network node in a distributed architecture.

The interconnection of the elements of system 100 will now be described. Network(s) 181 couples the network nodes 101a, 101b, and 101n, respectively, hosting image recognition engines 112a, 112b, and 112n, the network node 104 hosting the subject persistence processing engine 180, the network node 102 hosting the subject tracking engine 110, the network node 103 hosting the matching engine 170, the maps database 140, the subjects database 150, the persistence heuristics database 160, the training database 162, the user database 164, the image database 166 and the mobile computing devices 120. Cameras 114 are connected to the subject tracking engine 110 through network nodes hosting image recognition engines 112a, 112b, and 112n. In one embodiment, the cameras 114 are installed in a shopping store such that sets of cameras 114 (two or more) with overlapping fields of view are positioned to capture images of real space in the store. In FIG. 1, two cameras are arranged over aisle 116a, two cameras are arranged over aisle 116b, and three cameras are arranged over aisle 116n. Cameras are installed over open spaces, aisles, and near exits and entrances to the shopping store. In such an embodiment, the cameras are configured with the goal that customers moving in the shopping store are present in the field of view of two or more cameras at any moment in time.

Cameras 114 can be synchronized in time with each other, so that images are captured at the image capture cycles at the same time, or close in time, and at the same image capture rate. The cameras 114 can send respective continuous streams of images at a predetermined rate to network nodes hosting image recognition engines 112a-112n. Images captured in all the cameras covering an area of real space at the same time, or close in time, are synchronized in the sense that the synchronized images can be identified in the processing engines as representing different views of subjects having fixed positions in the real space. For example, in one embodiment, the cameras send image frames at the rates of 30 frames per second (fps) to respective network nodes hosting image recognition engines 112a-112n. Each frame has a timestamp, identity of the camera (abbreviated as "camera_id"), and a frame identity (abbreviated as "frame_id") along with the image data. As described above other embodiments of the technology disclosed can use different types of sensors such as image sensors, ultrasound sensors, thermal sensors, Lidar, etc., Cameras are connected to respective image recognition engines. For example, in FIG. 1, the two cameras installed over the aisle 116a are connected to the network node 101a hosting an image recognition engine 112a. Likewise, the two cameras installed over aisle 116b are connected to the network node 101b hosting an image recognition engine 112b. Each image recognition engine 112a-112n hosted in a network node or nodes 101a-101n, separately processes the image frames received from one camera each in the illustrated example. In an embodiment of a subject tracking system described herein, cameras are installed overhead, so that in combination the fields of view of the cameras encompass an area of real space in which the tracking is to be performed, such as in a shopping store.

In one embodiment, each image recognition engine 112a, 112b, and 112n is implemented as a deep learning algorithm such as a convolutional neural network (abbreviated CNN). In such an embodiment, the CNN is trained using training database. In an embodiment described herein, image recognition of subjects in the real space is based on identifying and grouping features of the subjects such as joints, recognizable in the images, where the groups of joints can be attributed to an individual subject. For this joints-based analysis, the training database has a large collection of images for each of the different types of joints for subjects. In the example embodiment of a shopping store, the subjects are the customers moving in the aisles between the shelves. In an example embodiment, during training of the CNN, the system 100 is referred to as a "training system." After training the CNN using the training database, the CNN is switched to production mode to process images of customers in the shopping store in real time.

In an example embodiment, during production, the system 100 is referred to as a runtime system (also referred to as an inference system). The CNN in each image recognition engine produces arrays of joints data structures for images in its respective stream of images. In an embodiment as described herein, an array of joints data structures is produced for each processed image, so that each image recognition engine 112a-112n produces an output stream of arrays of joints data structures. These arrays of joints data structures from cameras having overlapping fields of view are further processed to form groups of joints, and to identify such groups of joints as subjects. The subjects can be tracked by the system using a tracking identifier "tracking_id" during their presence in the area of real space. The tracked subjects can be saved in the subjects database 150.

The subject tracking engine 110, hosted on the network node 102 receives, in this example, continuous streams of arrays of joints data structures for the subjects from image recognition engines 112a-112n. The subject tracking engine 110 processes the arrays of joints data structures identified from the sequences of images received from the cameras at image capture cycles. It then translates the coordinates of the elements in the arrays of joints data structures corresponding to images in different sequences into candidate joints having coordinates in the real space. For each set of synchronized images, the combination of candidate joints identified throughout the real space can be considered, for the purposes of analogy, to be like a galaxy of candidate joints. For each succeeding point in time, movement of the candidate joints is recorded so that the galaxy changes over time. The output of the subject tracking engine 110 is used to locate subjects in the area of real space during identification intervals. One image in each of the plurality of sequences of images, produced by the cameras, is captured in each image capture cycle.

The subject tracking engine 110 uses logic to determine groups or sets of candidate joints having coordinates in real space as subjects in the real space. For the purposes of analogy, each set of candidate points is like a constellation of candidate joints at each point in time. In one embodiment, these constellations of joints are generated per identification interval as representing a located subject. Subjects are located during an identification interval using the constellation of joints. The constellations of candidate joints can move over time. A time sequence analysis of the output of the subject tracking engine 110 over a period of time, such as over multiple temporally ordered identification intervals, identifies movements of subjects in the area of real space. The system can store the subject data including unique identifiers, joints and their locations in the real space in the subject database 150.

In an example embodiment, the logic to identify sets of candidate joints (i.e. constellations) as representing a located subject comprises heuristic functions is based on physical relationships amongst joints of subjects in real space. These heuristic functions are used to locate sets of candidate joints as subjects. The sets of candidate joints comprise individual candidate joints that have relationships according to the heuristic parameters with other individual candidate joints and subsets of candidate joints in a given set that has been located, or can be located, as an individual subject.

Located subjects in one identification interval can be matched with located subjects in other identification intervals based on location and timing data. Located subjects matched this way are referred to herein as tracked subjects, and their location can be tracked in the system as they move about the area of real space across identification intervals. In the system, a list of tracked subjects from each identification interval over some time window can be maintained, including for example by assigning a unique tracking identifier to members of a list of located subjects for each identification interval, or otherwise. Located subjects in a current identification interval are processed to determine whether they correspond to tracked subjects from one or more previous identification intervals. If they are matched, then the location of the tracked subject is updated to the location of the current identification interval. Located subjects not matched with tracked subjects from previous intervals are further processed to determine whether they represent newly arrived subjects, or subjects that had been tracked before, but have been missing from an earlier identification interval.

For the purposes of tracking subjects, the subject persistence processing engine 180 compares the newly located subjects in the current identification interval with one or more preceding identification intervals. The system includes logic to determine if the newly located subject is a missing tracked subject previously tracked in an earlier identification interval and stored in the subjects database but who was not matched with a located subject in an immediately preceding identification interval. If the newly located subject in the current identification interval is matched to the missing tracked subject located in the earlier identification interval, the system updates the missing tracked subject in the subject database 150 using the candidate located subject located from the current identification interval.

In one embodiment, in which the subject is represented as a constellation of joints as discussed above, the positions of the joints of the missing tracked subject is updated in the database with the positions of the corresponding joints of the candidate located subject located from the current identification interval. In this embodiment, the system stores information for tracked subject in the subject database 150. This can include information such as the identification intervals in which the tracked subject is located. Additionally, the system can also store, for a tracked subject, the identification intervals in which the tracked subject is not located. In another embodiment, the system can store missing tracked subjects in a missing subjects database, or tag tracked subjects as missing, along with additional information such as the identification interval in which the tracked subject went missing and last known location of the missing tracked subject in the area of real space. In some embodiments, the subject status as tracked and located, can be stored per identification interval.

The subject persistence engine 180 can process a variety of subject persistence scenarios. For example, a situation in which more than one candidate located subjects are located in the current identification interval but not matched with tracked subjects, or a situation when a located subject moves to a designated unmonitored location in the area of real space but reappears after some time and is located near the designated unmonitored location in the current identification interval. The designated unmonitored location in the area of real space can be a restroom, for example. The technology can use persistence heuristics to perform the above analysis. In one embodiment, the subject persistence heuristics are stored in the persistence heuristics database 160.

In the example of a shopping store the customers (also referred to as subjects above) move in the aisles and in open spaces. The customers take items from inventory locations on shelves in inventory display structures. In one example of inventory display structures, shelves are arranged at different levels (or heights) from the floor and inventory items are stocked on the shelves. The shelves can be fixed to a wall or placed as freestanding shelves forming aisles in the shopping store. Other examples of inventory display structures include, pegboard shelves, magazine shelves, lazy susan shelves, warehouse shelves, and refrigerated shelving units. The inventory items can also be stocked in other types of inventory display structures such as stacking wire baskets, dump bins, etc. The customers can also put items back on the same shelves from where they were taken or on another shelf.

In one embodiment, the image analysis is anonymous, i.e., a unique tracking identifier assigned to a subject created through joints analysis does not identify personal identification details (such as names, email addresses, mailing addresses, credit card numbers, bank account numbers, driver's license number, etc.) of any specific subject in the real space. The data stored in the subjects database 150 does not include any personal identification information. The operations of the subject persistence processing engine 180 and the subject tracking engine 110 do not use any personal identification including biometric information associated with the subjects.

In one embodiment, the tracked subjects are identified by linking them to respective "user accounts" containing for example preferred payment method provided by the subject. When linked to a user account, a tracked subject is characterized herein as an identified subject. Track subjects are linked with items picked up on the store, and linked with a user account, for example, and upon exiting the store, an invoice can be generated and delivered to the identified subject, or a financial transaction executed on line to charge the identified subject using the payment method associated to their accounts. The identified subjects can be uniquely identified, for example, by unique account identifiers or subject identifiers, etc. In the example of a cashier-less store, as the customer completes shopping by taking items from the shelves, the system processes payment of items bought by the customer.

The system includes a matching engine 170 (hosted on the network node 103) to process signals received from mobile computing devices 120 (carried by the subjects) to match the identified subjects with user accounts. The matching can be performed by identifying locations of mobile devices executing client applications in the area of real space (e.g., the shopping store) and matching locations of mobile devices with locations of subjects, without use of personal identifying biometric information from the images.

The actual communication path to the network nodes 104 hosting the subject persistence processing engine 180 and the network node 102 hosting the subject tracking engine 110, through the network 181 can be point-to-point over public and/or private networks. The communications can occur over a variety of networks 181, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as a LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™, Truviso™, Amazon Elasticsearch Service™, Amazon Web Services™ (AWS), IBM Info-Sphere™, Borealis™, and Yahoo! S4™.

Camera Arrangement

The cameras 114 are arranged to track subjects (or entities) in a three dimensional (abbreviated as 3D) real space. In the example embodiment of the shopping store, the real space can include the area of the shopping store where items for sale are stacked in shelves. A point in the real space can be represented by an (x, y, z) coordinate system. Each point in the area of real space for which the system is deployed is covered by the fields of view of two or more cameras 114.

Figure 2A:
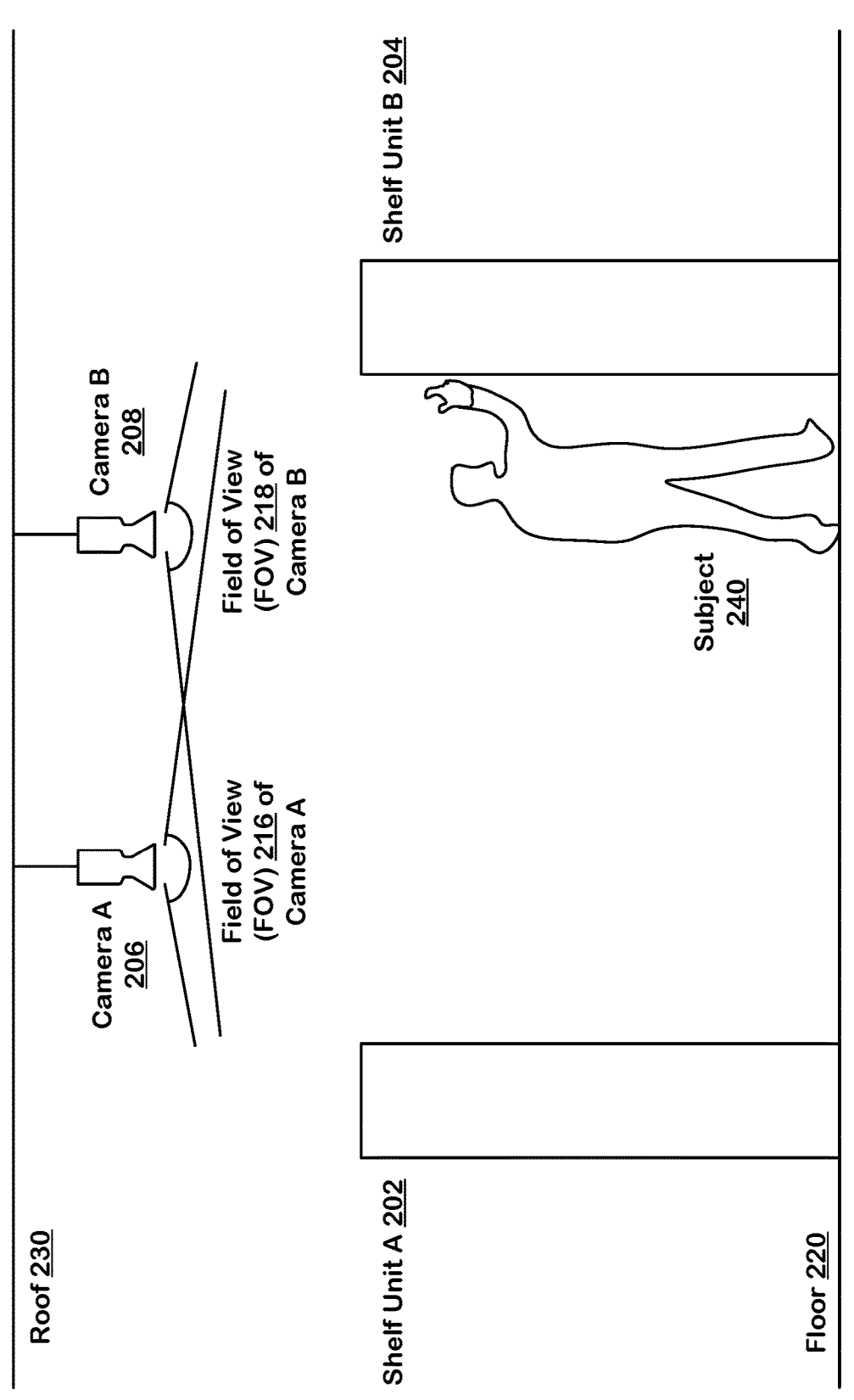
FIG. 2A is a side view of an aisle in a shopping store illustrating a subject, inventory display structures and a camera arrangement in a shopping store.

In a shopping store, the shelves and other inventory display structures can be arranged in a variety of manners, such as along the walls of the shopping store, or in rows forming aisles or a combination of the two arrangements. FIG. 2A shows an arrangement of shelf unit A 202 and shelf unit B 204, forming an aisle 116*a*, viewed from one end of the aisle 116*a*. Two cameras, camera A 206 and camera B 208 are positioned over the aisle 116*a* at a predetermined distance from a roof 230 and a floor 220 of the shopping store above the inventory display structures, such as shelf units A 202 and shelf unit B 204. The cameras 114 comprise cameras disposed over and having fields of view encompassing respective parts of the inventory display structures and floor area in the real space. For example, the field of view 216 of camera A 206 and field of view 218 of camera B 208 overlap as shown in FIG. 2A. The locations of subjects are represented by their positions in three dimensions of the area of real space. In one embodiment, the subjects are represented as constellation of joints in real space. In this embodiment, the positions of the joints in the constellation of joint are used to determine the location of a subject in the area of real space.

In the example embodiment of the shopping store, the real space can include the entire floor 220 in the shopping store. Cameras 114 are placed and oriented such that areas of the floor 220 and shelves can be seen by at least two cameras. The cameras 114 also cover floor space in front of the shelves 202 and 204. Camera angles are selected to have both steep perspective, straight down, and angled perspectives that give more full body images of the customers. In one example embodiment, the cameras 114 are configured at an eight (8) foot height or higher throughout the shopping store. In one embodiment, the area of real space includes one or more designated unmonitored locations such as restrooms.

Entrances and exits for the area of real space, which act as sources and sinks of subjects in the subject tracking engine, are stored in the maps database. Also, designated unmonitored locations are not in the field of view of cameras 114, which can represent areas in which tracked subjects may enter, but must return into the area being tracked after some time, such as a restroom. The locations of the designated unmonitored locations are stored in the maps database 140. The locations can include the positions in the real space defining a boundary of the designated unmonitored location and can also include location of one or more entrances or exits to the designated unmonitored location.

Three Dimensional Scene Generation

Figure 2B:
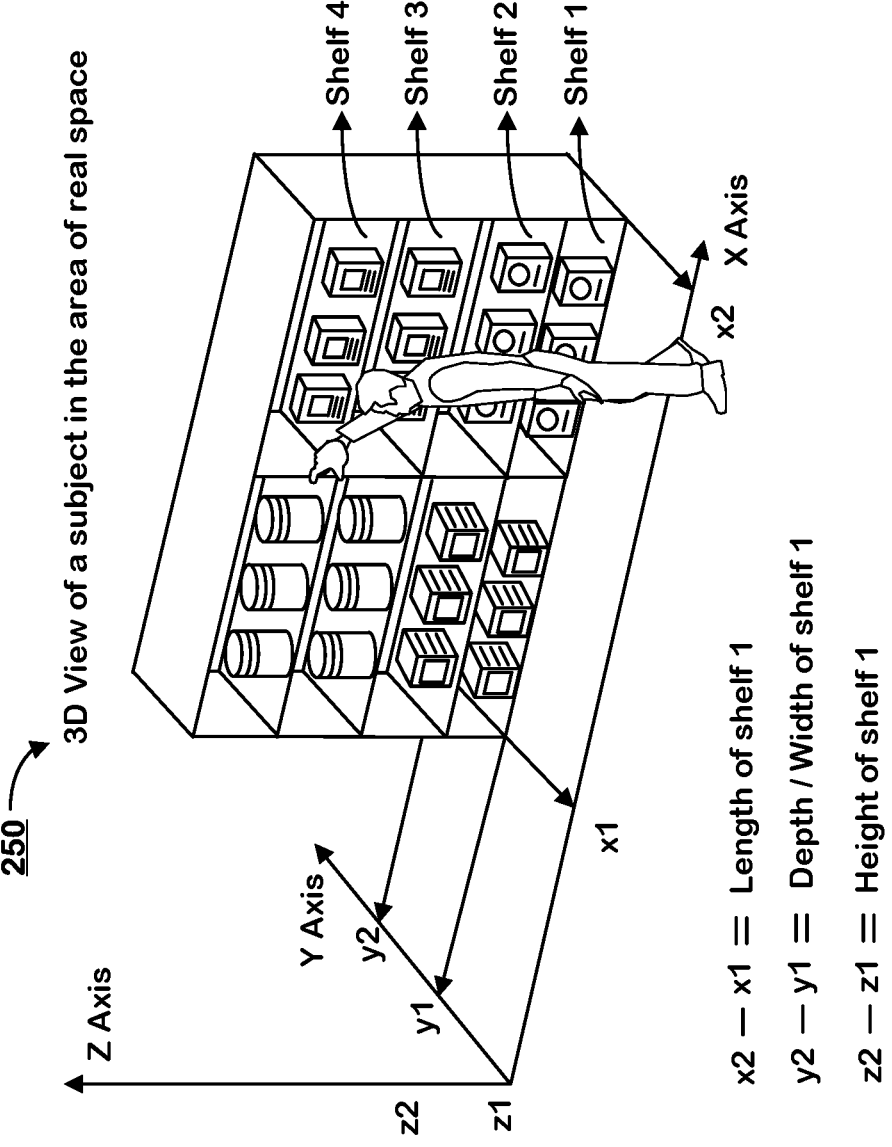
FIG. 2B is a perspective view, illustrating a subject taking an item from a shelf in the inventory display structure in the area of real space.

In FIG. 2A, a subject 240 is standing by an inventory display structure shelf unit B 204, with one hand positioned close to a shelf (not visible) in the shelf unit B 204. FIG. 2B is a perspective view of the shelf unit B 204 with four shelves, shelf 1, shelf 2, shelf 3, and shelf 4 positioned at different levels from the floor. The inventory items are stocked on the shelves.

A location in the real space is represented as a (x, y, z) point of the real space coordinate system. "x" and "y" represent positions on a two-dimensional (2D) plane which can be the floor 220 of the shopping store. The value "z" is the height of the point above the 2D plane at floor 220 in one configuration. The system combines 2D images from two or more cameras to generate the three dimensional positions of joints in the area of real space. This section presents a description of the process to generate 3D coordinates of joints. The process is also referred to as 3D scene generation.

Before using the system 100 in training or inference mode to track the inventory items, two types of camera calibrations: internal and external, are performed. In internal calibration, the internal parameters of the cameras 114 are calibrated. Examples of internal camera parameters include focal length, principal point, skew, fisheye coefficients, etc. A variety of techniques for internal camera calibration can be used. One such technique is presented by Zhang in "A flexible new technique for camera calibration" published in IEEE Transactions on Pattern Analysis and Machine Intelligence, Volume 22, No. 11, November 2000.

In external calibration, the external camera parameters are calibrated in order to generate mapping parameters for translating the 2D image data into 3D coordinates in real space. In one embodiment, one subject (also referred to as a multi-joint subject), such as a person, is introduced into the real space. The subject moves through the real space on a path that passes through the field of view of each of the cameras 114. At any given point in the real space, the subject is present in the fields of view of at least two cameras forming a 3D scene. The two cameras, however, have a different view of the same 3D scene in their respective two-dimensional (2D) image planes. A feature in the 3D scene such as a left-wrist of the subject is viewed by two cameras at different positions in their respective 2D image planes.

A point correspondence is established between every pair of cameras with overlapping fields of view for a given scene. Since each camera has a different view of the same 3D scene, a point correspondence is two pixel locations (one location from each camera with overlapping field of view) that represent the projection of the same point in the 3D scene. Many point correspondences are identified for each 3D scene using the results of the image recognition engines 112a to 112n for the purposes of the external calibration. The image recognition engines identify the position of a joint as (x, y) coordinates, such as row and column numbers, of pixels in the 2D image space of respective cameras 114. In one embodiment, a joint is one of 19 different types of joints of the subject. As the subject moves through the fields of view of different cameras, the tracking engine 110 receives (x, y) coordinates of each of the 19 different types of joints of the subject used for the calibration from cameras 114 per image.

For example, consider an image from a camera A and an image from a camera B both taken at the same moment in time and with overlapping fields of view. There are pixels in an image from camera A that correspond to pixels in a synchronized image from camera B. Consider that there is a specific point of some object or surface in view of both camera A and camera B and that point is captured in a pixel of both image frames. In external camera calibration, a multitude of such points are identified and referred to as corresponding points. Since there is one subject in the field of view of camera A and camera B during calibration, key joints of this subject are identified, for example, the center of left wrist. If these key joints are visible in image frames from both camera A and camera B then it is assumed that these represent corresponding points. This process is repeated for many image frames to build up a large collection of corresponding points for all pairs of cameras with overlapping fields of view. In one embodiment, images are streamed off of all cameras at a rate of 30 FPS (frames per second) or more and a resolution of 720 pixels in full RGB (red, green, and blue) color. These images are in the form of one-dimensional arrays (also referred to as flat arrays).

The large number of images collected above for a subject is used to determine corresponding points between cameras with overlapping fields of view. Consider two cameras A and B with overlapping field of view. The plane passing through camera centers of cameras A and B and the joint location (also referred to as feature point) in the 3D scene is called the "epipolar plane". The intersection of the epipolar plane with the 2D image planes of the cameras A and B defines the "epipolar line". Given these corresponding points, a transformation is determined that can accurately map a corresponding point from camera A to an epipolar line in camera B's field of view that is guaranteed to intersect the corresponding point in the image frame of camera B. Using the image frames collected above for a subject, the transformation is generated. It is known in the art that this transformation is non-linear. The general form is furthermore known to require compensation for the radial distortion of each camera's lens, as well as the non-linear coordinate transformation moving to and from the projected space. In external camera calibration, an approximation to the ideal non-linear transformation is determined by solving a non-linear optimization problem. This non-linear optimization function is used by the subject tracking engine 110 to identify the same joints in outputs (arrays of joint data structures) of different image recognition engines 112a to 112n, processing images of cameras 114 with overlapping fields of view. The results of the internal and external camera calibration are stored in a calibration database.

A variety of techniques for determining the relative positions of the points in images of cameras 114 in the real space can be used. For example, Longuet-Higgins published, "A computer algorithm for reconstructing a scene from two projections" in Nature, Volume 293, 10 Sep. 1981. This paper presents computing a three-dimensional structure of a scene from a correlated pair of perspective projections when spatial relationship between the two projections is unknown. Longuet-Higgins paper presents a technique to determine the position of each camera in the real space with respect to other cameras. Additionally, their technique allows triangulation of a subject in the real space, identifying the value of the z-coordinate (height from the floor) using images from cameras 114 with overlapping fields of view. An arbitrary point in the real space, for example, the end of a shelf unit in one corner of the real space, is designated as a (0, 0, 0) point on the (x, y, z) coordinate system of the real space.

In an embodiment of the technology, the parameters of the external calibration are stored in two data structures. The first data structure stores intrinsic parameters. The intrinsic parameters represent a projective transformation from the 3D coordinates into 2D image coordinates. The first data structure contains intrinsic parameters per camera as shown below. The data values are all numeric floating point numbers. This data structure stores a 3×3 intrinsic matrix, represented as "K" and distortion coefficients. The distortion coefficients include six radial distortion coefficients and two tangential distortion coefficients. Radial distortion occurs when light rays bend more near the edges of a lens than they do at its optical center. Tangential distortion occurs when the lens and the image plane are not parallel. The following data structure shows values for the first camera only. Similar data is stored for all the cameras 114.

```
{
  1: {
    K: [[x, x, x], [x, x, x], [x, x, x]],
    distortion_coefficients: [x, x, x, x, x, x, x, x]
  },
}
```

The second data structure stores per pair of cameras: a 3×3 fundamental matrix (F), a 3×3 essential matrix (E), a 3×4 projection matrix (P), a 3×3 rotation matrix (R) and a 3×1 translation vector (t). This data is used to convert points in one camera's reference frame to another camera's reference frame. For each pair of cameras, eight homography coefficients are also stored to map the plane of the floor 220 from one camera to another. A fundamental matrix is a relationship between two images of the same scene that constrains where the projection of points from the scene can occur in both images. Essential matrix is also a relationship between two images of the same scene with the condition that the cameras are calibrated. The projection matrix gives a vector space projection from 3D real space to a subspace. The rotation matrix is used to perform a rotation in Euclidean space. Translation vector "t" represents a geometric transformation that moves every point of a figure or a space by the same distance in a given direction. The homography_floor_coefficients are used to combine images of features of subjects on the floor 220 viewed by cameras with overlapping fields of views. The second data structure is shown below. Similar data is stored for all pairs of cameras. As indicated previously, the x's represents numeric floating point numbers.

```
{
  1: {
    2: {
      F: [[x, x, x], [x, x, x], [x, x, x]],
      E: [[x, x, x], [x, x, x], [x, x, x]],
      P: [[x, x, x, x], [x, x, x, x], [x, x, x, x]],
      R: [[x, x, x], [x, x, x], [x, x, x]],
      t: [x, x, x],
      homography_floor_coefficients: [x, x, x, x, x, x, x, x]
    }
  },
  .......
}
```

Two Dimensional and Three Dimensional Maps

An inventory location, such as a shelf, in a shopping store can be identified by a unique identifier in a map database (e.g., shelf_id). Similarly, a shopping store can also be identified by a unique identifier (e.g., store_id) in a map database. The two dimensional (2D) and three dimensional (3D) maps database 140 identifies inventory locations in the area of real space along the respective coordinates. For example, in a 2D map, the locations in the maps define two dimensional regions on the plane formed perpendicular to the floor 220 i.e., XZ plane as shown in FIG. 2B. The map defines an area for inventory locations where inventory items are positioned. In FIG. 3, a 2D location of the shelf unit shows an area formed by four coordinate positons (x1, y1), (x1, y2), (x2, y2), and (x2, y1). These coordinate positions define a 2D region on the floor 220 where the shelf is located. Similar 2D areas are defined for all inventory display structure locations, entrances, exits, and designated unmonitored locations in the shopping store. This information is stored in the maps database 140.

In a 3D map, the locations in the map define three dimensional regions in the 3D real space defined by X, Y, and Z coordinates. The map defines a volume for inventory locations where inventory items are positioned. In FIG. 2B, a 3D view 250 of shelf 1 in the shelf unit shows a volume formed by eight coordinate positions (x1, y1, z1), (x1, y1, z2), (x1, y2, z1), (x1, y2, z2), (x2, y1, z1), (x2, y1, z2), (x2, y2, z1), (x2, y2, z2) defining a 3D region in which inventory items are positioned on the shelf 1. Similar 3D regions are defined for inventory locations in all shelf units in the shopping store and stored as a 3D map of the real space (shopping store) in the maps database 140. The coordinate positions along the three axes can be used to calculate length, depth and height of the inventory locations as shown in FIG. 2B.

In one embodiment, the map identifies a configuration of units of volume which correlate with portions of inventory locations on the inventory display structures in the area of real space. Each portion is defined by starting and ending positions along the three axes of the real space. Like 2D maps, the 3D maps can also store locations of all inventory display structure locations, entrances, exits and designated unmonitored locations in the shopping store.

The items in a shopping store are arranged in some embodiments according to a planogram which identifies the inventory locations (such as shelves) on which a particular item is planned to be placed. For example, as shown in an illustration 250 in FIG. 2B, a left half portion of shelf 3 and shelf 4 are designated for an item (which is stocked in the form of cans).

Joints Data Structure

The image recognition engines 112a-112n receive the sequences of images from cameras 114 and process images to generate corresponding arrays of joints data structures. The system includes processing logic that uses the sequences of images produced by the plurality of camera to track locations of a plurality of subjects (or customers in the shopping store) in the area of real space. In one embodiment, the image recognition engines 112a-112n identify one of the 19 possible joints of a subject at each element of the image, usable to identify subjects in the area who may be moving in the area of real space, standing and looking at an inventory item, or taking and putting inventory items. The possible joints can be grouped in two categories: foot joints and non-foot joints. The 19$^{th}$ type of joint classification is for all non-joint features of the subject (i.e. elements of the image not classified as a joint). In other embodiments, the image recognition engine may be configured to identify the locations of hands specifically. Also, other techniques, such as a user check-in procedure or biometric identification processes, may be deployed for the purposes of identifying the subjects and linking the subjects with detected locations of their hands as they move throughout the store.

Foot Joints:
    Ankle joint (left and right)

Non-Foot Joints:
    Neck
    Nose
    Eyes (left and right)
    Ears (left and right)
    Shoulders (left and right)
    Elbows (left and right)
    Wrists (left and right)
    Hip (left and right)
    Knees (left and right)

Not a Joint

An array of joints data structures for a particular image classifies elements of the particular image by joint type, time of the particular image, and the coordinates of the elements in the particular image. In one embodiment, the image recognition engines 112a-112n are convolutional neural networks (CNN), the joint type is one of the 19 types of joints of the subjects, the time of the particular image is the timestamp of the image generated by the source camera 114 for the particular image, and the coordinates (x, y) identify the position of the element on a 2D image plane.

The output of the CNN is a matrix of confidence arrays for each image per camera. The matrix of confidence arrays is transformed into an array of joints data structures. A joints data structure 310 as shown in FIG. 3A is used to store the information of each joint. The joints data structure 310 identifies x and y positions of the element in the particular image in the 2D image space of the camera from which the image is received. A joint number identifies the type of joint identified. For example, in one embodiment, the values range from 1 to 19. A value of 1 indicates that the joint is a left ankle, a value of 2 indicates the joint is a right ankle and so on. The type of joint is selected using the confidence array for that element in the output matrix of CNN. For example, by the field of views of two or more cameras. The tracking engine 110 comprises logic to determine sets of candidate joints having coordinates in real space (constellations of joints) as located subjects in the real space. In one embodiment, the tracking engine 110 accumulates arrays of joints data structures from the image recognition engines for all the cameras at a given moment in time and stores this information as a dictionary in a subject database, to be used for identifying a constellation of candidate joints corresponding to located subjects. The dictionary can be arranged in the form of key-value pairs, where keys are camera ids and values are arrays of joints data structures from the camera. In such an embodiment, this dictionary is used in heuristics-based analysis to determine candidate joints and for assignment of joints to located subjects. In such an embodiment, a high-level input, processing and output of the tracking engine 110 is illustrated in table 1. Details of the logic applied by the subject tracking engine 110 to create subjects by combining candidate joints and track movement of subjects in the area of real space are presented in U.S. patent application Ser. No. 15/847,796, filed 19 Dec. 2017, now U.S. Pat. No. 10,055,853, issued on 21 Aug. 2018, titled, "Subject Identification and Tracking Using Image Recognition Engine" which is incorporated herein by reference.

TABLE 1

| Inputs, processing and outputs from subject tracking engine 110 in an example embodiment. | | |
|---|---|---|
| Inputs | Processing | Output |
| Arrays of joints data structures per image and for each joints data structure Unique ID Confidence number Joint number 2D (x, y) position in image space | Create joints dictionary Reproject joint positions in the fields of view of cameras with overlapping fields of view to candidate joints | List of located subjects located in the real space at a moment in time corresponding to an identification interval | in one embodiment, if the value corresponding to the left-ankle joint is highest in the confidence array for that image element, then the value of the joint number is "1".

A confidence number indicates the degree of confidence of the CNN in predicting that joint. If the value of confidence number is high, it means the CNN is confident in its prediction. An integer-Id is assigned to the joints data structure to uniquely identify it. Following the above mapping, the output matrix of confidence arrays per image is converted into an array of joints data structures for each image. In one embodiment, the joints analysis includes performing a combination of k-nearest neighbors, mixture of Gaussians, and various image morphology transformations on each input image. The result comprises arrays of joints data structures which can be stored in the form of a bit mask in a ring buffer that maps image numbers to bit masks at each moment in time.

Subject Tracking Engine

The tracking engine 110 is configured to receive arrays of joints data structures generated by the image recognition engines 112a-112n corresponding to images in sequences of images from cameras having overlapping fields of view. The arrays of joints data structures per image are sent by image recognition engines 112a-112n to the tracking engine 110 via the network(s) 181. The tracking engine 110 translates the coordinates of the elements in the arrays of joints data structures from 2D image space corresponding to images in different sequences into candidate joints having coordinates in the 3D real space. A location in the real space is covered Subject Data Structure The subject tracking engine 110 uses heuristics to connect joints identified by the image recognition engines 112a-112n to locate subjects in the area of real space. In doing so, the subject tracking engine 110, at each identification interval, creates new located subjects for tracking in the area of real space and updates the locations of existing tracked subjects matched to located subjects by updating their respective joint locations. The subject tracking engine 110 can use triangulation techniques to project the locations of joints from 2D image space coordinates (x, y) to 3D real space coordinates (x, y, z). FIG. 3B shows the subject data structure 320 used to store the subject. The subject data structure 320 stores the subject related data as a key-value dictionary. The key is a "frame_id" and the value is another key-value dictionary where key is the camera_id and value is a list of 18 joints (of the subject) with their locations in the real space. The subject data is stored in the subject database 150. A subject is assigned a unique identifier that is used to access the subject's data in the subject database.

In one embodiment, the system identifies joints of a subject and creates a skeleton (or constellation) of the subject. The skeleton is projected into the real space indicating the position and orientation of the subject in the real space. This is also referred to as "pose estimation" in the field of machine vision. In one embodiment, the system displays orientations and positions of subjects in the real space on a graphical user interface (GUI). In one embodiment, the subject identification and image analysis are anonymous, i.e., a unique identifier assigned to a subject created through joints analysis does not identify personal identification information of the subject as described above.

For this embodiment, the joints constellation of a subject, produced by time sequence analysis of the joints data structures, can be used to locate the hand of the subject. For example, the location of a wrist joint alone, or a location based on a projection of a combination of a wrist joint with an elbow joint, can be used to identify the location of hand of a subject.

Subject Persistence Analysis

The joints analysis performed by the subject tracking engine 110 in an identification interval identifies constellation of joints. The identification interval can correspond to one image capture cycle or can include multiple image capture cycles. The constellation of joints located in an identification interval can belong to new subjects who have entered the area of real space in the current identification interval or can represent updated locations of the previously tracked subjects in earlier identification intervals. Sometimes, a subject located and tracked in an earlier identification interval can be missing in an intermediate identification interval before the current identification interval. This can happen for a variety of reasons, including, due to the subject moving to a designated unmonitored location in the area of real space or due to an error in subject tracking.

When a located subject is identified in the current identification interval, the technology disclosed performs the subject persistence analysis before tracking the located subject as a new subject and assigning it a new unique identifier. The system matches located subjects from the current identification interval with tracked subjects from an immediately preceding identification interval. Located subjects that are matched with tracked subjects can be tagged as the matching tracked subject. Located subjects that are not matched with tracked subjects are subjected to additional processing. For example, the system determines if a tracked subject in one or more earlier identification intervals is missing (i.e. not matched to a located subject) in the immediately preceding identification interval. Such a missing tracked subject can be evaluated as a potential match for the unmatched located subject (candidate subject) in the current identification interval.

For example, the system can include logic that processes the set of tracked subjects in the subject database 150 to detect a missing tracked subject present in the database. The missing tracked subject is not located in a first preceding identification interval but is tracked in a second preceding identification interval. The first preceding identification interval follows the second preceding identification interval. The system includes logic to locate a candidate located subject located from the current identification interval which follows the first preceding identification interval. The current identification interval can also be referred to as the third identification interval.

The technology disclosed matches the candidate located subject located from the current identification interval to the missing tracked subject located in the second preceding identification interval. If the missing tracked subject matches the candidate located subject, the missing tracked subject is updated in the database using the location of the candidate subject, and marked as no longer missing. This enables persistence of subjects in the area of real space even when a tracked subject is missed and not located in an identification interval.

It is understood that variations of subject persistence analysis are possible. For example, the system can match newly located candidate subject in the current identification interval to a missing tracked subject who is not located and tracked by the system for more than one intermediate identification intervals before the current identification interval.

The following sections present three example scenarios in which subject persistence analysis can be performed in an area of real space.

Single New Subject Persistence Analysis

The first example includes performing subject persistence over three identification intervals to match a missing tracked subject located in the second preceding identification interval to a candidate located subject located from the current (or third) identification interval. The system detects a condition in which a number of located subjects in the current set does not match the number of located subjects from a first preceding identification interval in the plurality of previous intervals. Upon detection of the condition, the system compares at least one of the located subjects in the current set with the set of located subjects from a second preceding identification interval in the plurality of previous identification intervals, that precedes the first preceding identification interval. The following example uses three identification intervals to illustrate this scenario. However, the process can be applied to more than three identification intervals.

Figure 4A:
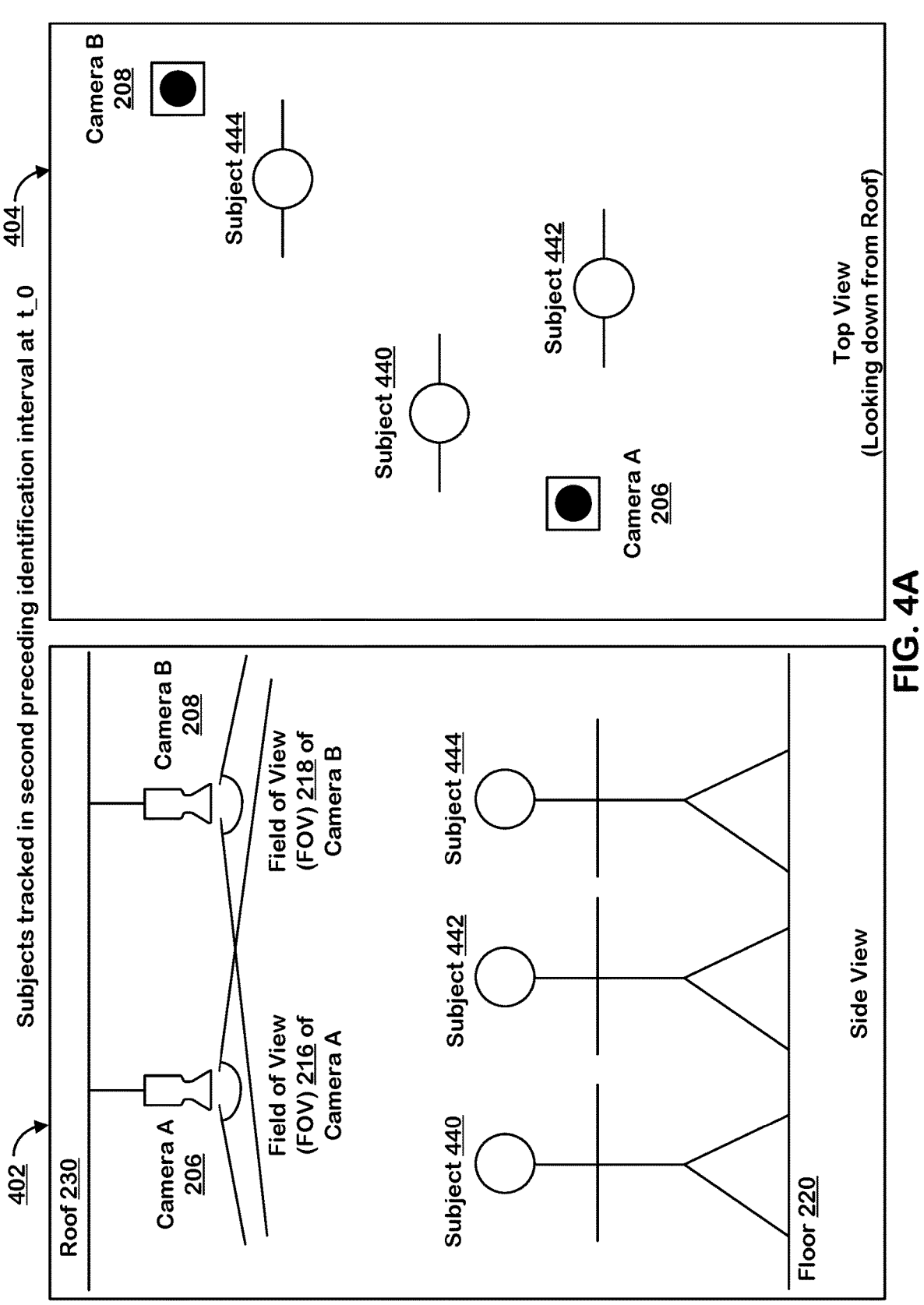
FIG. 4A shows tracked subjects in an area of real space in a second preceding identification interval.
Figure 4B:
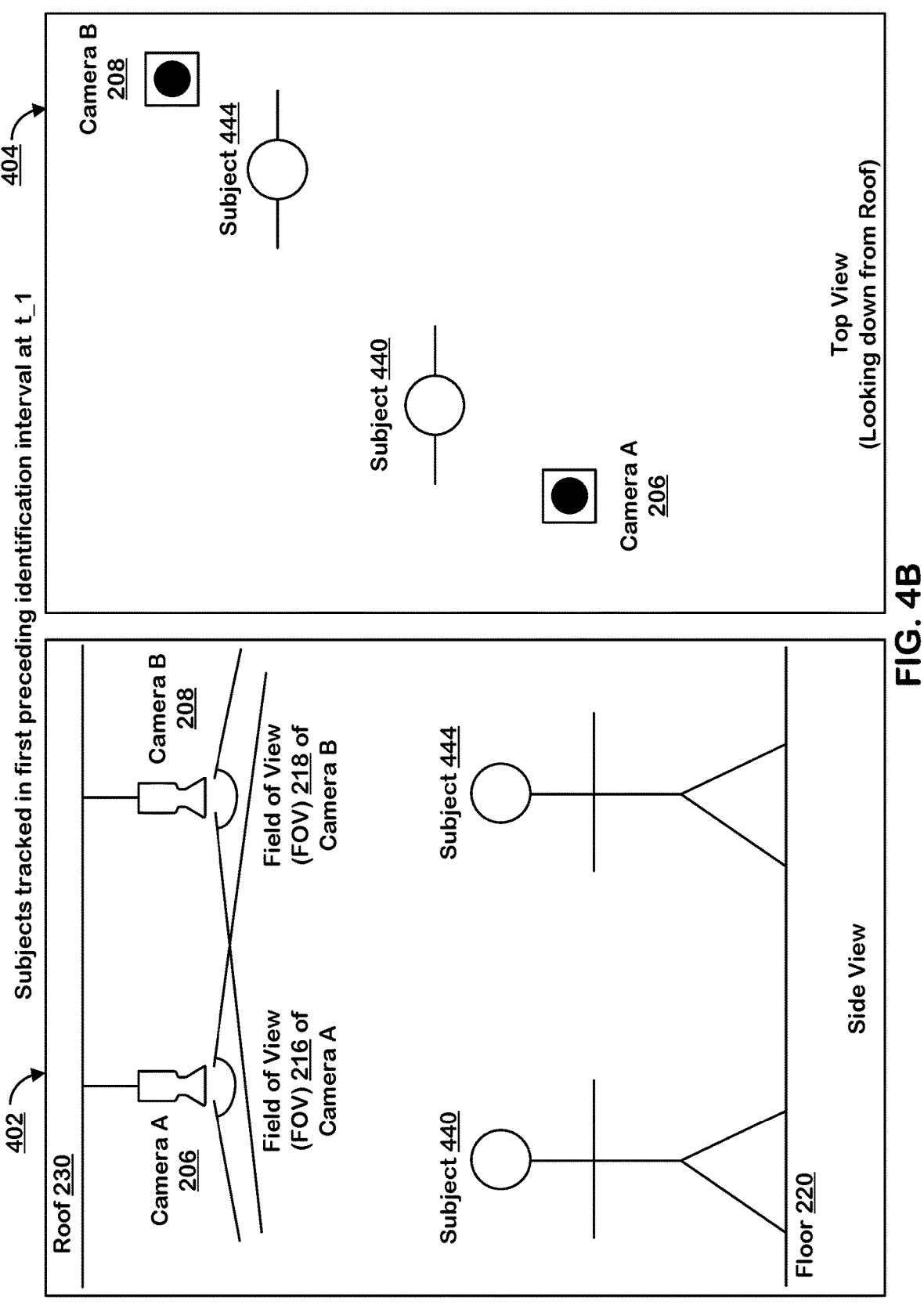
FIG. 4B shows tracked subjects in an area of real space in a first preceding identification interval in which one tracked subject located in the second preceding identification interval is missing.

FIG. 4A presents a side view 402 of an area of real space in which three subjects 440, 442 and 444 are tracked in a second preceding identification interval at time t_0. The subjects are stored in the database with their respective unique tracking identifiers and location information. The positions of the three subjects in a top view 404 (looking down from roof) is also shown in a top view 404. As described above, the positions of the subjects in the area of real space is identified by their respective subject data structures 320. The subject data structures include locations of joints in three dimensions (x, y, z) of the area of real space. In another embodiment, the positions of the joints or other feature of the subjects are represented in the two dimensional (abbreviated 2D) image space (x, y). The subject 442 who is tracked in the second preceding identification interval is missing in a first preceding identification interval at time t_1 as shown in FIG. 4B. Both side view (402) and top view (404) show subjects 440 and 444 tracked in the first preceding identification intervals. A candidate subject 442A is located in a current identification interval at time t_2 as shown FIG. 4C. The candidate located subject is visible in the side view 402 and the top view 404.

The technology disclosed performs the subject persistence analysis to determine if the candidate located subject 442A is a new subject who entered the area of real space during the current identification interval or if the candidate located subject 442A is the missing tracked subject 442 who was tracked in the second preceding identification interval but is missing in the first preceding identification interval.

Figure 5:
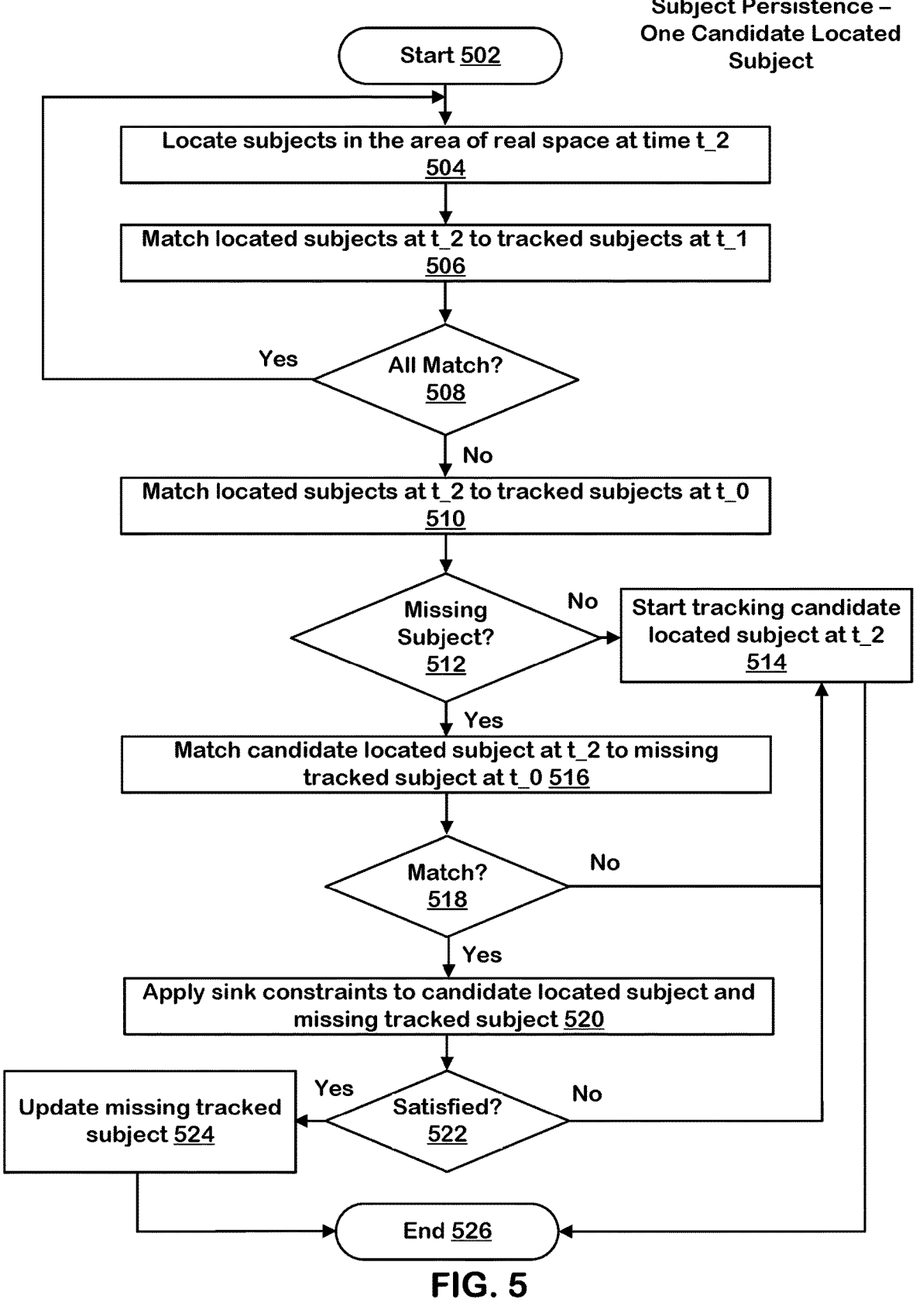
FIG. 5 is an example flow chart for matching a candidate located subject to a missing tracked subject.

FIG. 5 presents a flowchart with example process steps to perform the subject persistence for one candidate located subject located from the current identification interval. The process starts at step 502. The system locates subjects in the current identification cycle at time t_2. In one embodiment, the system uses joints analysis as described above to locate subjects as constellation of joints. In another embodiment, the system can use other features of the subjects such as facial features independently or in combination with joints to locate subjects in the area of real space.

At step 506, the process matches the subjects located in the current identification interval at t_2 to tracked subjects located in the first preceding identification interval at time t_1. In one embodiment, the process uses the logic applied by the subject tracking engine 110 to create subjects by combining candidate joints and track movement of subjects in the area of real space as presented in U.S. patent application Ser. No. 15/847,796, filed 19 Dec. 2017, now U.S. Pat. No. 10,055,853, issued on 21 Aug. 2018, titled, "Subject Identification and Tracking Using Image Recognition Engine" which is incorporated herein by reference. At step 508, the system determines if all subjects located in the current identification interval match to the tracked subjects in the first preceding identification interval. If all subjects match then the system repeats the steps 504 and 506 for a next identification interval. In one embodiment, in this step, the system detect a condition in which a number of located subjects in the current set does not match the number of located subjects from a first preceding identification interval in the plurality of previous intervals. If the condition is true (step 508), then the system compares at least one of the located subjects in the current set with the set of tracked subjects from a second preceding identification interval in the plurality of previous identification intervals, that precedes the first preceding identification interval.

If a candidate located subject located from the current identification interval does not match to any tracked subject in the first preceding identification interval, the technology disclosed determines if there is a missing tracked subject who was located and tracked in the second preceding identification interval but was missing in the first preceding identification interval following the second preceding identification interval. If the system identifies a missing tracked subject who is tracked in the second preceding identification interval but is missing in the first preceding identification interval, the process continues at a step 516. Otherwise, if the system does not identify a missing tracked subject in the second preceding identification interval, the system starts tracking the candidate located subject located from the current identification interval by assigning this subject a new tracking identifier. This is the case when all tracked subjects in the first preceding identification interval match corresponding tracked subjects in the second preceding identification interval.

Figure 4C:
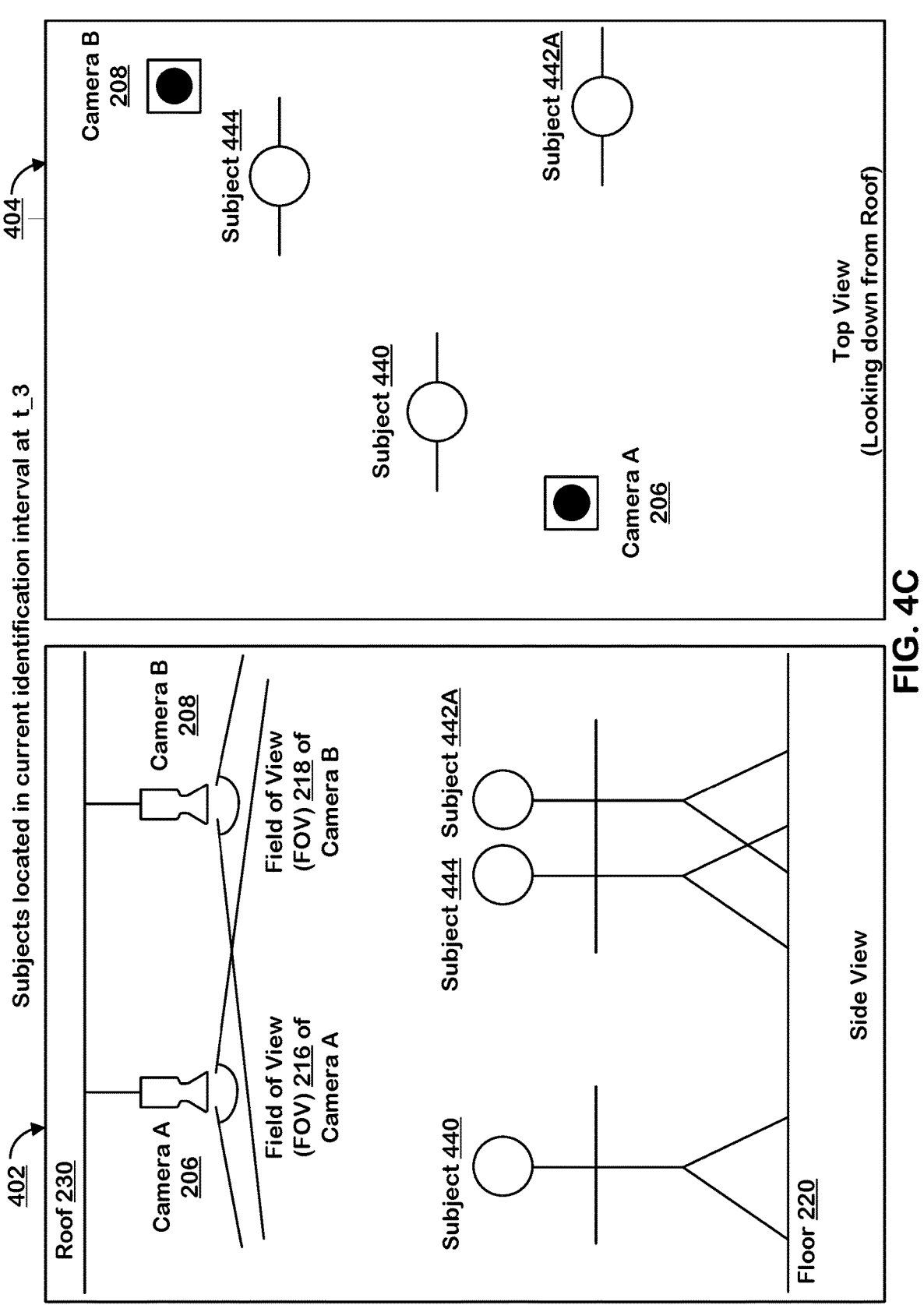
FIG. 4C shows subjects located in an area of real space in a current identification interval in which a candidate subject is located.

In the example presented in FIGS. 4A to 4C, the subject 442A (shown in FIG. 4C) is the candidate located subject located from the current identification interval and the subject 442 (shown in FIG. 4A) is the missing tracked subject. If the system determines that there is no missing tracked subject at step 512, the candidate located subject 442A is assigned a unique tracking identifier and the system starts tracking the subject during the current identification interval.

The process to match the missing tracked subject and the candidate located subject is described in the following steps of the process flow. In the process step 516, the system applies a time constraint heuristic before matching the location of the candidate located subject located from the current identification interval to the location of the missing tracked subject in the second preceding identification interval. The system calculates for example a difference in a timestamp of location of the candidate located subject and a timestamp of location of the missing tracked subject. The timestamps can be identifiers of the identification intervals, or can be specific timestamps within an identification interval that includes a plurality of image capture cycles. The timestamp, for example, can be represented as t_2 for the candidate subject located from the current identification interval, and t_0 for the missing tracked subject located in the second preceding identification interval. If an identification interval matches an image capture cycle of the cameras, the timestamps can match the time at which the images are captured in the image capture cycles. The difference between the timestamps i.e., t_2–t_0 is compared with a timing threshold. In one example, the timing threshold is 10 seconds. It is understood that other values of timing threshold greater or less than 10 seconds can be used. The timestamps of detection of joints of the subjects at image capture cycles can also be used for calculation of this time difference. If the difference in timestamps is less than the timing threshold then the system matches locations of the candidate located subject and the missing tracked subject.

The system calculates a distance between a location of the candidate located subject (p_2) and a location of the missing tracked subject (p_0) in the area of real space, i.e., (p_2–p_1). In one embodiment using joints analysis as described above, the distance is calculated using locations of joints in the constellations of joints of the candidate located subject and the missing tracked subject. The distance can be calculated as a Euclidean distance between two points representing the corresponding joints in the respective constellations of joints. The Euclidean distance can be calculated both in the 3D real space and the 2D image space. The Euclidean distance represents the distance the subject has moved from an initial position in the second preceding identification interval to a new position in the current identification interval. This distance is then compared with a distance threshold. If the distance is less than the distance threshold then the candidate located subject is matched to the missing tracked subject. An example of the distance threshold distance is 1 meter. Other values for the distance threshold, greater than 1 meter or less than 1 meter can be used. If the difference between the timestamps of the location of the candidate located subject and the missing tracked subject is greater than the timing threshold or the distance between the candidate located subject and the missing tracked subject is greater than the distance threshold (step 518), the system start does not match the candidate subject to the missing tracked subject, and can identify it as a new located subject at step 514. Otherwise, the process to link the candidate located subject and the missing tracked subject continues at step 520.

At step 520, before linking the candidate located subject located from the current identification interval to the missing tracked subject located in the second preceding identification interval, the system applies "sink" constraints. Sink constraints can include calculating distances between locations of the candidate located subject and of the missing tracked subject to locations in the area of real space that can provide sources and sinks of subjects, such as entrances or exits from the area of the real space. In one embodiment, the distance calculation uses a boundary location of the entrance or exit region. The distance of the candidate located subject to the location i.e., d(p_2–sink) and the distance of the missing tracked subject to the location i.e., d(p_0–sink) are compared with a distance threshold. If either of these distances is less than the distance threshold, (step 522) and the system can start tracking candidate located subject at step 514. An example of distance threshold at step 520 is 1 meter, in other embodiments, distance threshold values greater than 1 meter or less than 1 meter can be used. In one embodiment, the threshold depends on the length (or time duration) of the identification intervals and the distance a subject can move in that time duration. If the sink constraints are satisfied, i.e., both the candidate located subject and the missing tracked subject are positioned farther from entrance and exits by more than the distance threshold, the system can update the missing tracked subject in the database using the candidate located subject located from the current identification interval (step 524). The process ends at step 526.

Multiple New Subjects Persistence Analysis

Figures 6A, 6B:
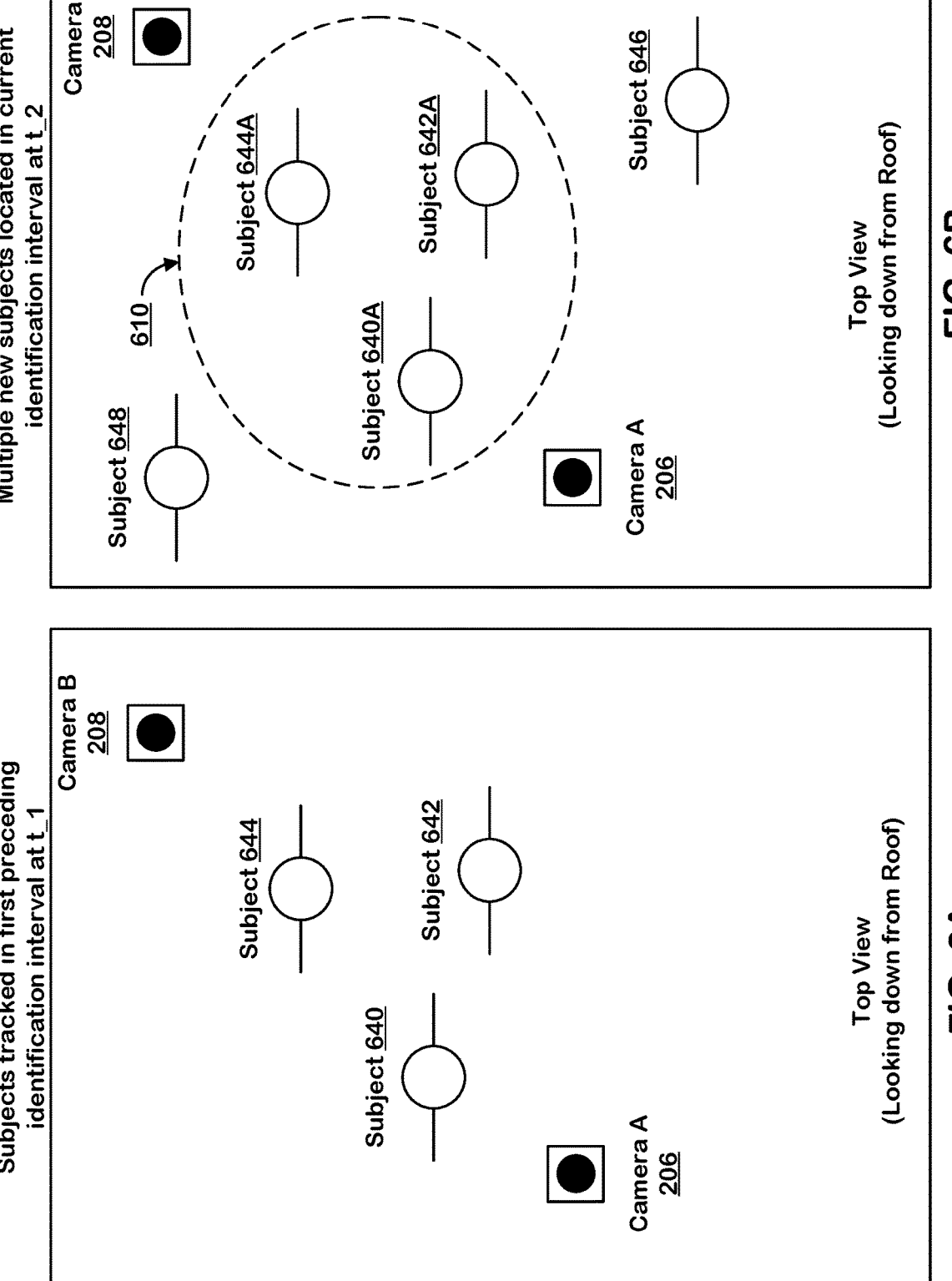
FIG. 6A shows tracked subjects in the area of real space located in a first preceding identification interval.
FIG. 6B shows subjects located in the area of real space in a current identification interval with more than one located subjects not matched with tracked subjects located in a first preceding identification interval.

The second example scenario for performing subject persistence analysis using the technology disclosed is presented in FIGS. 6A and 6B. This example considers the scenario in which the set of tracked subjects from a first preceding identification interval includes N members, and the set of located subjects from the current identification interval includes N members plus one or more candidate located subjects. The system can employ logic to make the process of linking N members of the set of located subjects from the current identification interval to N members of the set of tracked subjects from the first preceding identification interval, more efficient. This improvement in efficiency can be achieved by prioritizing members of the set of located subjects from the current identification interval to identify a set of N located subjects to link to the set of N tracked subjects from the first preceding identification interval using relative locations of the located subjects. In one embodiment, the prioritization of the members of the set of located subjects from the current identification interval to identify the set of N located subjects can include calculating distance between pairs of located subjects from the current identification interval. The system then identifies the set of N located subjects by comparing the calculated distance with a distance second threshold such as 1 meter. Located members satisfying the distance threshold can be evaluated for matching with tracked member for the preceding identification interval with higher priority than those that do not meet the distance threshold.

The example presented in FIGS. 6A and 6B illustrates this scenario by tracking three subjects 640, 642 and 644 in the first preceding identification interval at t_1 as shown in FIG. 6A. The three tracked subjects 640, 642, and 644 are stored in the subject database 150 with their unique tracking identifiers. Five subjects 640A, 642A, 644A, 646 and 648 are located in the current identification interval at t_2 as shown in FIG. 6B. The set of subjects located in the current identification interval has more than one member subjects not tracked in the first preceding identification interval. The system compares the set of tracked subjects present in the database that are tracked in preceding identification intervals to detect the condition that more than one subjects not tracked in preceding identification intervals are located in the current identification interval.

The system prioritizes the set of subjects (N plus more than one candidate located subjects) located from the current identification interval to determine a set S of located subjects in the current identification interval. In one embodiment, the cardinality of the set S is equal to the cardinality of the set N of tracked subjects in preceding identification interval. In other embodiment, the cardinality of the set S can be less than the set N of tracked subjects in preceding identification intervals. In one embodiment, the membership of set S is determined such that the three dimensional or two dimensional Euclidean distance between any two members in the set S is less than a distance threshold. An example of the distance threshold is 1 meter. In FIG. 6B, a circle 610 identifies the set S of located subjects in the current identification interval which includes subjects 640A, 642A, and 644A. In this example, the cardinality of the set S equals the cardinality of the set N of tracked subjects in the preceding identification interval.

The system includes logic that matches a member of the set S of located subjects in the current identification interval to members of the set N of tracked subjects in the first preceding identification interval. If a member of the set S matches a member of the set N of tracked subjects, the system links the matched located subjects to the matched tracked subjects and updates the tracked subject in the database using the matched located subject. In one embodiment, members of the set S of located subjects are matched to members of the set N of tracked subjects in the first preceding identification interval using positions of joints in their respective constellation of joints. The distance between positions of joints of members of the set S of located subjects and the set N of tracked subjects are compared with the second threshold (e.g., 1 meter). If there is a unique match for each member of the set S of located subjects in the current identification interval to a tracked subject in the first preceding identification interval then the system updates the tracked subject in the database using the matched member of the set S of located subjects. Before linking the tracked subject to the located subject in the current identification interval, the system can apply sink constraints as discussed above to the matched located and tracked subjects to determine that they are away from the exits and entrances to the area of real space by more than a third threshold distance.

FIG. 7 presents a process flowchart to perform subject persistence in the above described scenario. The process starts at a step 702. The system locates subjects in the area of real space in the current identification interval at a step 704. The number of located subjects in the current identification interval is compared to the number of tracked subjects in the first preceding identification interval at step 706. For example, consider the example illustration in FIG. 6B indicating five subjects located in the current identification interval. Suppose there were three subjects tracked in the first preceding identification interval. By comparing the number of located subjects in the current identification interval to the number of tracked subjects in the first preceding identification interval, the system determines that more than one candidate subjects are located in the current identification interval (step 708). In one embodiment, the system compares the number of located subjects in the current identification interval to the number of tracked subjects in preceding identification interval to determine that more than one candidate subjects are located in the current identification interval at the step 706. In other words, the number of located subjects in the current identification interval is more than one plus the number of tracked subjects in the preceding identification interval. If there is only one additional member in the current identification interval, then the technique presented above in FIG. 5 can be applied. If there is only one additional member in the current identification interval and that member is positioned close to a designated unmonitored location in the area of real space (such as a restroom) then the technique presented below in FIG. 9 can be used.

The system identifies a set S of located subjects in the current identification interval (step 710) as explained in the following example. Consider M_2 subjects are located in the current identification interval at time t_2, whereas the subjects M_2 are indexed as 0, 1, 2, . . . , M_2−1 and M_0 subjects are tracked in the first preceding identification interval at time t_1, indexed as 0, 1, 2, . . . , M_0−1. Further, suppose that locations of the located subjects in the current identification interval are represented as p_{2, i} for i=0, 1, 2, . . . , M_2−1 and locations of the tracked subjects in the first preceding identification interval are represented as q_{0, i} for i=0, 1, 2, . . . , M_0−1. At the step 710, a set S of located subjects in the current identification interval is determined such that for any two subjects p_{2, i} and p_{2, j} the distance d (p_{2, i}, p_{2, j}) is less than a second threshold, e.g., 1 meter. The distance can be calculated in the 3D real space or 2D image space using locations of joints in the constellation of joints of respective subjects. It is understood that other values of the distance threshold greater than or less than 1 meter can be used.

The members of the set S of located subjects are then matched to tracked subjects in the first preceding identification interval at step 712. The location of each located subjects p_{2, i} member of the set S is matched to locations of tracked subjects q_{0, j} in the first preceding identification interval to determine the distance d (p_{2, i}, q_{0, j}). If the distance "d" is less than a second threshold, such as 1 meter, and one member p_{2, i} in the set S of located subjects matches to only one tracked subject q_{0, j} using the above threshold, then the system determines that there is a match between the located subject and tracked subject located in the preceding identification interval (step 714).

If a member of the set S of located subjects does not match to a tracked subject in the above process step, the located subject can be assigned a new tracking identifier at a step 716. The system can then start tracking the located subject in the current identification interval. The subject is stored in the subject database with a unique tracking identifier.

When a member of the set S of located subjects in the current identification interval is matched to a tracked subject in the first preceding identification interval, the system determines that no other member of the set S of located subjects matches that tracked subject. For a member p_{2, i} of the set S of located subjects that uniquely matches to a tracked subject q_{0, j}, the sink constraints are applied at a step 718. The sink constraints determine if the member of the set S of located subjects or the tracked subject are closer to an entrance to or exit from the area of real space by a third threshold distance as described in the step 520 in the flowchart in FIG. 5. If the sink constraint is satisfied (step 720) for the member of the set S of the located subjects and the tracked subject (i.e., both the member of the set S of located subjects and the tracked subject are farther from the sink than the third threshold), the tracked subject q_{0, j in the first preceding identification interval is updated in the database using the member p_{2, i} of the set S of located subjects (step 722). The process ends at a step 724.

Subject Persistence Analysis for Designated Unmonitored Location

Figure 8A:
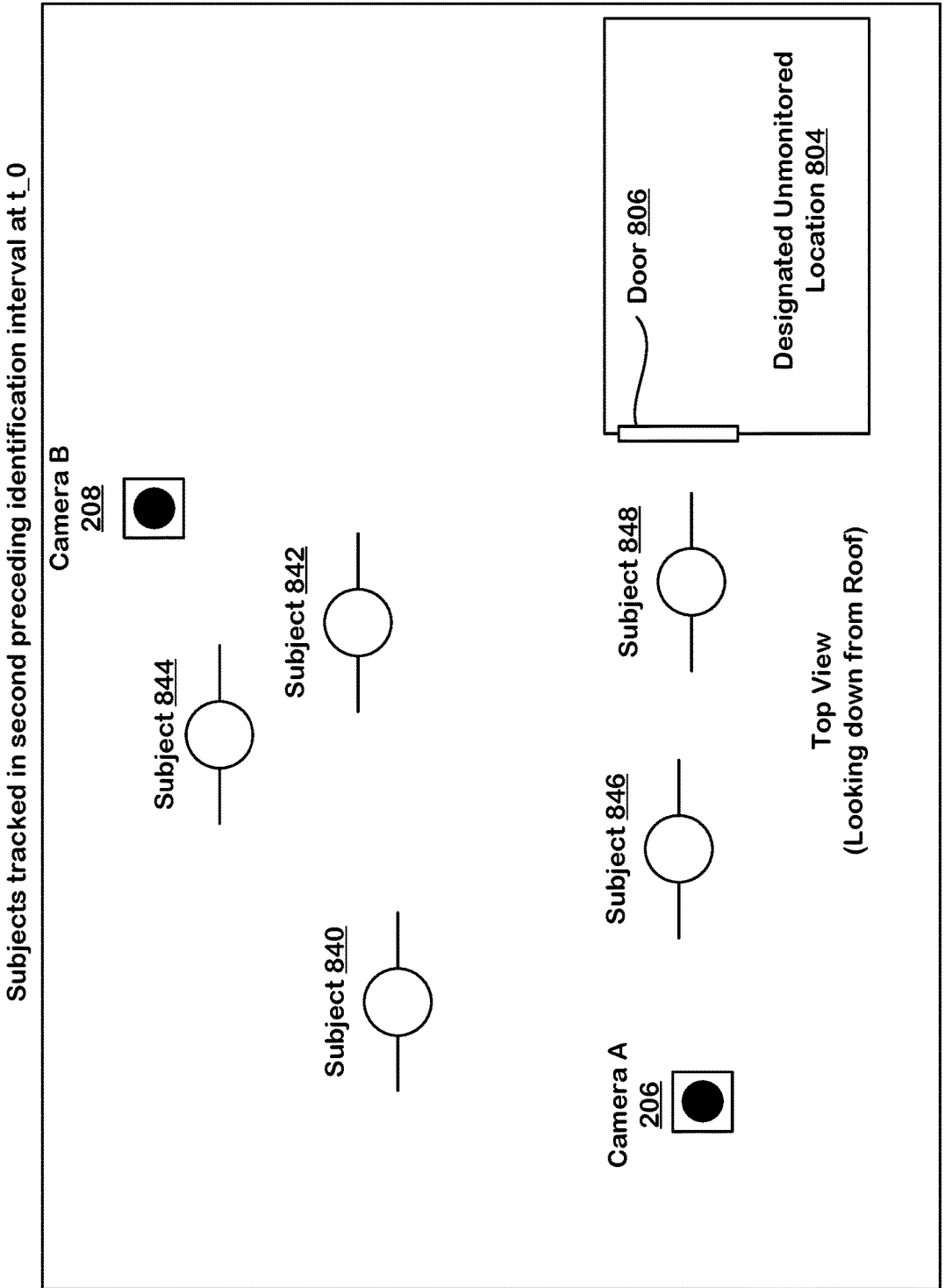
FIG. 8A shows an area of real space with a designated unmonitored location and a tracked subject located in a second preceding identification interval, positioned close to the designated unmonitored location.
Figure 8B:
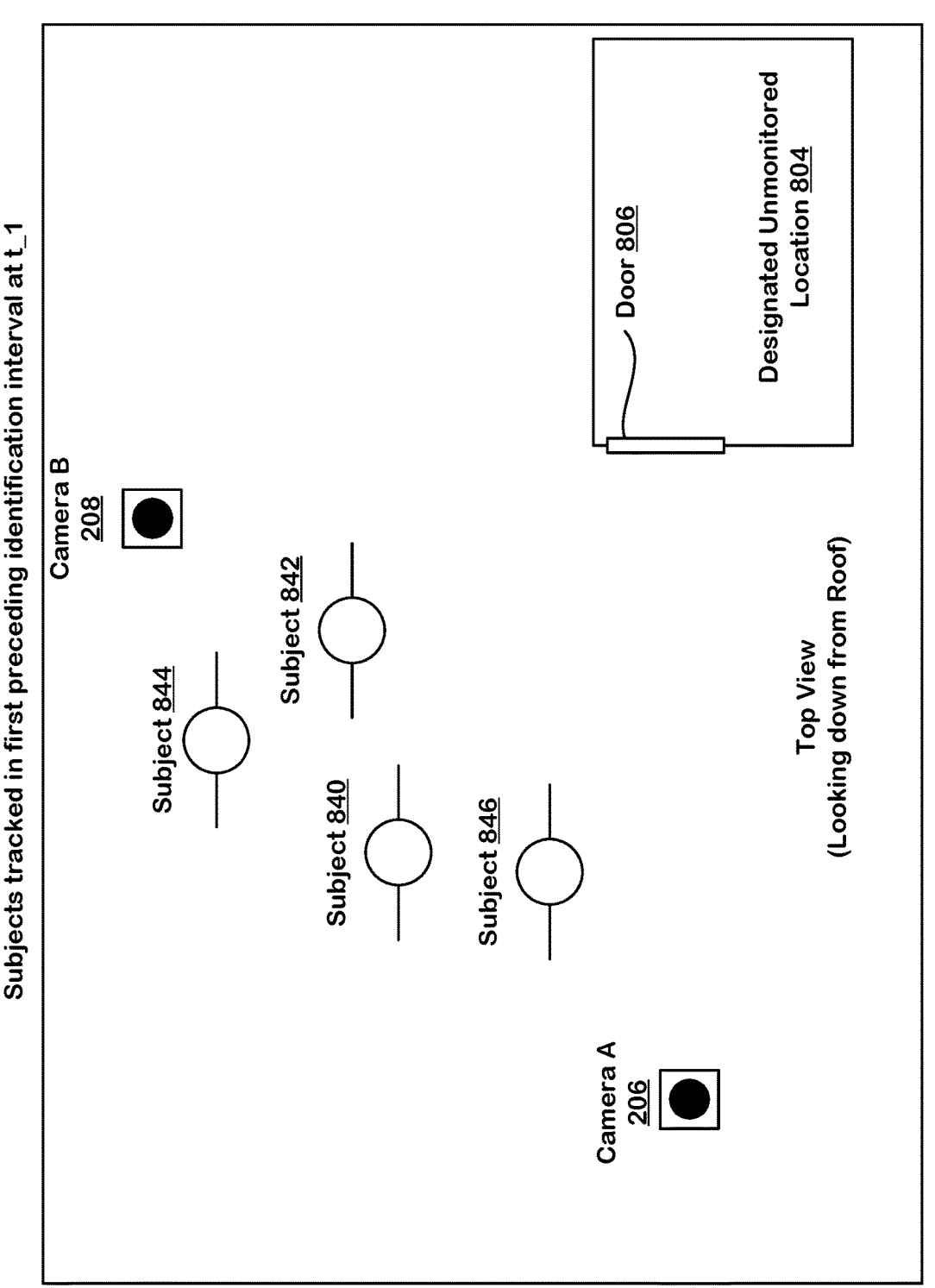
FIG. 8B shows the area of real space with tracked subjects located in a first preceding identification interval and the tracked subject of FIG. 8A positioned close to the designated unmonitored location missing in the first preceding identification interval.
Figure 8C:
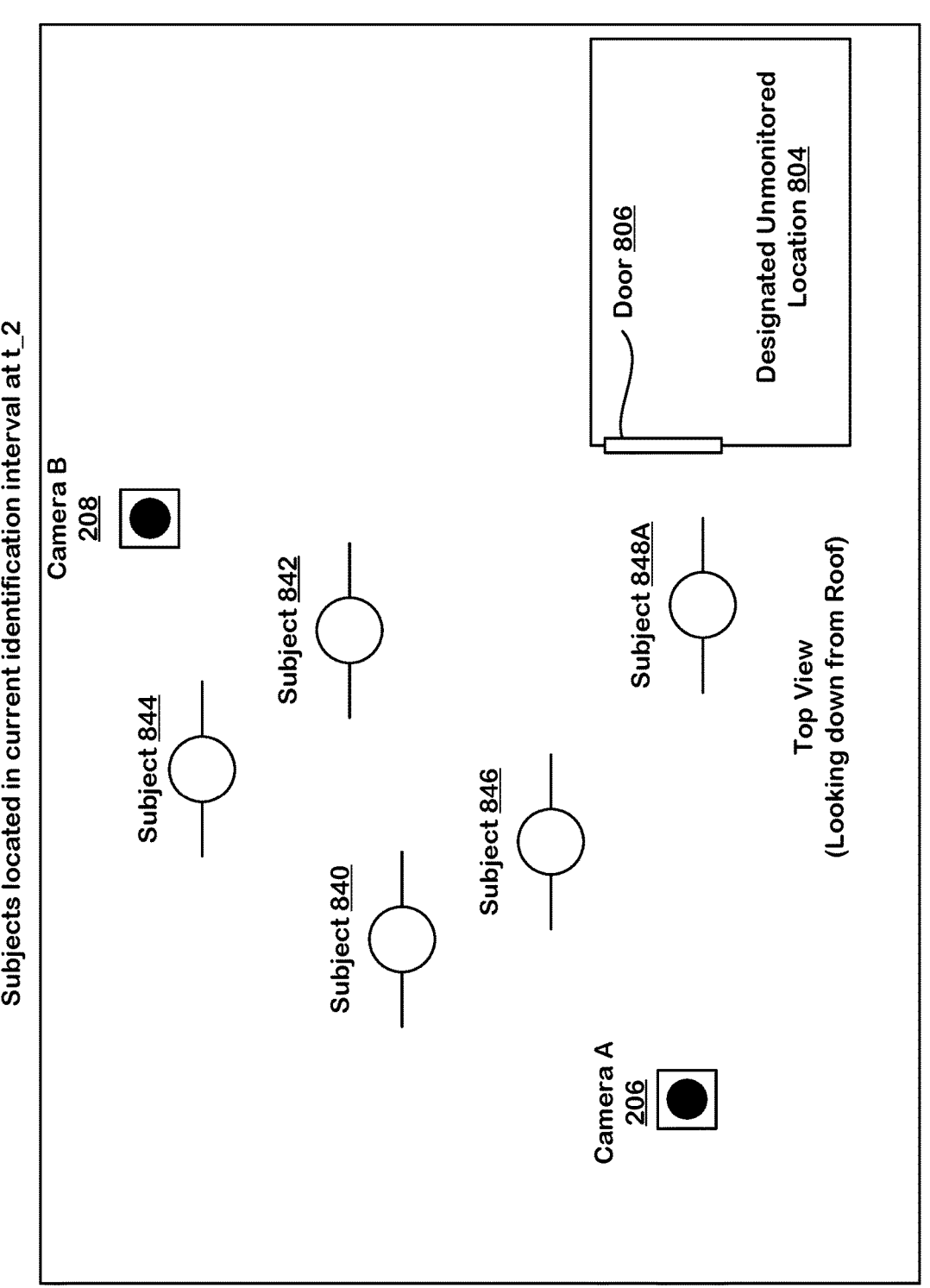
FIG. 8C shows subjects located in the current identification interval in the area of real space including a candidate located subject positioned close to the designated unmonitored location.

A third example scenario for performing subject persistence analysis using the technology disclosed is presented in FIGS. 8A to 8C. This example illustrates subject persistence when a subject moves to a designated unmonitored location, such as a restroom, in the area of real space. The subject is then not tracked in the following one or more identification intervals during which the subject is present in the designated unmonitored location. The system again locates the missing tracked subject during a following identification interval in which the subject moves out of the designated unmonitored location and is positioned in the field of view of one or more cameras 114.

FIG. 8A illustrates a top view (looking downwards) of an area of real space that includes a designated unmonitored location 804 such as a restroom. The designated unmonitored location 804 is not in the field of view of cameras 114. Subjects can enter or leave the designated unmonitored location through a door 806. There are five subjects 840,

842, 844, 846, and 848 in the set of tracked subjects in a second preceding identification interval at time t_0 as shown in FIG. 8A. In a first preceding identification interval at time t_1, there are four tracked subjects 840, 842, 844, and 846 in the set of tracked subjects as shown in FIG. 8B. The tracked subject 848 in the second preceding identification interval is missing in the first preceding identification interval. The location of the missing tracked subject 848 is close to the designated unmonitored location in the second preceding identification interval before the first preceding identification interval in which the subject 848 is missing.

FIG. 8C shows a candidate located subject 848A positioned near the designated unmonitored location 804 in a current identification interval at time t_2 after the first preceding identification interval at time t_1. Before starting tracking the candidate located subject 848A in the current identification interval, the technology disclosed performs the subject persistence analysis to link the candidate located subject 848A to the missing tracked subject 848. The missing tracked subject 848 was located in the second preceding identification interval but was not located in the first preceding identification interval following the second preceding identification interval. Before the candidate located subject is matched to the missing tracked subject, the technology disclosed can determine that no subject (other than the missing tracked subject 848) was present close to the designated unmonitored location in the second preceding identification interval and no other subject (other than the missing tracked subject 848) entered the designated unmonitored location in the first preceding identification interval.

The system matches the locations of all tracked subjects in the second preceding identification interval to the location of designated unmonitored location to determine that only the missing tracked subject 848 is positioned close to the unmonitored location in the second preceding identification interval. In one embodiment, a distance is calculated between locations of the tracked subjects in the second preceding identification interval and a point (in 3D real space or 2D image space) on the door 806. The system determines which tracked subjects are close to the designated unmonitored location 804 by comparing their respective distances to the designated unmonitored location with a third threshold. An example value of the third threshold distance is 1 meter. If missing tracked subject 848 is the only subject close to the door 806 in the second preceding identification interval and the candidate subject 848A is the only candidate located subject located from the current identification interval who is positioned close to the designated unmonitored location then the system links the missing tracked subject 848 to the candidate located subject 848A. The system updated the missing tracked subject 848 in the database using the candidate located subject 848A in the current identification interval and continues tracking the subject 848 in the current identification interval.

FIG. 9 is a flowchart presenting process steps to link a candidate located subject located from the current identification interval to a missing tracked subject in the second preceding identification interval if both the candidate located subject and the missing tracked subject are positioned close to the designated unmonitored location in respective identification intervals. The process starts at step 902. The process steps 904, 906, 908, 910, and 912 perform similar operations as described for process steps 504, 506, 508, 510, and 512 respectively. At a step 916, the distances of the tracked subjects in the second preceding identification interval and the located subjects in the current identification interval to a designated unmonitored location are calculated.

Suppose there are M_0 subjects in the set of tracked subjects in the second preceding identification interval and the tracked subjects are indexed as 0, 1, 2, . . . , k–1. The locations of the tracked subjects are given as p_0, p_1, p_2, . . . , p_{k–1}, respectively. The system calculates distances of the tracked subjects to location of the designated unmonitored location as d(p_i, B) where B is the location of the designated unmonitored location in the three dimensional real space or two dimensional image space.

The distances of the tracked subjects to the designated unmonitored location are compared with a distance threshold such as 1 meter. If only one tracked subject in the second preceding identification interval is positioned closer to the designated unmonitored location than the third threshold, a similar distance calculation between locations of subjects located in the current identification interval and location of the designated unmonitored location is performed. If only one subject located in the current identification interval is positioned closer to the unmonitored designated location then the condition at step 918 becomes true. Otherwise, the system can assign a new tracking identifier to the candidate located subject located from the current identification interval and starts tracking the subject (step 914).

As part of linking the missing tracked subject located in the second preceding identification interval to the candidate located subject located from the current identification interval, additional constraints can be checked at a step 920. It is determined that no other tracked subjects from the second preceding identification interval and the first preceding identification intervals who were located closer to the designated unmonitored location than the distance threshold (other than the missing tracked subject at step 910) are missing in the current identification interval. This is to avoid incorrect matching of the candidate located subject to the missing tracked subject. If only one tracking subject positioned close to the designated unmonitored location in the second preceding identification interval is not tracked in the first preceding identification interval and only one candidate subject is located close to the designated unmonitored location in the current identification interval, then the system checks the following constraint. The system determines that no other tracked subject entered the designated unmonitored location (step 922) by performing the process steps 904 to 912. If no other tracked subject entered the designated unmonitored location in the second preceding identification interval and the first preceding identification interval then the system links the missing tracked subject located in the second preceding identification interval using the candidate located subject located from the current identification interval (step 924). The system then continues tracking the missing tracked subject in the current identification interval using the location of the candidate located subject. The process ends at step 926.

Network Configuration

Figure 10:
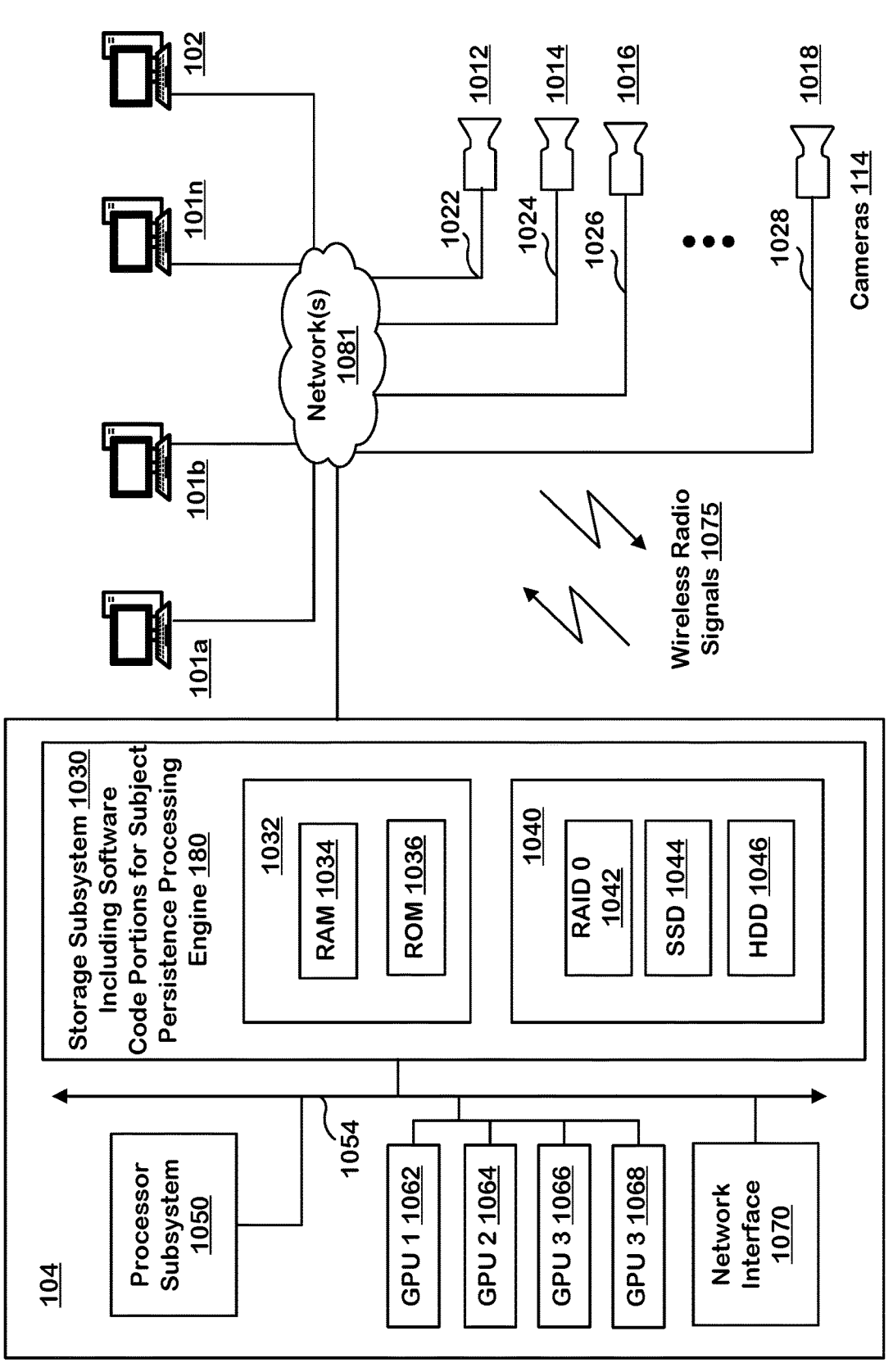
FIG. 10 is a camera and computer hardware arrangement configured for hosting the subject persistence processing engine of FIG. 1.

FIG. 10 presents architecture of a network hosting the subject persistence processing engine 180 which is hosted on the network node 104. The system includes a plurality of network nodes 101*a*, 101*b*, 101*n*, and 102 in the illustrated embodiment. In such an embodiment, the network nodes are also referred to as processing platforms. Processing platforms (network nodes) 103, 101*a*-101*n*, and 102 and cameras 1012, 1014, 1016, . . . , 1018 are connected to network(s) 1081. A similar network hosts the matching engine 170 which is hosted on the network node 103.

FIG. 10 shows a plurality of cameras 1012, 1014, 1016, . . . , 1018 connected to the network(s). A large number of cameras can be deployed in particular systems. In one embodiment, the cameras 1012 to 1018 are connected to the network(s) 1081 using Ethernet-based connectors 1022, 1024, 1026, and 1028, respectively. In such an embodiment, the Ethernet-based connectors have a data transfer speed of 1 gigabit per second, also referred to as Gigabit Ethernet. It is understood that in other embodiments, cameras 114 are connected to the network using other types of network connections which can have a faster or slower data transfer rate than Gigabit Ethernet. Also, in alternative embodiments, a set of cameras can be connected directly to each processing platform, and the processing platforms can be coupled to a network.

Storage subsystem 1030 stores the basic programming and data constructs that provide the functionality of certain embodiments of the present invention. For example, the various modules implementing the functionality of the subject persistence processing engine 180 may be stored in storage subsystem 1030. The storage subsystem 1030 is an example of a computer readable memory comprising a non-transitory data storage medium, having computer instructions stored in the memory executable by a computer to perform all or any combination of the data processing and image processing functions described herein including logic to identify match located subjects with tracked subject, logic to link subjects in an area of real space with a user account, to determine locations of tracked subjects represented in the images, match the tracked subjects with user accounts by identifying locations of mobile computing devices executing client applications in the area of real space by processes as described herein. In other examples, the computer instructions can be stored in other types of memory, including portable memory, that comprise a non-transitory data storage medium or media, readable by a computer.

These software modules are generally executed by a processor subsystem 1050. A host memory subsystem 1032 typically includes a number of memories including a main random access memory (RAM) 1134 for storage of instructions and data during program execution and a read-only memory (ROM) 1036 in which fixed instructions are stored. In one embodiment, the RAM 1034 is used as a buffer for storing point cloud data structure tuples generated by the inventory event location processing engine 180.

A file storage subsystem 1040 provides persistent storage for program and data files. In an example embodiment, the storage subsystem 1040 includes four 120 Gigabyte (GB) solid state disks (SSD) in a RAID 0 (redundant array of independent disks) arrangement identified by a numeral 1042. In the example embodiment, maps data in the maps database 140, inventory events data in the inventory events database 150, inventory item activity data in the inventory item activity database 160, and the inventory item correlation data in the inventory item correlation database 170 which is not in RAM is stored in RAID 0. In the example embodiment, the hard disk drive (HDD) 1046 is slower in access speed than the RAID 0 1042 storage. The solid state disk (SSD) 1044 contains the operating system and related files for the inventory event location processing engine 180.

In an example configuration, four cameras 1012, 1014, 1016, 1018, are connected to the processing platform (network node) 103. Each camera has a dedicated graphics processing unit GPU 1 1062, GPU 2 1064, GPU 3 1066, and GPU 4 1068, to process images sent by the camera. It is understood that fewer than or more than three cameras can be connected per processing platform. Accordingly, fewer or more GPUs are configured in the network node so that each camera has a dedicated GPU for processing the image frames received from the camera. The processor subsystem

1050, the storage subsystem 1030 and the GPUs 1062, 1064, and 1066 communicate using the bus subsystem 1054.

A network interface subsystem 1070 is connected to the bus subsystem 1054 forming part of the processing platform (network node) 104. Network interface subsystem 1070 provides an interface to outside networks, including an interface to corresponding interface devices in other computer systems. The network interface subsystem 1070 allows the processing platform to communicate over the network either by using cables (or wires) or wirelessly. The wireless radio signals 1075 emitted by the mobile computing devices 120 in the area of real space are received (via the wireless access points) by the network interface subsystem 1170 for processing by the matching engine 170. A number of peripheral devices such as user interface output devices and user interface input devices are also connected to the bus subsystem 1154 forming part of the processing platform (network node) 104. These subsystems and devices are intentionally not shown in FIG. 10 to improve the clarity of the description. Although bus subsystem 1054 is shown schematically as a single bus, alternative embodiments of the bus subsystem may use multiple busses.

In one embodiment, the cameras 114 can be implemented using Chameleon3 1.3 MP Color USB3 Vision (Sony ICX445), having a resolution of 1288×964, a frame rate of 30 FPS, and at 1.3 MegaPixels per image, with Varifocal Lens having a working distance (mm) of 300-∞, a field of view field of view with a ⅓" sensor of 98.2°-23.8°.

Subject Identification Analysis

The following description provides examples of algorithms for identifying tracked subjects by matching them to their respective user accounts. As described above, the technology disclosed links located subjects in the current identification interval to tracked subjects in preceding identification intervals by performing subject persistence analysis. In the case of a cashier-less store the subjects move in the aisles and open spaces of the store and take items from shelves. The technology disclosed associates the items taken by tracked subjects to their respective shopping cart or log data structures. The technology disclosed uses one of the following check-in techniques to identify tracked subjects and match them to their respective user accounts. The user accounts have information such as preferred payment method for the identified subject. The technology disclosed can automatically charge the preferred payment method in the user account in response to identified subject leaving the shopping store. In one embodiment, the technology disclosed compares located subjects in current identification interval to tracked subjects in previous identification intervals in addition to comparing located subjects in current identification interval to identified (or checked in) subjects (linked to user accounts) in previous identification intervals. In another embodiment, the technology disclosed compares located subjects in current identification interval to tracked subjects in previous intervals in alternative to comparing located subjects in current identification interval to identified (or tracked and checked-in) subjects (linked to user accounts) in previous identification intervals.

Figure 11:
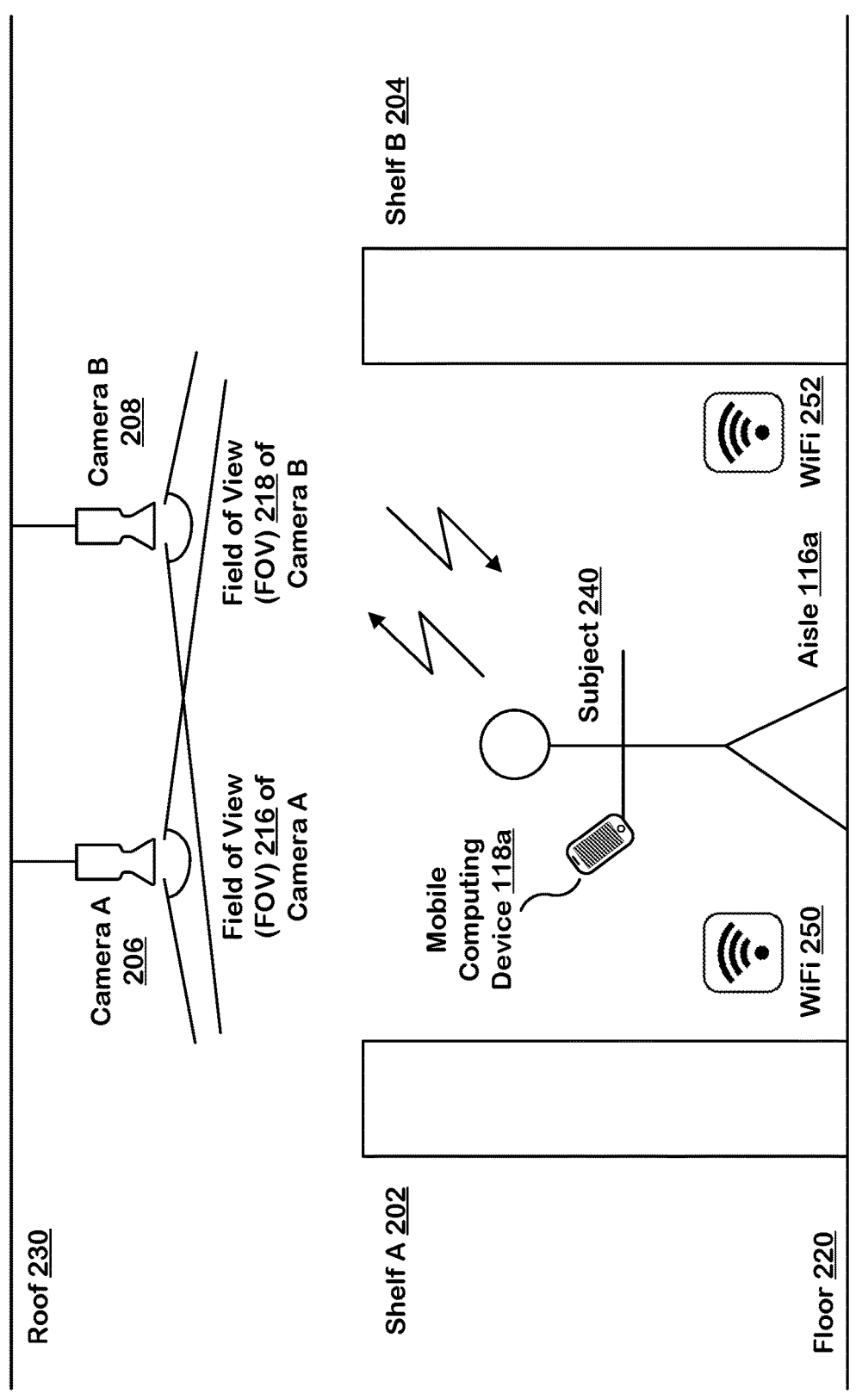
FIG. 11 is a side view of an aisle in a shopping store illustrating a subject with a mobile computing device and a camera arrangement.

In a shopping store, the shelves and other inventory display structures can be arranged in a variety of manners, such as along the walls of the shopping store, or in rows forming aisles or a combination of the two arrangements. FIG. 11 shows an arrangement of shelves, forming an aisle 116a, viewed from one end of the aisle 116a. Two cameras, camera A 206 and camera B 208 are positioned over the aisle 116a at a predetermined distance from a roof 230 and a floor 220 of the shopping store above the inventory display structures, such as shelves. The cameras 114 comprise cameras disposed over and having fields of view encompassing respective parts of the inventory display structures and floor area in the real space. The coordinates in real space of members of a set of candidate joints, located as a subject, identify locations of the subject in the floor area. In FIG. 11, the subject 240 is holding the mobile computing device 118a and standing on the floor 220 in the aisle 116a. The mobile computing device can send and receive signals through the wireless network(s) 181. In one example, the mobile computing devices 120 communicate through a wireless network using for example a Wi-Fi protocol, or other wireless protocols like Bluetooth, ultra-wideband, and ZigBee, through wireless access points (WAP) 250 and 252.

In the example embodiment of the shopping store, the real space can include all of the floor 220 in the shopping store from which inventory can be accessed. Cameras 114 are placed and oriented such that areas of the floor 220 and shelves can be seen by at least two cameras. The cameras 114 also cover at least part of the shelves 202 and 204 and floor space in front of the shelves 202 and 204. Camera angles are selected to have both steep perspective, straight down, and angled perspectives that give more full body images of the customers. In one example embodiment, the cameras 114 are configured at an eight (8) foot height or higher throughout the shopping store.

In FIG. 11, the cameras 206 and 208 have overlapping fields of view, covering the space between a shelf A 202 and a shelf B 204 with overlapping fields of view 216 and 218, respectively. A location in the real space is represented as a (x, y, z) point of the real space coordinate system. "x" and "y" represent positions on a two-dimensional (2D) plane which can be the floor 220 of the shopping store. The value "z" is the height of the point above the 2D plane at floor 220 in one configuration.

Figure 12:
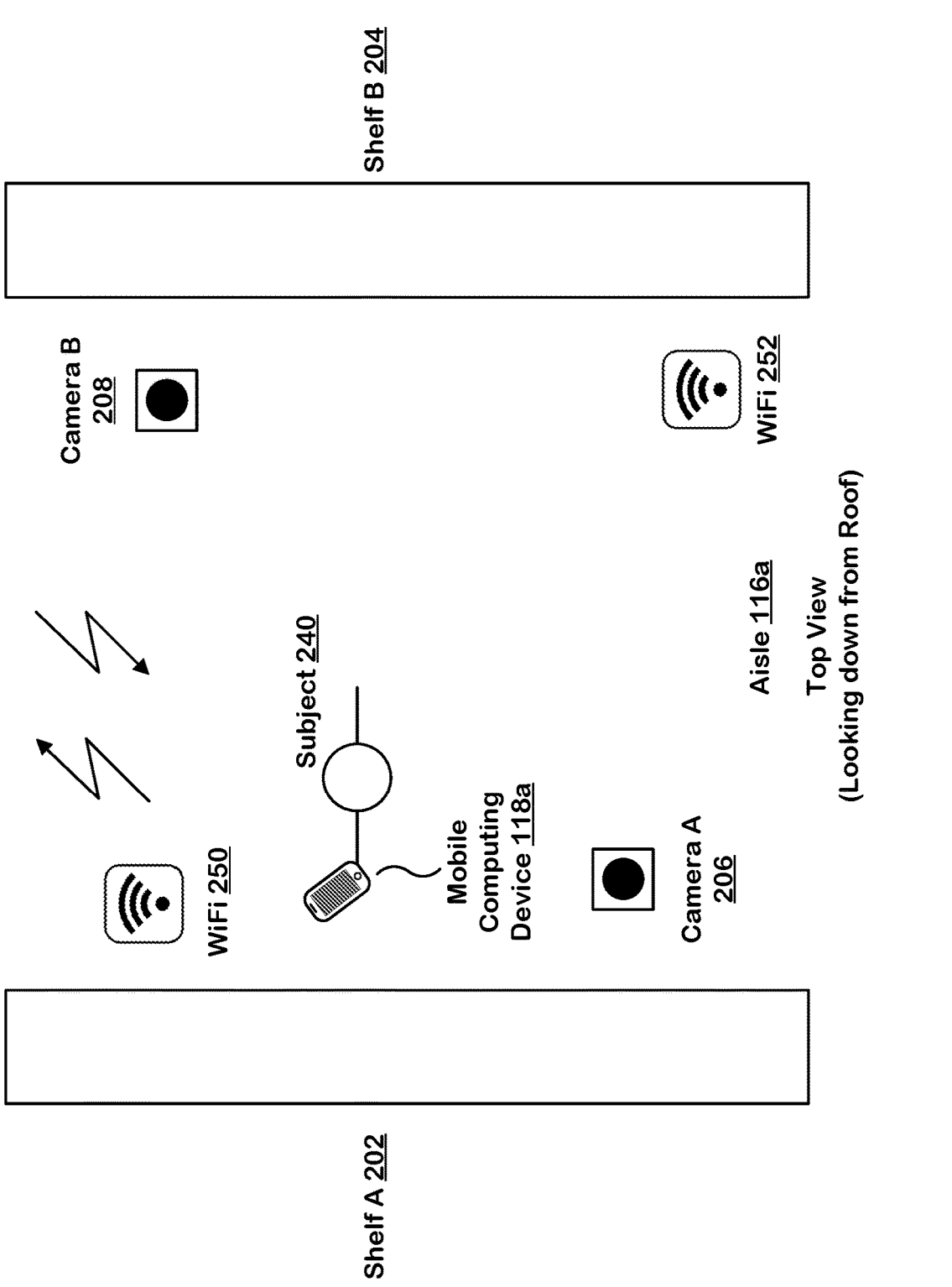
FIG. 12 is a top view of the aisle of FIG. 11 in a shopping store illustrating the subject with the mobile computing device and the camera arrangement.

FIG. 12 illustrates the aisle 116a viewed from the top of FIG. 11, further showing an example arrangement of the positions of cameras 206 and 208 over the aisle 116a. The cameras 206 and 208 are positioned closer to opposite ends of the aisle 116a. The camera A 206 is positioned at a predetermined distance from the shelf A 202 and the camera B 208 is positioned at a predetermined distance from the shelf B 204. In another embodiment, in which more than two cameras are positioned over an aisle, the cameras are positioned at equal distances from each other. In such an embodiment, two cameras are positioned close to the opposite ends and a third camera is positioned in the middle of the aisle. It is understood that a number of different camera arrangements are possible.

Matching Engine

The matching engine 170 includes logic to identify tracked subjects by matching them with their respective user accounts by identifying locations of mobile devices (carried by the tracked subjects) that are executing client applications in the area of real space. In one embodiment, the matching engine uses multiple techniques, independently or in combination, to match the tracked subjects with the user accounts. The system can be implemented without maintaining biometric identifying information about users, so that biometric information about account holders is not exposed to security and privacy concerns raised by distribution of such information.

In one embodiment, a customer (or a subject) logs in to the system using a client application executing on a personal mobile computing device upon entering the shopping store, identifying an authentic user account to be associated with the client application on the mobile device. The system then sends a "semaphore" image selected from the set of unassigned semaphore images in the image database 166 to the client application executing on the mobile device. The semaphore image is unique to the client application in the shopping store as the same image is not freed for use with another client application in the store until the system has matched the user account to a tracked subject. After that matching, the semaphore image becomes available for use again. The client application causes the mobile device to display the semaphore image, which display of the semaphore image is a signal emitted by the mobile device to be detected by the system. The matching engine 170 uses the image recognition engines 112*a-n* or a separate image recognition engine (not shown in FIG. 1) to recognize the semaphore image and determine the location of the mobile computing device displaying the semaphore in the shopping store. The matching engine 170 matches the location of the mobile computing device to a location of a tracked subject. The matching engine 170 then links the tracked subject (stored in the subject database 140) to the user account (stored in the user account database 164) linked to the client application for the duration in which the subject is present in the shopping store. No biometric identifying information is used for identifying the subject by matching the tracking subject with the user account, and none is stored in support of this process. That is, there is no information in the sequences of images used to compare with stored biometric information for the purposes of matching the tracked subjects with user accounts in support of this process.

In other embodiments, the matching engine 170 uses other signals in the alternative or in combination from the mobile computing devices 120 to link the tracked subjects to user accounts. Examples of such signals include a service location signal identifying the position of the mobile computing device in the area of the real space, speed and orientation of the mobile computing device obtained from the accelerometer and compass of the mobile computing device, etc.

In some embodiments, though embodiments are provided that do not maintain any biometric information about account holders, the system can use biometric information to assist matching a not-yet-linked tracked subject to a user account. For example, in one embodiment, the system stores "hair color" of the customer in his or her user account record. During the matching process, the system might use for example hair color of subjects as an additional input to disambiguate and match the tracked subject to a user account. If the user has red colored hair and there is only one subject with red colored hair in the area of real space or in close proximity of the mobile computing device, then the system might select the subject with red hair color to match the user account. The details of matching engine are presented in U.S. patent application Ser. No. 16/255,573, filed on 23 Jan. 2019, titled, "Systems and Methods to Check-in Shoppers in a Cashier-less Store" which is incorporated herein by reference as if fully set forth herein.

The flowcharts in FIGS. 13 to 16C present process steps of four techniques usable alone or in combination by the matching engine 170.

Semaphore Images

FIG. 13 is a flowchart 1300 presenting process steps for a first technique to identify subject by matching tracked subjects in the area of real space with their respective user accounts. In the example of a shopping store, the subjects are customers (or shoppers) moving in the store in aisles between shelves and other open spaces. The process starts at step 1302. As a subject enters the area of real space, the subject opens a client application on a mobile computing device and attempts to login. The system verifies the user credentials at step 1304 (for example, by querying the user account database 164) and accepts login communication from the client application to associate an authenticated user account with the mobile computing device. The system determines that the user account of the client application is not yet linked to a tracked subject. The system sends a semaphore image to the client application for display on the mobile computing device at step 1306. Examples of semaphore images include various shapes of solid colors such as a red rectangle or a pink elephant, etc. A variety of images can be used as semaphores, preferably suited for high confidence recognition by the image recognition engine. Each semaphore image can have a unique identifier. The processing system includes logic to accept login communications from a client application on a mobile device identifying a user account before matching the user account to a tracked subject in the area of real space, and after accepting login communications sends a selected semaphore image from the set of semaphore images to the client application on the mobile device.

In one embodiment, the system selects an available semaphore image from the image database 160 for sending to the client application. After sending the semaphore image to the client application, the system changes a status of the semaphore image in the image database 166 as "assigned" so that this image is not assigned to any other client application. The status of the image remains as "assigned" until the process to match the tracked subject to the mobile computing device is complete. After matching is complete, the status can be changed to "available." This allows for rotating use of a small set of semaphores in a given system, simplifying the image recognition problem.

The client application receives the semaphore image and displays it on the mobile computing device. In one embodiment, the client application also increases the brightness of the display to increase the image visibility. The image is captured by one or more cameras 114 and sent to an image processing engine, referred to as WhatCNN. The system uses WhatCNN at step 1308 to recognize the semaphore images displayed on the mobile computing device. In one embodiment, WhatCNN is a convolutional neural network trained to process the specified bounding boxes in the images to generate a classification of hands of the tracked subjects. One trained WhatCNN processes image frames from one camera. In the example embodiment of the shopping store, for each hand joint in each image frame, the WhatCNN identifies whether the hand joint is empty. The WhatCNN also identifies a semaphore image identifier (in the image database 166) or an SKU (stock keeping unit) number of the inventory item in the hand joint, a confidence value indicating the item in the hand joint is a non-SKU item (i.e. it does not belong to the shopping store inventory) and a context of the hand joint location in the image frame.

As mentioned above, two or more cameras with overlapping fields of view capture images of subjects in real space. Joints of a single subject can appear in image frames of multiple cameras in a respective image channel. A WhatCNN model per camera identifies semaphore images (displayed on mobile computing devices) in hands (represented by hand joints) of subjects. A coordination logic combines the outputs of WhatCNN models into a consolidated data structure listing identifiers of semaphore images in left hand (referred to as left_hand_classid) and right hand (right_hand_classid) of tracked subjects (step 1310). The system stores this information in a dictionary mapping tracking_id to left_hand_classid and right_hand_classid along with a timestamp, including locations of the joints in real space. The details of WhatCNN are presented in U.S. patent application Ser. No. 15/907,112, filed 27 Feb. 2018, now U.S. Pat. No. 10,133,933, issued on 20 Nov. 2018, titled, "Item Put and Take Detection Using Image Recognition" which is incorporated herein by reference as if fully set forth herein.

At step 1312, the system checks if the semaphore image sent to the client application is recognized by the WhatCNN by iterating the output of the WhatCNN models for both hands of all tracked subjects. If the semaphore image is not recognized, the system sends a reminder at a step 1314 to the client application to display the semaphore image on the mobile computing device and repeats process steps 1308 to 1312. Otherwise, if the semaphore image is recognized by WhatCNN, the system matches a user_account (from the user account database 164) associated with the client application to tracking_id (from the subject database 150) of the tracked subject holding the mobile computing device (step 1316). In one embodiment, the system maintains this mapping (tracking_id-user_account) until the subject is present in the area of real space. In one implementation, the system assigns a unique subject identifier (e.g., referred to by subject_id) to the identified subject and stores a mapping of the subject identifier to the tuple tracking_id-user_account. The process ends at step 1318.

Service Location

The flowchart 1400 in FIG. 14 presents process steps for a second technique for identifying subjects by matching tracked subjects with user accounts. This technique uses radio signals emitted by the mobile devices indicating location of the mobile devices. The process starts at step 1402, the system accepts login communication from a client application on a mobile computing device as described above in step 1404 to link an authenticated user account to the mobile computing device. At step 1406, the system receives service location information from the mobile devices in the area of real space at regular intervals. In one embodiment, latitude and longitude coordinates of the mobile computing device emitted from a global positioning system (GPS) receiver of the mobile computing device are used by the system to determine the location. In one embodiment, the service location of the mobile computing device obtained from GPS coordinates has an accuracy between 1 to 3 meters. In another embodiment, the service location of a mobile computing device obtained from GPS coordinates has an accuracy between 1 to 5 meters.

Other techniques can be used in combination with the above technique or independently to determine the service location of the mobile computing device. Examples of such techniques include using signal strengths from different wireless access points (WAP) such as 250 and 252 shown in FIGS. 11 and 12 as an indication of how far the mobile computing device is from respective access points. The system then uses known locations of wireless access points (WAP) 250 and 252 to triangulate and determine the position of the mobile computing device in the area of real space. Other types of signals (such as Bluetooth, ultra-wideband, and ZigBee) emitted by the mobile computing devices can also be used to determine a service location of the mobile computing device.

The system monitors the service locations of mobile devices with client applications that are not yet linked to a tracked subject at step 1408 at regular intervals such as every second. At step 1408, the system determines the distance of a mobile computing device with an unmatched user account from all other mobile computing devices with unmatched user accounts. The system compares this distance with a pre-determined threshold distance "d" such as 3 meters. If the mobile computing device is away from all other mobile devices with unmatched user accounts by at least "d" distance (step 1410), the system determines a nearest not yet linked subject to the mobile computing device (step 1414). The location of the tracked subject is obtained from the output of the JointsCNN at step 1412. In one embodiment the location of the subject obtained from the JointsCNN is more accurate than the service location of the mobile computing device. At step 1416, the system performs the same process as described above in flowchart 1300 to match the tracking_id of the tracked subject with the user_account of the client application. The process ends at a step 1418.

No biometric identifying information is used for matching the tracked subject with the user account, and none is stored in support of this process. That is, there is no information in the sequences of images used to compare with stored biometric information for the purposes of matching the tracked subjects with user account in support of this process. Thus, this logic to match the tracked subjects with user accounts operates without use of personal identifying biometric information associated with the user accounts.

Speed and Orientation

Figure 15:
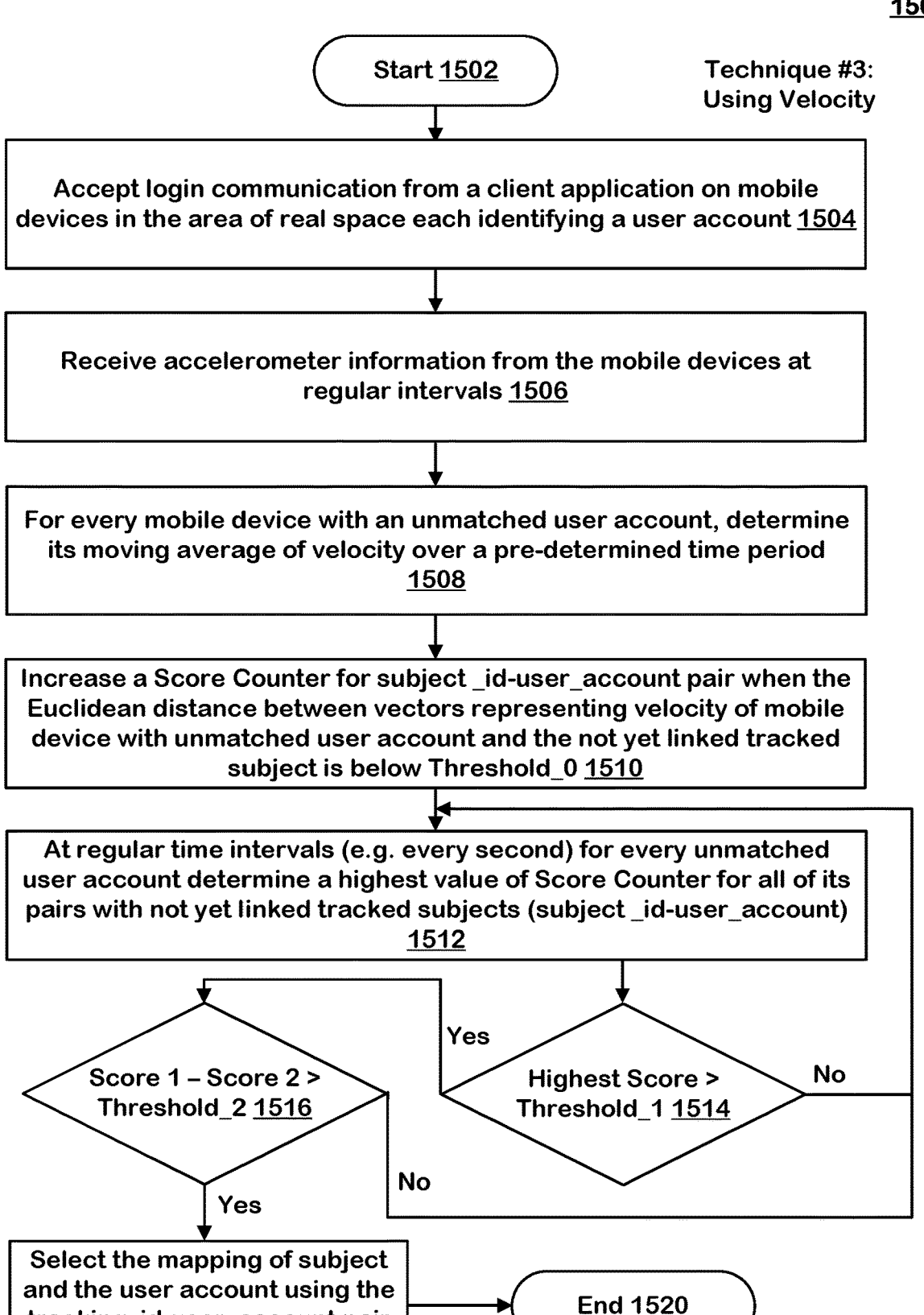
FIG. 15 is a flowchart showing process steps for identifying a subject by matching a tracked subject to a user account using velocity of subjects and a mobile computing device.

The flowchart 1500 in FIG. 15 presents process steps for a third technique to identify subject by matching tracked subjects with user accounts. This technique uses signals emitted by an accelerometer of the mobile computing devices to match tracked subjects with client applications. The process starts at step 1502. The process starts at step 1504 to accept login communication from the client application as described above in the first and second techniques. At step 1506, the system receives signals emitted from the mobile computing devices carrying data from accelerometers on the mobile computing devices in the area of real space, which can be sent at regular intervals. At a step 1508, the system calculates an average velocity of all mobile computing devices with unmatched user accounts.

The accelerometers provide acceleration of mobile computing devices along the three axes (x, y, z). In one embodiment, the velocity is calculated by taking the accelerations values at small time intervals (e.g., at every 10 milliseconds) to calculate the current velocity at time "t" i.e., $v_t = v_0 + a_t$, where $v_0$ is initial velocity. In one embodiment, the $v_0$ is initialized as "0" and subsequently, for every time t+1, $v_t$ becomes $v_0$. The velocities along the three axes are then combined to determine an overall velocity of the mobile computing device at time "t." Finally at step 808, the system calculates moving averages of velocities of all mobile computing devices over a larger period of time such as 3 seconds which is long enough for the walking gait of an average person, or over longer periods of time.

At step 1510, the system calculates Euclidean distance (also referred to as L2 norm) between velocities of all pairs of mobile computing devices with unmatched client applications to not yet linked tracked subjects. The velocities of subjects are derived from changes in positions of their joints with respect to time, obtained from joints analysis and stored in respective subject data structures 320 with timestamps. In one embodiment, a location of center of mass of each subject is determined using the joints analysis. The velocity, or other derivative, of the center of mass location data of the subject is used for comparison with velocities of mobile computing devices. For each tracking_id-user_account pair, if the value of the Euclidean distance between their respective velocities is less than a threshold_0, a score_counter for the tracking_id-user_account pair is incremented. The above process is performed at regular time intervals, thus updating the score_counter for each tracking_id-user_account pair.

At regular time intervals (e.g., every one second), the system compares the score_counter values for pairs of every unmatched user account with every not yet linked tracked subject (step 1512). If the highest score is greater than threshold_1 (step 1514), the system calculates the difference between the highest score and the second highest score (for pair of same user account with a different subject) at step 1516. If the difference is greater than threshold_2, the system selects the mapping of user_account to the tracked subject at step 1518 and follows the same process as described above in step 1516. The process ends at a step 1520.

In another embodiment, when JointsCNN recognizes a hand holding a mobile computing device, the velocity of the hand (of the tracked subject) holding the mobile computing device is used in above process instead of using the velocity of the center of mass of the subject. This improves performance of the matching algorithm. To determine values of the thresholds (threshold_0, threshold_1, threshold_2), the system uses training data with labels assigned to the images. During training, various combinations of the threshold values are used and the output of the algorithm is matched with ground truth labels of images to determine its performance. The values of thresholds that result in best overall assignment accuracy are selected for use in production (or inference).

No biometric identifying information is used for matching the tracked subject with the user account, and none is stored in support of this process. That is, there is no information in the sequences of images used to compare with stored biometric information for the purposes of matching the tracked subjects with user accounts in support of this process. Thus, this logic to match the tracked subjects with user accounts operates without use of personal identifying biometric information associated with the user accounts.

Network Ensemble

Figure 16A:
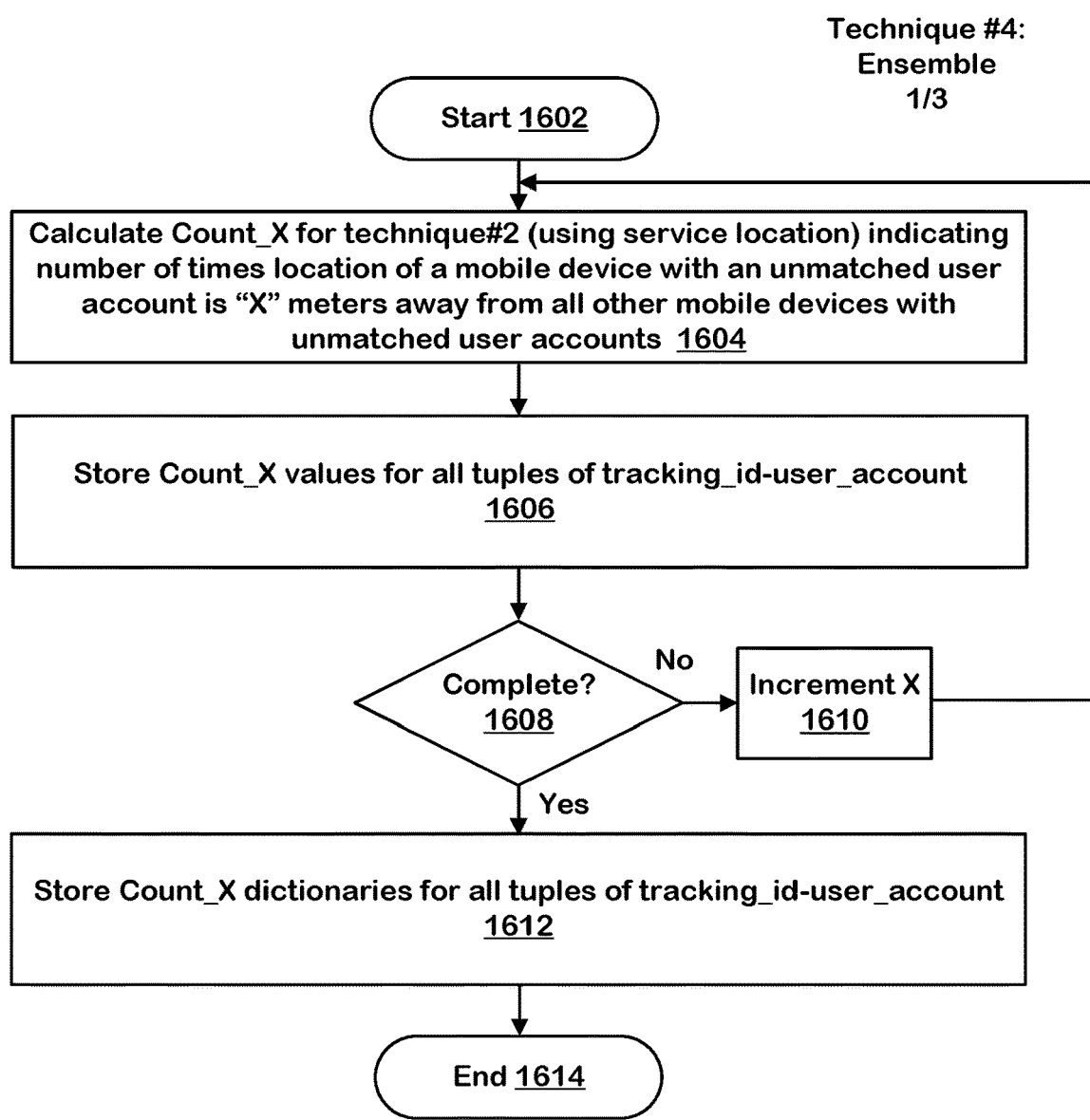
FIG. 16A is a flowchart showing a first part of process steps for matching a tracked subject to a user account using a network ensemble.

A network ensemble is a learning paradigm where many networks are jointly used to solve a problem. Ensembles typically improve the prediction accuracy obtained from a single classifier by a factor that validates the effort and cost associated with learning multiple models. In the fourth technique to match user accounts to not yet linked tracked subjects, the second and third techniques presented above are jointly used in an ensemble (or network ensemble). To use the two techniques in an ensemble, relevant features are extracted from application of the two techniques. FIGS. 16A-16C present process steps (in a flowchart 1600) for extracting features, training the ensemble and using the trained ensemble to predict match of a user account to a not yet linked tracked subject.

FIG. 16A presents the process steps for generating features using the second technique that uses service location of mobile computing devices. The process starts at step 1602. At a step 1604, a Count_X, for the second technique is calculated indicating a number of times a service location of a mobile computing device with an unmatched user account is X meters away from all other mobile computing devices with unmatched user accounts. At step 1606, Count_X values of all tuples of tracking_id-user_account pairs is stored by the system for use by the ensemble. In one embodiment, multiple values of X are used e.g., 1 m, 2 m, 3 m, 4 m, 5 m (steps 1608 and 1610). For each value of X, the count is stored as a dictionary that maps tuples of tracking_id-user_account to count score, which is an integer.

In the example where 5 values of X are used, five such dictionaries are created at step 1612. The process ends at step 1614.

FIG. 16B presents the process steps for generating features using the third technique that uses velocities of mobile computing devices. The process starts at step 1620. At a step 1622, a Count_Y, for the third technique is determined which is equal to score_counter values indicating number of times Euclidean distance between a particular tracking_id-user_account pair is below a threshold_0. At a step 1624, Count_Y values of all tuples of tracking_id-user_account pairs is stored by the system for use by the ensemble. In one embodiment, multiple values of threshold_0 are used e.g., five different values (steps 1626 and 1628). For each value of threshold_0, the Count_Y is stored as a dictionary that maps tuples of tracking_id-user_account to count score, which is an integer. In the example where 5 values of threshold are used, five such dictionaries are created at step 1630. The process ends at step 1632.

The features from the second and third techniques are then used to create a labeled training data set and used to train the network ensemble. To collect such a data set, multiple subjects (shoppers) walk in an area of real space such as a shopping store. The images of these subject are collected using cameras 114 at regular time intervals. Human labelers review the images and assign correct identifiers (tracking_id and user_account) to the images in the training data. The process is described in a flowchart 1600 presented in FIG. 16C. The process starts at a step 1640. At a step 1642, features in the form of Count_X and Count_Y dictionaries obtained from second and third techniques are compared with corresponding true labels assigned by the human labelers on the images to identify correct matches (true) and incorrect matches (false) of tracking_id and user_account.

As we have only two categories of outcome for each mapping of tracking_id and user_account: true or false, a binary classifier is trained using this training data set (step 1644). Commonly used methods for binary classification include decision trees, random forest, neural networks, gradient boost, support vector machines, etc. A trained binary classifier is used to categorize new probabilistic observations as true or false. The trained binary classifier is used in production (or inference) by giving as input Count_X and Count_Y dictionaries for tracking_id-user_account tuples. The trained binary classifier classifies each tuple as true or false at a step 1646. The process ends at a step 1648.

If there is an unmatched mobile computing device in the area of real space after application of the above four techniques, the system sends a notification to the mobile computing device to open the client application. If the user accepts the notification, the client application will display a semaphore image as described in the first technique. The system will then follow the steps in the first technique to check-in the shopper (match tracking_id to user_account). If the customer does not respond to the notification, the system will send a notification to an employee in the shopping store indicating the location of the unmatched customer. The employee can then walk to the customer, ask him to open the client application on his mobile computing device to check-in to the system using a semaphore image.

No biometric identifying information is used for matching the tracked subject with the user account, and none is stored in support of this process. That is, there is no information in the sequences of images used to compare with stored biometric information for the purposes of matching the tracked subjects with user accounts in support of this process. Thus, this logic to match the tracked subjects with user accounts operates without use of personal identifying biometric information associated with the user accounts.

Architecture

Figure 17:
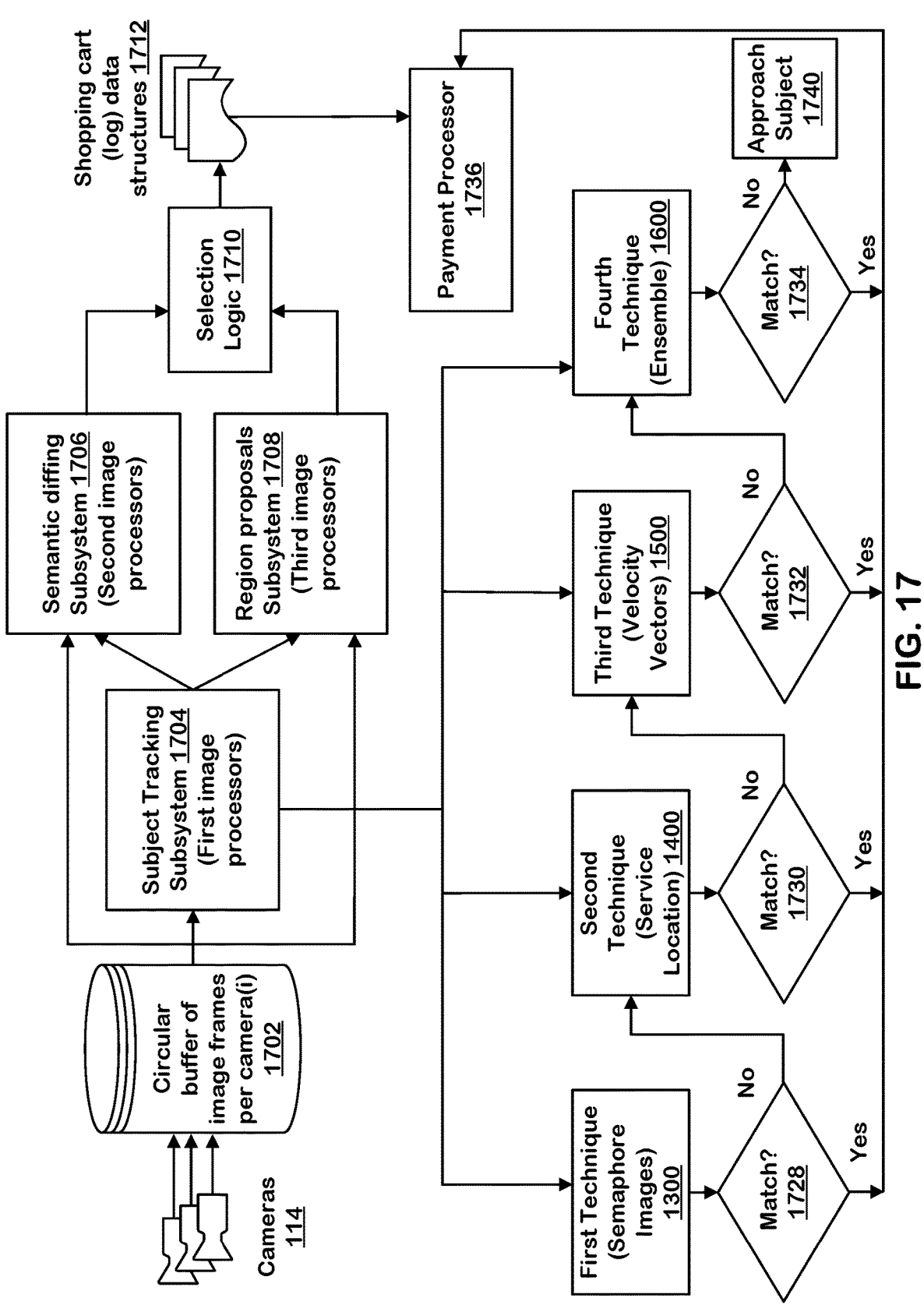
FIG. 17 is an example architecture in which the four techniques presented in FIGS. 13 to 16C are applied in an area of real space to reliably match a tracked subject to a user account.

An example architecture of a system in which the four techniques presented above are applied to identify subjects by matching a user_account to a not yet linked tracked subject in an area of real space is presented in FIG. 17. Because FIG. 17 is an architectural diagram, certain details are omitted to improve the clarity of description. The system presented in FIG. 17 receives image frames from a plurality of cameras 114. As described above, in one embodiment, the cameras 114 can be synchronized in time with each other, so that images are captured at the same time, or close in time, and at the same image capture rate. Images captured in all the cameras covering an area of real space at the same time, or close in time, are synchronized in the sense that the synchronized images can be identified in the processing engines as representing different views at a moment in time of subjects having fixed positions in the real space. The images are stored in a circular buffer of image frames per camera 1702.

A "subject tracking" subsystem 1704 (also referred to as first image processors) processes image frames received from cameras 114 to locate and track subjects in the real space. The first image processors include subject image recognition engines such as the JointsCNN above.

A "semantic diffing" subsystem 1706 (also referred to as second image processors) includes background image recognition engines, which receive corresponding sequences of images from the plurality of cameras and recognize semantically significant differences in the background (i.e. inventory display structures like shelves) as they relate to puts and takes of inventory items, for example, over time in the images from each camera. The second image processors receive output of the subject tracking subsystem 1704 and image frames from cameras 114 as input. Details of "semantic diffing" subsystem are presented in U.S. patent application Ser. No. 15/945,466, filed 4 Apr. 2018, now U.S. Pat. No. 10,127,438, issued on 13 Nov. 2018, titled, "Predicting Inventory Events using Semantic Diffing," and U.S. patent application Ser. No. 15/945,473, filed 4 Apr. 2018, titled, "Predicting Inventory Events using Foreground/Background Processing," both of which are incorporated herein by reference as if fully set forth herein. The second image processors process identified background changes to make a first set of detections of takes of inventory items by tracked subjects and of puts of inventory items on inventory display structures by tracked subjects. The first set of detections are also referred to as background detections of puts and takes of inventory items. In the example of a shopping store, the first detections identify inventory items taken from the shelves or put on the shelves by customers or employees of the store. The semantic diffing subsystem includes the logic to associate identified background changes with tracked subjects.

A "region proposals" subsystem 1708 (also referred to as third image processors) includes foreground image recognition engines, receives corresponding sequences of images from the plurality of cameras 114, and recognizes semantically significant objects in the foreground (i.e. shoppers, their hands and inventory items) as they relate to puts and takes of inventory items, for example, over time in the images from each camera. The region proposals subsystem 1708 also receives output of the subject tracking subsystem 1704. The third image processors process sequences of images from cameras 114 to identify and classify foreground changes represented in the images in the corresponding sequences of images. The third image processors process identified foreground changes to make a second set of detections of takes of inventory items by tracked subjects and of puts of inventory items on inventory display structures by tracked subjects. The second set of detections are also referred to as foreground detection of puts and takes of inventory items. In the example of a shopping store, the second set of detections identifies takes of inventory items and puts of inventory items on inventory display structures by customers and employees of the store. The details of a region proposal subsystem are presented in U.S. patent application Ser. No. 15/907,112, filed 27 Feb. 2018, now U.S. Pat. No. 10,133,933, issued on 20 Nov. 2018, titled, "Item Put and Take Detection Using Image Recognition" which is incorporated herein by reference as if fully set forth herein.

The system described in FIG. 17 includes a selection logic 1710 to process the first and second sets of detections to generate log data structures including lists of inventory items for tracked subjects. For a take or put in the real space, the selection logic 1710 selects the output from either the semantic diffing subsystem 1706 or the region proposals subsystem 1708. In one embodiment, the selection logic 1710 uses a confidence score generated by the semantic diffing subsystem for the first set of detections and a confidence score generated by the region proposals subsystem for a second set of detections to make the selection. The output of the subsystem with a higher confidence score for a particular detection is selected and used to generate a log data structure 1712 (also referred to as a shopping cart data structure) including a list of inventory items (and their quantities) associated with tracked subjects.

To process a payment for the items in the log data structure 1712, the system in FIG. 17 applies the four techniques for matching the tracked subject (associated with the log data) to a user_account which includes a payment method such as credit card or bank account information. In one embodiment, the four techniques are applied sequentially as shown in the figure. If the process steps in flowchart 1300 for the first technique produces a match between the subject and the user account then this information is used by a payment processor 1736 to charge the customer for the inventory items in the log data structure. Otherwise (step 1728), the process steps presented in flowchart 1400 for the second technique are followed and the user account is used by the payment processor 1736. If the second technique is unable to match the user account with a subject (1730) then the process steps presented in flowchart 1500 for the third technique are followed. If the third technique is unable to match the user account with a subject (1732) then the process steps in flowchart 1600 for the fourth technique are followed to match the user account with a subject.

If the fourth technique is unable to match the user account with a subject (1734), the system sends a notification to the mobile computing device to open the client application and follow the steps presented in the flowchart 1300 for the first technique. If the customer does not respond to the notification, the system will send a notification to an employee in the shopping store indicating the location of the unmatched customer. The employee can then walk to the customer, ask him to open the client application on his mobile computing device to check-in to the system using a semaphore image (step 1740). It is understood that in other embodiments of the architecture presented in FIG. 17, fewer than four techniques can be used to match the user accounts to not yet linked tracked subjects.

Any data structures and code described or referenced above are stored according to many implementations in computer readable memory, which comprises a non-transitory computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method of tracking subjects in an area of real space comprising:

processing, by a plurality of trained inference engines, respective sequences of images in a plurality of sequences of images to locate features of subjects in corresponding fields of view of the respective sequences, and receiving information that includes combined located features from more than one of the trained inference engines which process respective sequences of images having overlapping fields of view to generate data locating subjects in three dimensions in the area of real space during identification intervals; and matching located subjects, responsive to the data locating the subjects in the area of real space over a plurality of identification intervals, to identify tracked subjects, including comparing located subjects with the tracked subjects.

2. The method of claim 1, wherein the comparing of the located subjects with the tracked subjects includes comparing located subjects in a current identification interval with tracked subjects in a first preceding identification interval.

3. The method of claim 2, wherein, when there is a mismatch in numbers of located subjects in the current identification interval with numbers of tracked subjects in the first preceding identification interval, comparing a location of at least one located subject in the current identification interval with places in the area of real space corresponding to entrances and exits.

4. The method of claim 2, wherein the comparing of the located subjects in the current identification interval with the tracked subjects in the first preceding identification interval includes a procedure to:

detect a condition in which a number of located subjects in the current identification interval does not match a number of tracked subjects in the first preceding identification interval in a plurality of previous identification intervals; and upon detection of the condition, compare at least one located subject of a set of located subjects from the current identification interval with a set of tracked subjects from a second preceding identification interval in the plurality of previous identification intervals, that precedes the first preceding identification interval.

5. The method of claim 4, wherein upon the detection of the condition, if a set of tracked subjects from the first preceding identification interval includes N members, and the set of tracked subjects from the second preceding identification interval includes the N members plus an additional tracked subject missing in the first preceding identification interval, and the set of located subjects from the current identification interval includes the N members plus a candidate located subject, then the procedure includes evaluating the candidate located subject in the current identification interval with the tracked subject missing in the first preceding identification interval.

6. The method of claim 5, wherein the evaluating of the candidate located subject in the current identification interval with the tracked subject missing in the first preceding identification interval includes:

linking the candidate located subject and the missing tracked subject if a difference in timestamps between the candidate located subject and the missing tracked subject is less than a timing threshold.

7. The method of claim 5, wherein the evaluating of the candidate located subject in the current identification interval with the tracked subject missing in the first preceding identification interval, includes:

linking the candidate located subject and the missing tracked subject if a distance in real space between locations of the candidate located subject and the missing tracked subject is less than a distance threshold.

8. The method of claim 4, wherein the matching of the located subjects to identify the tracked subjects further includes:

linking N members of the set of located subjects from the current identification interval to N members of a set of tracked subjects from the first preceding identification interval by prioritizing evaluation of members of the set of located subjects from the current identification interval according to locations of the identified subjects.

9. The method of claim 4, wherein, when there is a mismatch in numbers of located subjects in the current identification interval with numbers of tracked subjects in the first preceding identification interval, comparing a location of at least one located subject in the current identification interval with a designated unmonitored location, and wherein the method further includes determining that no other subject in the set of tracked subjects in the second preceding identification interval and the set of located subjects in the current identification interval is closer to the designated unmonitored location than a distance threshold.

10. The method of claim 1, further comprising linking the identified subjects with identified subjects from a stored set of identified objects.

11. The method of claim 1, wherein the plurality of sequences of images are produced by a plurality of sensors in the area of real space to provide synchronized sequences of images of respective fields of view.

12. The method of claim 1, wherein the processing, by the plurality of trained inference engines, further includes detecting a subject as a constellation of joints in the area of real space, a joint in the constellation of joints including a location represented by positions in three dimensions of the area of real space and a timestamp.

13. A system for tracking subjects, in an area of real space, comprising:

a processing system comprising:

logic including a plurality of trained inference engines that process respective sequences of images in a plurality of sequences of images to locate features of subjects in corresponding fields of view of the respective sequences, and logic to receive information that includes combined located features from more than one of the trained inference engines which process respective sequences of images having overlapping fields of view to generate data locating subjects in three dimensions in the area of real space during identification intervals; and logic that, responsive to the data locating the subjects in the area of real space over a plurality of identification intervals, matches located subjects from a plurality of identification intervals to identify tracked subjects, including comparing located subjects with the tracked subjects.

14. The system of claim 13, wherein the comparing of the located subjects with the tracked subjects includes comparing located subjects in a current identification interval with tracked subjects in a first preceding identification interval.

15. The system of claim 14, further comprising logic that, when there is a mismatch in numbers of located subjects in the current identification interval with numbers of tracked subjects in the first preceding identification interval, (i) accesses data locating places in the area of real space corresponding to entrances and exits, and (ii) compares a location of at least one located subject in the current identification interval with the places.

16. The system of claim 14, wherein the comparing of the located subjects in the current identification interval with the tracked subjects in the first preceding identification interval includes a procedure to:

detect a condition in which a number of located subjects in the current identification interval does not match a number of tracked subjects in the first preceding identification interval in a plurality of previous identification intervals; and upon detection of the condition, compare at least one located subject of a set of located subjects from the current identification interval with a set of tracked subjects from a second preceding identification interval in the plurality of previous identification intervals, that precedes the first preceding identification interval.

17. The system of claim 16, wherein upon detection of the condition, if a set of tracked subjects from the first preceding identification interval includes N members, and the set of tracked subjects from the second preceding identification interval includes the N members plus an additional tracked subject missing in the first preceding identification interval, and the set of located subjects from the current identification interval includes the N members plus a candidate located subject, then the procedure includes evaluating the candidate located subject in the current identification interval with the tracked subject missing in the first preceding identification interval.

18. The system of claim 17, wherein the evaluating of the candidate located subject in the current identification interval with the tracked subject missing in the first preceding identification interval includes:

linking the candidate located subject and the missing tracked subject if a difference in timestamps between the candidate located subject and the missing tracked subject is less than a timing threshold.

19. The system of claim 17, wherein the evaluating of the candidate located subject in the current identification interval with the tracked subject missing in the first preceding identification interval includes:

linking the candidate located subject and the missing tracked subject if a distance in real space between locations of the candidate located subject and the missing tracked subject is less than a distance threshold.

20. A non-transitory computer-readable storage medium impressed with computer instructions to track subjects in an area of real space, the instructions, when executed on one or more processors, performing operations comprising:

logic including a plurality of trained inference engines that process respective sequences of images in a plurality of sequences of images to locate features of subjects in corresponding fields of view of the respective sequences, and logic to receive information that includes combined located features from more than one of the trained inference engines which process respective sequences of images having overlapping fields of view to generate data locating subjects in three dimensions in the area of real space during identification intervals; and logic that, responsive to the data locating the subjects in the area of real space over a plurality of identification intervals, matches located subjects from a plurality of identification intervals to identify tracked subjects, including comparing located subjects with the tracked subjects.

* * * * *